(12) United States Patent
Chen

(10) Patent No.: US 12,028,543 B2
(45) Date of Patent: Jul. 2, 2024

(54) DECODING METHOD AND APPARATUS, ENCODING METHOD AND APPARATUS, AND DEVICE

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 190 days.

(21) Appl. No.: 17/762,003

(22) PCT Filed: Sep. 16, 2020

(86) PCT No.: PCT/CN2020/115634
§ 371 (c)(1),
(2) Date: Mar. 18, 2022

(87) PCT Pub. No.: WO2021/052369
PCT Pub. Date: Mar. 25, 2021

(65) Prior Publication Data
US 2022/0345736 A1    Oct. 27, 2022

(30) Foreign Application Priority Data
Sep. 20, 2019    (CN) .......................... 201910894595.2

(51) Int. Cl.
*H04N 19/00* (2014.01)
*H04N 19/103* (2014.01)
(Continued)

(52) U.S. Cl.
CPC .......... *H04N 19/46* (2014.11); *H04N 19/103* (2014.11); *H04N 19/157* (2014.11); *H04N 19/176* (2014.11)

(58) Field of Classification Search
CPC .... H04N 19/46; H04N 19/103; H04N 19/157; H04N 19/176; H04N 19/109;
(Continued)

(56) References Cited

U.S. PATENT DOCUMENTS 5,790,839 A * 8/1998 Luk ........................ G11C 5/025
713/300
5,901,304 A * 5/1999 Hwang .................... G11C 7/22
365/230.06
(Continued)

FOREIGN PATENT DOCUMENTS

CN    103096047 A    5/2013
CN    103096053 A    5/2013
(Continued)

OTHER PUBLICATIONS

International Search Report in the international application No. PCT/CN2020/115634, mailed on Dec. 21, 2020.
(Continued)

*Primary Examiner* — Frank F Huang
(74) *Attorney, Agent, or Firm* — Ladas & Parry, LLP

(57) ABSTRACT

The present disclosure provides a decoding method and apparatus, an encoding method and apparatus, and a device. The decoding method includes: determining prediction-mode flag information of a current block, the prediction-mode flag information includes a flag value of each of one or more of N candidate prediction modes; when the flag value is a first value, the flag value indicates that a candidate prediction mode is enabled, and when the flag value is a second value, the flag value indicates that the candidate prediction mode is disabled, and for the flag value of one of the N candidate prediction modes, if the current block does not satisfy a decoding condition of the flag value of the candidate prediction mode, the flag value is a derived flag value of the candidate prediction mode; determining a target (Continued)

prediction mode used by the current block according to the prediction-mode flag information, where the target prediction mode is one of the N candidate prediction modes; and decoding the current block according to the target prediction mode. The present disclosure can improve the encoding performance.

19 Claims, 8 Drawing Sheets

(51) Int. Cl.
  *H04N 19/157* (2014.01)
  *H04N 19/176* (2014.01)
  *H04N 19/46* (2014.01)
(58) Field of Classification Search
  CPC ...... H04N 19/159; H04N 19/70; H04N 19/52; H04N 19/184; H04N 19/44
  See application file for complete search history.

(56) References Cited

U.S. PATENT DOCUMENTS

| | | | | |
|---|---|---|---|---|
| 6,072,834 | A * | 6/2000 | Kim | H04N 19/176 |
| | | | | 382/250 |
| 6,097,756 | A * | 8/2000 | Han | H04N 19/537 |
| | | | | 375/240 |
| 6,580,754 | B1 * | 6/2003 | Wan | H04N 19/33 |
| | | | | 375/E7.079 |
| 6,728,317 | B1 * | 4/2004 | Demos | H04N 19/36 |
| | | | | 348/E7.015 |
| 6,765,962 | B1 * | 7/2004 | Lee | H04N 19/124 |
| | | | | 375/240.03 |
| 6,771,703 | B1 * | 8/2004 | Oguz | H04N 19/59 |
| | | | | 375/240.03 |
| 6,826,232 | B2 * | 11/2004 | Chen | H04N 19/14 |
| | | | | 375/240.18 |
| 7,016,412 | B1 * | 3/2006 | van Zon | H04N 19/156 |
| | | | | 375/240.1 |
| 7,095,782 | B1 * | 8/2006 | Cohen | H04N 21/2404 |
| | | | | 375/E7.02 |
| 7,245,662 | B2 * | 7/2007 | Piche | H04N 19/46 |
| | | | | 382/250 |
| 7,263,124 | B2 * | 8/2007 | Peng | H04N 19/34 |
| | | | | 375/240.03 |
| 7,369,610 | B2 * | 5/2008 | Xu | H04N 21/234327 |
| | | | | 375/E7.091 |
| 7,391,807 | B2 * | 6/2008 | Lin | H04N 19/124 |
| | | | | 375/240.03 |
| 7,477,688 | B1 * | 1/2009 | Zhang | H04N 19/40 |
| | | | | 375/240 |
| 7,627,034 | B2 * | 12/2009 | Park | H04N 19/46 |
| | | | | 375/240.08 |
| 7,697,608 | B2 * | 4/2010 | Lee | H04N 19/14 |
| | | | | 375/240.03 |
| 7,729,421 | B2 * | 6/2010 | Campisano | H04N 19/577 |
| | | | | 375/240.01 |
| 8,040,952 | B2 * | 10/2011 | Park | H04N 21/4347 |
| | | | | 375/240.01 |
| 8,189,659 | B2 * | 5/2012 | Han | H04N 21/43637 |
| | | | | 375/240.02 |
| 8,494,042 | B2 * | 7/2013 | Park | H04N 19/513 |
| | | | | 375/240 |
| 9,491,490 | B1 | 11/2016 | Toth et al. | |
| 10,798,400 | B2 | 10/2020 | Lim et al. | |
| 2002/0191692 | A1 | 12/2002 | Fallon et al. | |
| 2007/0064791 | A1 * | 3/2007 | Okada | H04N 19/63 |
| | | | | 375/E7.125 |
| 2009/0028245 | A1 * | 1/2009 | Vieron | H04N 19/109 |
| | | | | 375/E7.123 |
| 2011/0243231 | A1 * | 10/2011 | Li | H04N 19/433 |
| | | | | 375/E7.256 |
| 2011/0268175 | A1 * | 11/2011 | Tan | H04N 19/895 |
| | | | | 375/E7.026 |
| 2012/0320984 | A1 | 12/2012 | Zhou | |
| 2013/0028324 | A1 * | 1/2013 | Chang | H04N 19/433 |
| | | | | 375/E7.125 |
| 2014/0092970 | A1 * | 4/2014 | Misra | H04N 19/52 |
| | | | | 375/240.16 |
| 2014/0153648 | A1 | 6/2014 | Lee et al. | |
| 2014/0223114 | A1 | 8/2014 | Wang et al. | |
| 2018/0249171 | A1 | 8/2018 | Lim et al. | |
| 2020/0228830 | A1 | 7/2020 | Zhang et al. | |

FOREIGN PATENT DOCUMENTS

| | | |
|---|---|---|
| CN | 107333139 A | 11/2017 |
| CN | 107925774 A | 4/2018 |
| CN | 108924551 A | 11/2018 |
| CN | 109587479 A | 4/2019 |
| CN | 110225346 A | 9/2019 |
| CN | 110234008 A | 9/2019 |
| CN | 110933408 A | 3/2020 |
| CN | 112135144 A | 12/2020 |
| JP | 2013246606 A | 12/2013 |

OTHER PUBLICATIONS

Written Opinion of the International Searching Authority in the international application No. PCT/CN2020/115634 mailed on Dec. 21, 2020, with English translation provided by Google Translate.
European Patent Office, Extended European Search Report Issued in Application No. 20864976.4, Oct. 26, 2022, Germany, 9 pages.
Huawei Technologies Co., LTD, RWTH Aachen University, "Non-CE4: Geometrical partitioning for inter blocks", Joint Video Experts Team (JVET) of ITU-T SG 16 WP 3 and ISO/IECJTC 1/SC 29/WGII, 15th Meeting: Gothenburg, SE, Jul. 3-12, 2019, Document: JVET- 00489, 9 pages.
Chen (Hikvision) F et al: "Non-CE4: Improved signaling method for merge modes", Joint Video Experts Team (JVET) of ITU-T SG 16 WP 3 and ISO/IECJTC 1/SC 29/WGII, 16th Meeting: Geneva, CH, Oct. 1-11, 2019, Document: JVET-P0309-v 1, 5 pages.
Bross B et al: "Versatile Video Coding (Draft 6)", Joint Video Experts Team (JVET) of ITU-T SG 16 WP 3 and ISO/IEC JTC 1/SC 29/WGII, 15th Meeting: Gothenburg, SE, Jul. 3-12, 2019, Document: JVET-02001-vE, 455 pages.

* cited by examiner

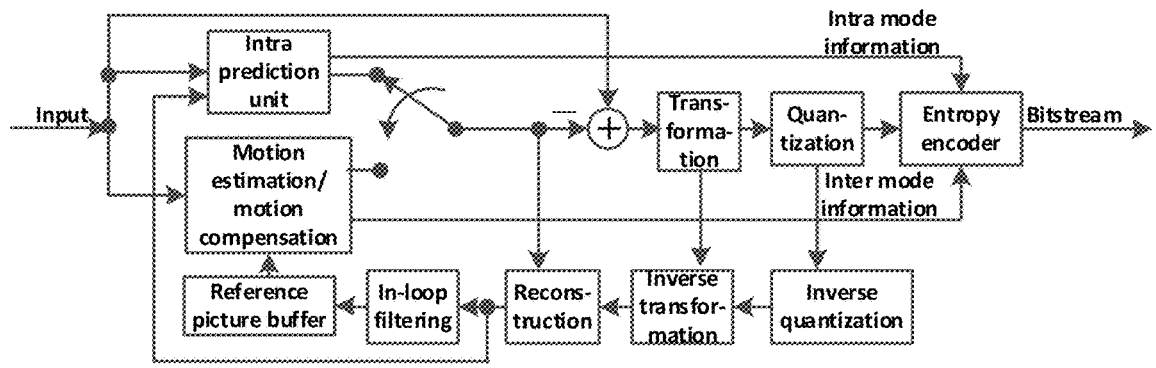

FIG.1

```
┌─────────────────────────────────────────────────────────────────────┐
│ Determine prediction-mode flag information of a current block, where │   201
│ the prediction-mode flag information includes a flag value of each   │ ─/
│ of at least one of N candidate prediction modes; The flag value       │
│ being a first value indicates that the candidate prediction mode is   │
│ enabled, and the flag value being a second value indicates that the   │
│ candidate prediction mode is disabled                                 │
└─────────────────────────────────────────────────────────────────────┘
                                   │
                                   ▼
┌─────────────────────────────────────────────────────────────────────┐
│ Determine a target prediction mode used by the current block          │   202
│ according to the prediction-mode flag information                     │ ─/
└─────────────────────────────────────────────────────────────────────┘
                                   │
                                   ▼
┌─────────────────────────────────────────────────────────────────────┐   203
│ Decode the current block according to the target prediction mode      │ ─/
└─────────────────────────────────────────────────────────────────────┘
```

FIG.2

```
┌─────────────────────────────────────────────────────────────────────┐
│ Determine a target prediction mode used by a current block, where    │   301
│ the target prediction mode is one of N candidate prediction modes    │ ─\
│ of the current block                                                 │
└─────────────────────────────────────────────────────────────────────┘
                                   │
                                   ▼
┌─────────────────────────────────────────────────────────────────────┐
│ Determine prediction-mode flag information of the current block       │
│ according to the target prediction mode, where the prediction-mode    │
│ flag information includes a flag value of each of at least one of the │   302
│ N candidate prediction modes; The flag value being a first value      │ ─\
│ indicates that the candidate prediction mode is enabled, and the      │
│ flag value being a second value indicates that the candidate          │
│ prediction mode is disabled                                           │
└─────────────────────────────────────────────────────────────────────┘
                                   │
                                   ▼
┌─────────────────────────────────────────────────────────────────────┐
│ Encode the current block according to the prediction-mode flag        │
│ information. In the process of encoding the current block, for the    │
│ flag value of each of the N candidate prediction modes included in    │   303
│ the prediction-mode flag information, if the current block satisfies  │ ─/
│ the decoding condition for the flag value of the candidate prediction │
│ mode, an encoded bitstream of the current block carries flag          │
│ indication information indicating whether to enable the candidate     │
│ prediction mode; and if the current block does not satisfy the        │
│ decoding condition for the flag value of the candidate prediction     │
│ mode, the encoded bitstream of the current block does not carry the   │
│ flag indication information indicating whether to enable the          │
│ candidate prediction mode                                             │
└─────────────────────────────────────────────────────────────────────┘
```

FIG. 3

DECODING METHOD AND APPARATUS, ENCODING METHOD AND APPARATUS, AND DEVICE

CROSS-REFERENCE TO RELATED APPLICATIONS

The present application is the U.S. national phase of PCT Application PCT/CN2020/115634 filed on Sep. 16, 2020, which claims a priority to Chinese patent application No. 201910894595.2 filed on Sep. 20, 2019, the disclosures of which are incorporated herein by reference in their entireties.

TECHNICAL FIELD

The present disclosure relates to the technical field of picture processing, in particular to a decoding method and apparatus, an encoding method and apparatus, and a device.

BACKGROUND

To save spaces, video pictures are always transmitted after being encoded. A video encoding method may include processes such as prediction, transformation, quantization, entropy encoding, filtering, etc. The prediction encoding may include intra encoding and inter encoding. Further, the inter encoding refers to an operation of utilizing a temporal-domain correlation of a video to predict a value of a current pixel by using pixel values of neighboring encoded pictures, so as to remove temporal-domain redundancies of the video effectively; and the intra encoding refers to an operation of utilizing a spatial-domain correlation of a video to predict a value of a current pixel by using pixel values of one or more encoded blocks of a current picture, so as to remove spatial-domain redundancies of the video.

In related arts, for implementing the inter encoding, a variety of prediction modes are proposed. An encoder selects one prediction mode as a target prediction mode from the variety of prediction modes, and uses the target prediction mode to encode a current block. When the encoder sends an encoded bitstream to a decoder, the encoded bitstream includes indication information of the target prediction mode. The decoder, after receiving the encoded bitstream, determines the target prediction mode based on the indication information, and decodes the current block according to the target prediction mode.

However, when the encoded bitstream carries the indication information of the target prediction mode, a plurality of bits may be used to represent the target prediction mode, and the large number of bits will lead to a large encoding cost, a poor encoding performance and a low decoding efficiency.

SUMMARY

The present disclosure provides a decoding method and apparatus, an encoding method and apparatus, and a device, to improve coding performance.

The present disclosure provides a decoding method, including: determining prediction-mode flag information of a current block, where the prediction-mode flag information includes a flag value of each of one or more of N candidate prediction modes; and for each of the one or more of the N candidate prediction modes, the flag value of the candidate prediction mode being a first value indicates that the candidate prediction mode is used, or the flag value of the candidate prediction mode being a second value indicates that the candidate prediction mode is not used; and for the flag value of one of the N candidate prediction modes, in response to determining that the current block satisfies a decoding condition for the flag value of the candidate prediction mode, the flag value is read from flag indication information indicating whether to use the candidate prediction mode carried in an encoded bitstream of the current block, or in response to determining that the current block does not satisfy the decoding condition for the flag value of the candidate prediction mode, the flag value is a derived flag value of the candidate prediction mode; determining a target prediction mode used by the current block according to the prediction-mode flag information, where the target prediction mode is one of the N candidate prediction modes; and decoding the current block according to the target prediction mode.

The present disclosure provides an encoding method, including: determining a target prediction mode used by a current block, where the target prediction mode is one of N candidate prediction modes of the current block; determining prediction-mode flag information of the current block according to the target prediction mode, where the prediction-mode flag information includes a flag value of each of one or more of the N candidate prediction modes; for each of the one or more of the N candidate prediction modes, the flag value of the candidate prediction mode being a first value indicates that the candidate prediction mode is used, or the flag value of the candidate prediction mode being a second value indicates that the candidate prediction mode is not used; and encoding the current block according to the prediction-mode flag information, where for the flag value of one of the N candidate prediction modes included in the prediction-mode flag information, in response to determining that the current block satisfies a decoding condition for the flag value of the candidate prediction mode, an encoded bitstream of the current block carries flag indication information indicating whether to use the candidate prediction mode; or in response to determining that the current block does not satisfy the decoding condition for the flag value of the candidate prediction mode, the encoded bitstream of the current block does not carry flag indication information indicating whether to use the candidate prediction mode.

The present disclosure provides a decoding apparatus, including: a first determining module, configured to determine prediction-mode flag information of a current block, where the prediction-mode flag information includes a flag value of each of one or more of N candidate prediction modes, and for each of the one or more of the N candidate prediction modes, the flag value of the candidate prediction mode being a first value indicates that the candidate prediction mode is used, or the flag value of the candidate prediction mode being a second value indicates that the candidate prediction mode is not used; and for the flag value of one of the N candidate prediction modes, in response to determining that the current block satisfies a decoding condition for the flag value of the candidate prediction mode, the flag value is read from flag indication information indicating whether to use the candidate prediction mode carried in an encoded bitstream of the current block; or in response to determining that the current block does not satisfy the decoding condition for the flag value of the candidate prediction mode, the flag value is a derived flag value of the candidate prediction mode; a second determining module, configured to determine a target prediction mode used by the current block according to the prediction-mode flag information, where the target prediction mode is one of the N candidate prediction modes; and a decoding module, configured to decode the current block according to the target prediction mode.

The present disclosure provides an encoding apparatus, including: a first determining module, configured to determine a target prediction mode used by a current block, where the target prediction mode is one of N candidate prediction modes of the current block; a second determining module, configured to determine prediction-mode flag information of the current block according to the target prediction mode, where the prediction-mode flag information includes a flag value of each of one or more of the N candidate prediction modes; where the flag value being a first value indicates that the candidate prediction mode is used, or the flag value being a second value indicates that the candidate prediction mode is not used; and an encoding module, configured to encode the current block according to the prediction-mode flag information, where for the flag value of one of the N candidate prediction modes included in the prediction-mode flag information, in response to determining that the current block satisfies a decoding condition for the flag value of the candidate prediction mode, an encoded bitstream of the current block carries flag indication information indicating whether to use the candidate prediction mode; or in response to determining that the current block does not satisfy the decoding condition for the flag value of the candidate prediction mode, the encoded bitstream of the current block does not carry flag indication information indicating whether to use the candidate prediction mode.

The present disclosure provides a decoding device, including a processor and a machine-readable storage medium, where the machine-readable storage medium stores machine-executable instructions that can be invoked by the processor; The processor is configured to invoke the machine-executable instructions to implement: determining prediction-mode flag information of a current block, where the prediction-mode flag information includes a flag value of each of one or more of N candidate prediction modes; and for each of the one or more of the N candidate prediction modes, the flag value of the candidate prediction mode being a first value indicates that the candidate prediction mode is used, or the flag value of the candidate prediction mode being a second value indicates that the candidate prediction mode is not used; and for the flag value of one of the N candidate prediction modes, in response to determining that the current block satisfies a decoding condition for the flag value of the candidate prediction mode, the flag value is read from flag indication information indicating whether to use the candidate prediction mode carried in an encoded bitstream of the current block, or in response to determining that the current block does not satisfy the decoding condition for the flag value of the candidate prediction mode, the flag value is a derived flag value of the candidate prediction mode; determining a target prediction mode used by the current block according to the prediction-mode flag information, where the target prediction mode is one of the N candidate prediction modes; and decoding the current block according to the target prediction mode.

The present disclosure provides an encoding device, which includes a processor and a machine-readable storage medium, where the machine-readable storage medium stores machine-executable instructions that can be invoked by the processor; The processor is configured to invoke the machine-executable instructions to implement: determining a target prediction mode used by a current block, where the target prediction mode is one of N candidate prediction modes of the current block; determining prediction-mode flag information of the current block according to the target prediction mode, where the prediction-mode flag information includes a flag value of each of one or more of the N candidate prediction modes, and for each of the one or more of the N candidate prediction modes, the flag value of the candidate prediction mode being a first value indicates that the candidate prediction mode is used, or the flag value of the candidate prediction mode being a second value indicates that the candidate prediction mode is not used; and encoding the current block according to the prediction-mode flag information, where for the flag value of one of the N candidate prediction modes included in the prediction-mode flag information, in response to determining that the current block satisfies a decoding condition for the flag value of the candidate prediction mode, an encoded bitstream of the current block carries flag indication information indicating whether to use the candidate prediction mode; or in response to determining that the current block does not satisfy the decoding condition for the flag value of the candidate prediction mode, the encoded bitstream of the current block does not carry flag indication information indicating whether to use the candidate prediction mode.

From the solutions above, it can be seen that in embodiments of the present disclosure, when prediction-mode flag information of a current block is determined, for a flag value of each candidate prediction mode, if the current block does not satisfy the decoding condition of the flag value of the candidate prediction mode, the flag value is a derived flag value of the candidate prediction mode, and not decoded from an encoded bitstream, i.e., the encoded bitstream does not need to carry the flag value of the candidate prediction mode, therefore, a number of bits in the encoded bitstream is reduced, the encoding cost is lowered, the encoding performance is improved, the process of decoding a prediction mode is simplified, and the efficiency of decoding a prediction mode is improved.

In some embodiments, the present disclosure provides a decoding method including: determining prediction-mode flag information of a current block, wherein the prediction-mode flag information includes one or more of: a flag value of subblock merge mode, a flag value of regular merge mode, a flag value of motion vector differences (MMVD) mode or a flag value of combine inter intra prediction (CIIP) mode; wherein, for a prediction mode, in response to determining that the current block satisfies a decoding condition for the flag value of the prediction mode, the flag value of the prediction mode is read from flag indication information indicating whether to enable the prediction mode carried in an encoded bitstream of the current block, or in response to determining that the current block does not satisfy the decoding condition for the flag value of the prediction mode, the flag value of the prediction mode is a derived flag value of the prediction mode; determining a target prediction mode used by the current block according to the prediction-mode flag information; and decoding the current block according to the target prediction mode.

In some embodiments, determining prediction-mode flag information of a current block includes: acquiring the flag value of the subblock merge mode. Determining a target prediction mode used by the current block according to the prediction-mode flag information, includes: in response to determining that the flag value of the subblock merge mode is a first value, determining that the target prediction mode used by the current block is the subblock merge mode.

In some embodiments, determining prediction-mode flag information of a current block, further includes: in response to determining that the flag value of the subblock merge mode is a second value, acquiring the flag value of the regular merge mode; in response to determining that the flag value of the regular merge mode is the first value, acquiring the flag value of the MMVD mode. Determining a target prediction mode used by the current block according to the prediction-mode flag information, includes: in response to determining that the flag value of the MMVD mode is a first value, determining that the target prediction mode used by the current block is the MMVD mode; in response to determining that the flag value of the MMVD mode is a second value, determining that the target prediction mode used by the current block is the regular merge mode.

In some embodiments, determining prediction-mode flag information of a current block, further includes: in response to determining that the flag value of the subblock merge mode is a second value, acquiring the flag value of the regular merge mode; in response to determining that the flag value of the regular merge mode is the second value, acquiring the flag value of the CIIP mode. Determining a target prediction mode used by the current block according to the prediction-mode flag information, includes: in response to determining that the flag value of the CIIP mode is a first value, determining that the target prediction mode used by the current block is the CIIP mode.

In some embodiments, determining a target prediction mode used by the current block according to the prediction-mode flag information, further includes: in response to determining that the flag value of the CIIP mode is a second value, determining that the target prediction mode used by the current block is geometrical partitioning (GEO) mode.

In some embodiments, acquiring the flag value of the subblock merge mode, includes: in response to determining that the current block satisfies a decoding condition for the flag value of the subblock merge mode, reading the flag value of the subblock merge mode from flag indication information indicating whether to enable the subblock merge mode carried in an encoded bitstream of the current block; or in response to determining that the current block does not satisfy the decoding condition for the flag value of the subblock merge mode, the flag value of the subblock merge mode is a derived flag value of the subblock merge mode; wherein, in response to determining that the current block satisfies a decoding condition for the flag value of the subblock merge mode, the flag value of the subblock merge mode being the first value or the second value is acquired by decoding flag indication information for the subblock merge mode; or in response to determining that the current block does not satisfy the decoding condition for the flag value of the subblock merge mode, the derived flag value of the subblock merge mode is the second value.

In some embodiments, the current block satisfying the decoding condition for the flag value of the subblock merge mode, includes: the current block enables the subblock merge mode; the width of the current block is greater than or equal to 8, and the length of the current block is greater than or equal to 8.

In some embodiments, acquiring the flag value of the regular merge mode, includes: in response to determining that the current block satisfies a decoding condition for the flag value of the regular merge mode, reading the flag value of the regular merge mode from flag indication information indicating whether to enable the regular merge mode carried in an encoded bitstream of the current block; or in response to determining that the current block does not satisfy the decoding condition for the flag value of the regular merge mode, the flag value of the regular merge mode is a derived flag value of the regular merge mode; wherein, in response to determining that the current block satisfies a decoding condition for the flag value of the regular merge mode, the flag value of the regular merge mode being the first value or the second value is acquired by decoding flag indication information for the regular merge mode; or in response to determining that the current block does not satisfy the decoding condition for the flag value of the regular merge mode, determining that the derived flag value of the regular merge mode is the first value.

In some embodiments, the current block satisfying the decoding condition for the flag value of the regular merge mode, includes: sequence-level control information allows the current block to enable the CIIP mode, an area of the current block is greater than or equal to 64; the width of the current block is smaller than 128, the length of the current block is smaller than 128, and the skip mode is disabled for the current block.

In some embodiments, the current block satisfying the decoding condition for the flag value of the regular merge mode, includes: the width of the current block is greater than or equal to 8, the length of the current block is greater than or equal to 8, a slice type of a picture containing the current block is B slice, and the current block is allowed to enable the GEO mode according to sequence-level control information.

In some embodiments, acquiring the flag value of the MMVD mode, includes: in response to determining that the current block satisfies a decoding condition for the flag value of the MMVD mode, reading the flag value of the MMVD mode from flag indication information indicating whether to enable the MMVD mode carried in an encoded bitstream of the current block; or in response to determining that the current block does not satisfy the decoding condition for the flag value of the MMVD mode, the flag value of the MMVD mode is a derived flag value of the MMVD mode; wherein, in response to determining that the current block satisfies the decoding condition for the flag value of the MMVD mode, the flag value of the MMVD mode being is the first value or the second value is acquired by decoding flag indication information for the MMVD mode; or in response to determining that the current block does not satisfy the decoding condition for the flag value of the MMVD mode, the derived flag value of the MMVD mode is the second value.

In some embodiments, the current block satisfying the decoding condition for the flag value of the MMVD mode, includes: the flag value of the regular mode is the first value, and the current block is allowed to enable the MMVD mode according to sequence-level control information.

In some embodiments, acquiring the flag value of the CIIP mode, includes: in response to determining that the current block satisfies a decoding condition for the flag value of the CIIP mode, reading the flag value of the CIIP mode from flag indication information indicating whether to enable the CIIP mode carried in an encoded bitstream of the current block; or in response to determining that the current block does not satisfy the decoding condition for the flag value of the CIIP mode, the flag value of the CIIP mode is a derived flag value of the CIIP mode; wherein, in response to determining that the current block satisfies the decoding condition for the flag value of the CIIP mode, the flag value of the CIIP mode being the first value or the second value is acquired by decoding flag indication information for the CIIP mode; or in response to determining that the current block does not satisfy the decoding condition for the flag value of the CIIP mode, according to that the current block satisfies all conditions to enable the CIIP mode, the derived flag value of the CIIP mode is the first value, or according to the current block dose not satisfy all conditions to enable the CIIP mode, the derived flag value of the CIIP mode is the second value.

In some embodiments, the current block satisfying the decoding condition for the flag value of the CIIP mode, includes: the current block is allowed to enable the CIIP mode according to sequence-level control information, the current block is allowed to enable the GEO mode according to sequence-level control information, a slice type of a picture containing the current block is B slice, the skip mode is disabled for the current block, the width of the current block is greater than or equal to 8, the length of the current block is greater than or equal to 8, the width of the current block is smaller than 128, and the length of the current block is smaller than 128.

In some embodiments, the first value is 1, and the second value is 0.

In some embodiments, the present disclosure provides an encoding method, including: determining a target prediction mode used by a current block; determining prediction-mode flag information of the current block according to the target prediction mode; and encoding the current block according to the prediction-mode flag information; wherein, the prediction-mode flag information includes one or more of: a flag value of subblock merge mode, a flag value of regular merge mode, a flag value of motion vector differences (MMVD) mode or a flag value of combine inter intra prediction (CIIP) mode; for a flag value of a prediction mode, in response to determining that the current block satisfies an encoding condition for the flag value of the prediction mode, encoding the flag value of the prediction mode in flag indication information indicating whether to enable the prediction mode carried in an encoded bitstream of the current block; or in response to determining that the current block does not satisfy the encoding condition for the flag value of the prediction mode, not encoding the flag value of the prediction mode in flag indication information indicating whether to enable the prediction mode carried in an encoded bitstream of the current block.

In some embodiments, the present disclosure provides a decoding method, including: acquiring the flag value of the subblock merge mode; in response to determining that the flag value of the subblock merge mode is 1, determining that the target prediction mode used by the current block is the subblock merge mode; wherein, in response to determining that the current block satisfies a decoding condition for the flag value of the subblock merge mode, the flag value of the subblock merge mode being 1 or 0 is acquired by decoding flag indication information for the subblock merge mode; or in response to determining that the current block does not satisfy the decoding condition for the flag value of the subblock merge mode, the derived flag value of the subblock merge mode is 0.

In some embodiments, the present disclosure provides a decoding method, including: acquiring the flag value of the subblock merge mode; in response to determining that the flag value of the subblock merge mode is 0, acquiring the flag value of the regular merge mode; in response to determining that the flag value of the regular merge mode is 1, acquiring the flag value of the MMVD mode; in response to determining that the flag value of the MMVD mode is 1, determining that the target prediction mode used by the current block is the MMVD mode; wherein, in response to determining that the current block satisfies a decoding condition for the flag value of the subblock merge mode, the flag value of the subblock merge mode being 0 is acquired by decoding flag indication information for the subblock merge mode; or in response to determining that the current block does not satisfy the decoding condition for the flag value of the subblock merge mode, the derived flag value of the subblock merge mode is 0; wherein, in response to determining that the current block satisfies a decoding condition for the flag value of the regular merge mode, the flag value of the regular merge mode being 1 is acquired by decoding flag indication information for the regular merge mode; or in response to determining that the current block does not satisfy the decoding condition for the flag value of the regular merge mode, determining that the derived flag value of the regular merge mode is 1; wherein, in response to determining that the current block satisfies a decoding condition for the flag value of the MMVD mode, the flag value of the MMVD mode being 1 is acquired by decoding flag indication information for the MMVD mode; or in response to determining that the current block does not satisfy the decoding condition for the flag value of the MMVD mode, the derived flag value of the MMVD mode is 1.

In some embodiments, the present disclosure provides a decoding method, including: acquiring the flag value of the subblock merge mode; in response to determining that the flag value of the subblock merge mode is 0, acquiring the flag value of the regular merge mode; in response to determining that the flag value of the regular merge mode is 1, acquiring the flag value of the MMVD mode; in response to determining that the flag value of the MMVD mode is 0, determining that the target prediction mode used by the current block is the regular merge mode; wherein, in response to determining that the current block satisfies a decoding condition for the flag value of the subblock merge mode, the flag value of the subblock merge mode being 0 is acquired by decoding flag indication information for the subblock merge mode; or in response to determining that the current block does not satisfy the decoding condition for the flag value of the subblock merge mode, the derived flag value of the subblock merge mode is 0; wherein, in response to determining that the current block satisfies a decoding condition for the flag value of the regular merge mode, the flag value of the regular merge mode being 1 is acquired through decoding flag indication information for the regular merge mode; or in response to determining that the current block does not satisfy the decoding condition for the flag value of the regular merge mode, determining that the derived flag value of the regular merge mode is 1; wherein, in response to determining that the current block satisfies a decoding condition for the flag value of the MMVD mode, the flag value of the MMVD mode being 0 is acquired by decoding flag indication information for the MMVD mode; or in response to determining that the current block does not satisfy the decoding condition for the flag value of the MMVD mode, the derived flag value of the MMVD mode is 0.

In some embodiments, the present disclosure provides a decoding method, including: acquiring the flag value of the subblock merge mode; in response to determining that the flag value of the subblock merge mode is 0, acquiring the flag value of the regular merge mode; in response to determining that the flag value of the regular merge mode is 0, acquiring the flag value of the CIIP mode; in response to determining that the flag value of the CIIP mode is 1, determining that the target prediction mode used by the current block is the CIIP mode; wherein, in response to determining that the current block satisfies a decoding condition for the flag value of the subblock merge mode, the flag value of the subblock merge mode being 0 is acquired by decoding flag indication information for the subblock merge mode; or in response to determining that the current block does not satisfy the decoding condition for the flag value of the subblock merge mode, the derived flag value of the subblock merge mode is 0; wherein, in response to determining that the current block satisfies a decoding condition for the flag value of the regular merge mode, the flag value of the regular merge mode being 0 is acquired by decoding flag indication information for the regular merge mode; wherein, in response to determining that the current block satisfies a decoding condition for the flag value of the CIIP mode, the flag value of the CIIP mode being 1 is acquired by decoding flag indication information for the CIIP mode; or in response to determining that the current block does not satisfy the decoding condition for the flag value of the CIIP mode, according to that the current block satisfies all conditions to enable the CIIP mode, the derived flag value of the CIIP mode is 1.

In some embodiments, the present disclosure provides a decoding method, including: acquiring the flag value of the subblock merge mode; in response to determining that the flag value of the subblock merge mode is 0, acquiring the flag value of the regular merge mode; in response to determining that the flag value of the regular merge mode is 0, acquiring the flag value of the CIIP mode; in response to determining that the flag value of the CIIP mode is 0, determining that the target prediction mode used by the current block is the GEO mode; wherein, in response to determining that the current block satisfies a decoding condition for the flag value of the subblock merge mode, the flag value of the subblock merge mode being 0 is acquired through decoding flag indication information for the subblock merge mode; or in response to determining that the current block does not satisfy the decoding condition for the flag value of the subblock merge mode, the derived flag value of the subblock merge mode is 0; wherein, in response to determining that the current block satisfies a decoding condition for the flag value of the regular merge mode, the flag value of the regular merge mode being 0 is acquired by decoding flag indication information for the regular merge mode; wherein, in response to determining that the current block satisfies a decoding condition for the flag value of the CIIP mode, the flag value of the CIIP mode being 0 is acquired by decoding flag indication information for the CIIP mode; or in response to determining that the current block does not satisfy the decoding condition for the flag value of the CIIP mode, according to the current block dose not satisfy all conditions to enable the CIIP mode, the derived flag value of the CIIP mode is 0.

In some embodiments, the present disclosure provides an encoding method, including: determining a target prediction mode used by a current block; in response to determining that the target prediction mode is the subblock merge mode; determining a flag value of the subblock merge mode is 1.

In some embodiments, in response to determining that the current block satisfies an encoding condition for the flag value of the subblock merge mode, an encoded bitstream of the current block carries flag indication information indicating whether to enable the subblock merge mode, wherein the flag value of the subblock merge mode indicated by the flag indication information is 1; in response to determining that the current block does not satisfy the encoding condition for the flag value of the subblock merge mode, the encoded bitstream of the current block does not carry flag indication information indicating whether to enable the subblock merge mode.

In some embodiments, the present disclosure provides an encoding method, including: determining a target prediction mode used by a current block; in response to determining that the target prediction mode is a MMVD mode; determining a flag value of a subblock merge mode is 0, a flag value of a regular merge mode is 1, and a flag value of the MMVD mode is 1.

In some embodiments, in response to determining that the current block satisfies an encoding condition for the flag value of the subblock merge mode, an encoded bitstream of the current block carries flag indication information indicating whether to enable the subblock merge mode, wherein the flag value of the subblock merge mode indicated by the flag indication information is 0; in response to determining that the current block does not satisfy the encoding condition for the flag value of the subblock merge mode, the encoded bitstream of the current block does not carry flag indication information indicating whether to enable the subblock merge mode.

In some embodiments, in response to determining that the current block satisfies an encoding condition for the flag value of the regular merge mode, an encoded bitstream of the current block carries flag indication information indicating whether to enable the regular merge mode, wherein the flag value of the regular merge mode indicated by the flag indication information is 1; in response to determining that the current block does not satisfy the encoding condition for the flag value of the regular merge mode, the encoded bitstream of the current block does not carry flag indication information indicating whether to enable the regular merge mode.

In some embodiments, in response to determining that the current block satisfies an encoding condition for the flag value of the MMVD mode, an encoded bitstream of the current block carries flag indication information indicating whether to enable the MMVD mode, wherein the flag value of the MMVD mode indicated by the flag indication information is 1; in response to determining that the current block does not satisfy the encoding condition for the flag value of the MMVD mode, the encoded bitstream of the current block does not carry flag indication information indicating whether to enable the MMVD mode.

In some embodiments, the present disclosure provides an encoding method, including: determining a target prediction mode used by a current block; in response to determining that the target prediction mode is a regular merge mode; determining a flag value of a subblock merge mode is 0, a flag value of the regular merge mode is 1, and a flag value of a MMVD mode is 0.

In some embodiments, in response to determining that the current block satisfies an encoding condition for the flag value of the subblock merge mode, an encoded bitstream of the current block carries flag indication information indicating whether to enable the subblock merge mode, wherein the flag value of the subblock merge mode indicated by the flag indication information is 0; in response to determining that the current block does not satisfy the encoding condition for the flag value of the subblock merge mode, the encoded bitstream of the current block does not carry flag indication information indicating whether to enable the subblock merge mode.

In some embodiments, in response to determining that the current block satisfies an encoding condition for the flag value of the regular merge mode, an encoded bitstream of the current block carries flag indication information indicating whether to enable the regular merge mode, wherein the flag value of the regular merge mode indicated by the flag indication information is 1; in response to determining that the current block does not satisfy the encoding condition for the flag value of the regular merge mode, the encoded bitstream of the current block does not carry flag indication information indicating whether to enable the regular merge mode.

In some embodiments, in response to determining that the current block satisfies an encoding condition for the flag value of the MMVD mode, an encoded bitstream of the current block carries flag indication information indicating whether to enable the MMVD mode, wherein the flag value of the MMVD mode indicated by the flag indication information is 0; in response to determining that the current block does not satisfy the encoding condition for the flag value of the MMVD mode, the encoded bitstream of the current block does not carry flag indication information indicating whether to enable the MMVD mode.

In some embodiments, the present disclosure provides an encoding method, including: determining a target prediction mode used by a current block; in response to determining that the target prediction mode is a CIIP mode; determining a flag value of a subblock merge mode is 0, a flag value of a regular merge mode is 0, and a flag value of the CIIP mode is 1.

In some embodiments, in response to determining that the current block satisfies an encoding condition for the flag value of the subblock merge mode, an encoded bitstream of the current block carries flag indication information indicating whether to enable the subblock merge mode, wherein the flag value of the subblock merge mode indicated by the flag indication information is 0; in response to determining that the current block does not satisfy the encoding condition for the flag value of the subblock merge mode, the encoded bitstream of the current block does not carry flag indication information indicating whether to enable the subblock merge mode.

In some embodiments, in response to determining that the current block satisfies an encoding condition for the flag value of the regular merge mode, an encoded bitstream of the current block carries flag indication information indicating whether to enable the regular merge mode, wherein the flag value of the regular merge mode indicated by the flag indication information is 0; in response to determining that the current block does not satisfy the encoding condition for the flag value of the regular merge mode, the encoded bitstream of the current block does not carry flag indication information indicating whether to enable the regular merge mode.

In some embodiments, in response to determining that the current block satisfies an encoding condition for the flag value of the CIIP mode, an encoded bitstream of the current block carries flag indication information indicating whether to enable the CIIP mode, wherein the flag value of the CIIP mode indicated by the flag indication information is 1; in response to determining that the current block does not satisfy the encoding condition for the flag value of the CIIP mode, the encoded bitstream of the current block does not carry flag indication information indicating whether to enable the CIIP mode.

In some embodiments, the present disclosure provides an encoding method, including: determining a target prediction mode used by a current block; in response to determining that the target prediction mode is a GEO mode; determining a flag value of a subblock merge mode is 0, a flag value of a regular merge mode is 0, and a flag value of the CIIP mode is 0.

In some embodiments, in response to determining that the current block satisfies an encoding condition for the flag value of the subblock merge mode, an encoded bitstream of the current block carries flag indication information indicating whether to enable the subblock merge mode, wherein the flag value of the subblock merge mode indicated by the flag indication information is 0; in response to determining that the current block does not satisfy the encoding condition for the flag value of the subblock merge mode, the encoded bitstream of the current block does not carry flag indication information indicating whether to enable the subblock merge mode.

In some embodiments, in response to determining that the current block satisfies an encoding condition for the flag value of the regular merge mode, an encoded bitstream of the current block carries flag indication information indicating whether to enable the regular merge mode, wherein the flag value of the regular merge mode indicated by the flag indication information is 0; in response to determining that the current block does not satisfy the encoding condition for the flag value of the regular merge mode, the encoded bitstream of the current block does not carry flag indication information indicating whether to enable the regular merge mode.

In some embodiments, in response to determining that the current block satisfies an encoding condition for the flag value of the CIIP mode, an encoded bitstream of the current block carries flag indication information indicating whether to enable the CIIP mode, wherein the flag value of the CIIP mode indicated by the flag indication information is 0; in response to determining that the current block does not satisfy the encoding condition for the flag value of the CIIP mode, the encoded bitstream of the current block does not carry flag indication information indicating whether to enable the CIIP mode.

In some embodiments, the present disclosure provides a decoding device, comprising: a processor and a machine-readable storage medium, wherein the machine-readable storage medium stores machine-executable instructions that are invoked by the processor; wherein, the processor is configured to invoke the machine-executable instructions to implement any decoding method described above.

In some embodiments, the present disclosure provides an encoding device, comprising: a processor and a machine-readable storage medium, wherein the machine-readable storage medium stores machine-executable instructions that are invoked by the processor; wherein, the processor is configured to invoke the machine-executable instructions to implement any encoding method described above.

BRIEF DESCRIPTION OF THE DRAWINGS

FIG. 1 is a schematic diagram illustrating a framework of a video encoding system according to an embodiment of the present disclosure.

FIG. 2 is a flowchart illustrating a decoding method according to an embodiment of the present disclosure.

FIG. 3 is a flowchart illustrating an encoding method according to an embodiment of the present disclosure.

DETAILED DESCRIPTION OF THE EMBODIMENTS

Figure 4A:
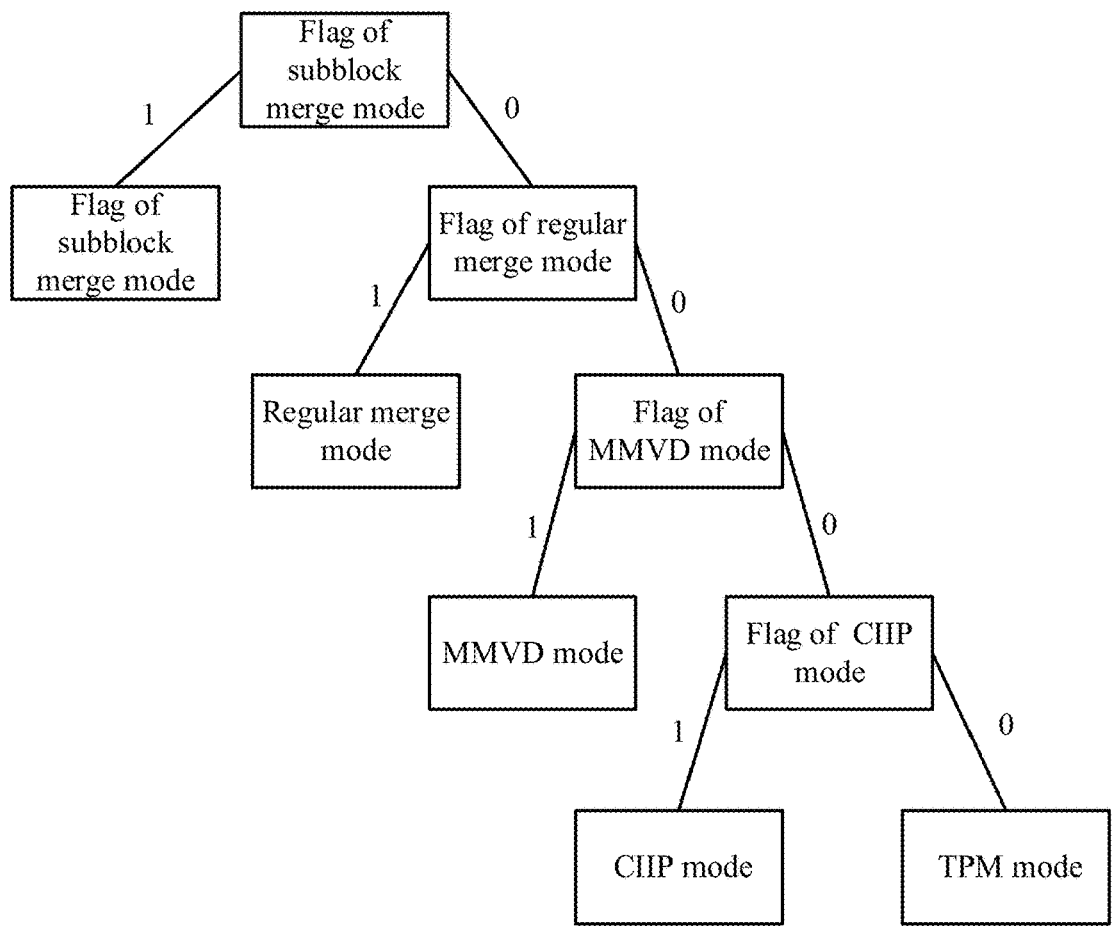
FIGS. 4A to 4J are schematic diagrams illustrating methods for encoding and decoding a flag of a prediction mode according to an embodiment of the present disclosure.

The terms used in the embodiments of the present disclosure are only for describing specific embodiments, rather than limiting the embodiments of the present disclosure. The singular forms of "a", "said" and "the" used in the present disclosure and claims are also intended to include plural forms, unless the context clearly indicates otherwise. It should also be understood that the term "and/or" as used herein refers to any one or all possible combinations of one or more associated listed items. It should be understood that although the terms such as first, second, third, etc. may be used in the embodiments of the present disclosure to describe various information, these information should not be limited by these terms. These terms are only used to distinguish the same type of information from each other. For example, without departing from the scope of the present disclosure, first information can also be referred to as second information, and similarly, second information can also be referred to as first information, thus, the selection of the terms depends on the context. In addition, the word "if" can be interpreted as "upon" or "when" or "in response to determining".

The embodiments of the present disclosure provide a decoding method, apparatus and device, which can relate to the following concepts.

Intra prediction and inter prediction technologies: intra prediction refers to an operation of utilizing a spatial-domain correlation of a video to predict a value of a current pixel by using pixel values of one or more encoded blocks of a current picture, so as to remove spatial-domain redundancies of the video; and inter prediction refers to an operation of utilizing a temporal-domain correlation of a video to predict pixel values of a current picture by using pixel values of one or more neighboring encoded pictures because sequences in the video have a relatively strong temporal-domain correlation, so as to remove temporal-domain redundancies of the video effectively. In main video encoding standards, inter prediction all use a block-based motion compensation technology of which the main principle is to find a best matching block in one or more previously encoded pictures for each pixel block of the current picture, where this process is referred to as Motion Estimation (ME).

Motion Vector (MV): in inter encoding, a motion vector may be used to represent a relative displacement between a current to-be-encoded block and a best matching block in a reference picture. Each block partitioned has a corresponding motion vector to be transmitted to a decoder. If the motion vector of each block is encoded and transmitted independently, especially when smaller-sized blocks are acquired by partition, more bits have to be consumed. For reducing the number of bits used to encode the motion vector, a spatial correlation between neighboring blocks may be utilized to predict the motion vector of a current to-be-encoded block based on the motion vectors of the neighboring encoded blocks, and then, a prediction difference is encoded. In such a way, the number of bits representing the motion vector can be effectively reduced. In the process of encoding the motion vector of the current block, firstly, the motion vector of the current block is predicted by using motion vectors of one or more neighboring encoded blocks, and then, a motion vector difference (MVD) between a motion vector prediction (MVP) value and a real estimation value of the motion vector is encoded, thereby effectively reducing the number of bits for encoding the MV.

Motion Information: because the motion vector represents a position offset of a current block relative to a reference block, for accurately acquiring the information of an indicated picture block, in addition to the motion vector, index information of a reference picture is also needed to indicate which reference picture is used. In a video encoding technology, for a current picture, a reference picture list may be established generally, and the index information of the reference picture specifies which reference picture listed in the reference picture list is used by a block of a current image. In addition, many encoding technologies also support multiple reference picture lists, thus, an index value may be used to indicate which reference picture list is used, and this index value can be referred to as a reference direction. In the video encoding technology, the information related to motion, such as motion vector, reference picture index, reference direction, and the like, may be collectively referred to as motion information.

Rate distortion optimized (RDO): there are two indicators for evaluating encoding efficiency: bit rate and peak signal to noise ratio (PSNR). The smaller the bitstream is, the larger the compression rate is; and the higher the PSNR is, the better the quality of a reconstructed picture is. In mode selection, a discriminant formula is essentially a comprehensive evaluation of the two indicators. For example, a cost corresponding to a mode can be calculated according to the following formula: $J(mode)=D+\lambda*R$, where D represents a distortion, usually measured by using a sum of squared differences (SSE) indicator, and SSE refers to a sum of squared differences between a reconstructed picture block and a source picture block; $\lambda$ represents a Lagrangian multiplier; R represents an actual number of bits required for encoding a picture block in this mode, including a total number of bits required for encoding mode information, motion information, residuals, etc.

The framework of video encoding system: as shown in FIG. 1, a framework of video encoding system can be used to implement the processing at an encoder according to an embodiment of the present disclosure. In addition, the schematic diagram of a framework of video decoding system is similar to FIG. 1, and thus will not be repeated here, and the framework of video decoding system can be used to implement the processing at a decoder according to an embodiment of the present disclosure. Specifically, in the framework of video encoding system and the framework of video decoding system, an intra prediction module, a motion estimation/motion compensation module, a reference picture buffer, an in-loop filtering module, a reconstruction module, a transform module, a quantization module, an inverse transform module, an inverse quantization module, an entropy encoder, etc. may be included. At the encoder, the processing at the encoder can be implemented through the cooperation of the modules, and at the decoder, the processing at the decoder can be implemented through the cooperation of the modules.

Flag coding: in video encoding, there are a plurality of prediction modes, such as a regular merge mode, and a subblock merge mode, etc., and for a block, a prediction mode may be used. For indicating which prediction mode is used, each block needs to be labeled by encoding a corresponding flag. That is, at the encoder, a value of a flag may be determined, and then the flag is encoded and transmitted to a decoder; and at the decoder, the flag is decoded to determine whether a corresponding prediction mode is used.

Merge modes: merge modes include: a regular merge mode, a subblock merge mode, (i.e., a merge mode using subblock motion information), a MMVD mode (i.e., a merge mode encoding motion vector differences, which may be called Merge with MVD mode, and referred to as MMVD mode in the present disclosure), a CIIP mode (i.e., a merge mode of combining intra prediction with inter prediction to generate a new prediction value, which can be called combine inter intra prediction mode, and referred to as CIIP mode), a TPM mode (i.e., a merge mode for triangular prediction, which may be called geometric partitioning merge mode with triangular partition, and referred to as TPM mode in the present disclosure), and a GEO mode (i.e., a merge mode based on arbitrary geometrical partitioning shape, which may be called Geometrical Partitioning, and referred to as GEO mode in the present disclosure).

Skip mode: skip mode is a special merge mode, and the skip mode differs from the merge mode in that the skip mode does not need to encode a residual. If a current block is in the skip mode, the CIIP mode is disabled by default, but the regular merge mode, the subblock merge mode, the MMVD mode, the TPM mode and the GEO mode are still applicable.

As an example, how to generate a prediction value may be determined based on the regular merge mode, the subblock merge mode, the MMVD mode, the TPM mode and the GEO mode, etc. After the prediction values is generated, for the merge mode, a reconstruction value may be acquired by using the prediction value and a residual value; and for the skip mode, because no residual value exists, a reconstruction value may be acquired by directly using the prediction value.

Slice Type: if a slice of current picture cannot be encoded with reference to the information of other slices, the slice of current picture may be an I slice; if the slice of current picture is allowed to be encoded with reference to the information of certain one slice (but no more than one slice), the slice of current picture may be a P slice; and if the slice of current picture is allowed to be encoded with reference to the information of the other one slice or two slices, the slice of current picture may be a B slice.

Sequence parameter set (SPS): in a sequence parameter set, there are flags that determine whether certain tools are allowed to be enabled or disabled in a whole sequence. If a value of a flag is 1, a tool corresponding to the flag is allowed to be used in a video sequence; and if a value of a flag is 0, in a video sequence, a tool corresponding to the flag is not allowed to be used in the encoding process.

Regular merge mode: motion information is selected from a candidate motion information list, and then a prediction value of a current block is generated based on the motion information, where the candidate motion information list includes: candidate motion information of one or more spatial neighboring blocks, candidate motion information of one or more temporal neighboring blocks, candidate motion information of one or more spatial non-neighboring block, motion information acquired by combining encoded or obtained usable motion information, default motion information, etc.

MMVD mode: based on the candidate motion information list of the regular merge mode, motion information is selected from the candidate motion information list of the regular merge mode as reference motion information, a motion information difference is acquired by using a table look-up method, final motion information is acquired based on the reference motion information and the motion information difference, and a prediction value of a current block is generated based on the final motion information.

Subblock merge mode: the subblock merge mode includes an Affine merge mode and a subblock-based temporal motion vector prediction (TMVP) mode.

The Affine merge mode, similar to the regular merge mode, is also implemented by selecting motion information from a candidate motion information list, and generating a prediction value of a current block based on the motion information. The Affine merge mode differs from the regular merge mode in that the motion information in the candidate motion information list of the regular merge mode is a translational motion vector with 2 parameters, but the motion information in the candidate motion information list of the Affine merge mode is Affine motion information with 4 parameters, or Affine motion information with 6 parameters.

In the subblock-based TMVP mode, a prediction value of the current block is generated by directly using motion information of a certain block in a temporal reference picture, where each subblock in the block may be different in motion information.

CIIP mode: a new prediction value of the current block is acquired by combining an intra prediction value with an inter prediction value.

TPM mode: one block is partitioned into two triangular subblocks (a 45-degree triangular subblock and a 135-degree triangular subblock), where the two triangular subblocks have different unidirectional motion information, the TPM mode is only used in the prediction process and will not affect subsequent transformation and quantization processes, and the unidirectional motion information is also directly acquired from the candidate motion information list.

GEO mode: the GEO mode and the TPM mode are similar to each other, and only different in partitioning shape. In the GEO mode, one square block is partitioned into two subblocks in any shapes (any shapes besides the shapes of the two triangular subblocks of TPM), such as one triangular subblock and one pentagonal subblock; or one triangular subblock and one quadrilateral subblock; or two trapezoidal subblocks, and so on, and there is no restriction on this partitioning shape. The two subblocks partitioned in the GEO mode have different unidirectional motion information.

From the examples above, it can be seen that the merge modes and skip mode provided in the embodiments refer to one type of prediction modes implemented by directly selecting information from a candidate motion information list to generate a prediction value of a current block. In these prediction modes, a motion estimation process is not required at an encoder, and except the MMVD mode, a motion information difference does not need to be encoded in the other modes.

In related arts, an encoder needs to select one prediction mode as a target prediction mode from a variety of prediction modes (such as the regular merge mode, the MMVD mode, the CIIP mode, the TPM mode, the subblock merge mode, etc.), for example, the target prediction mode is the subblock merge mode, and a current block is encoded by using the subblock merge mode. When an encoder sends an encoded bitstream to a decoder, the encoded bitstream may include indication information of the subblock merge mode, such as 0001, which is used to represent the subblock merge mode. After the decoder receives the encoded bitstream, the indication information 0001 is decoded from the encoded bitstream, the subblock merge mode is determined as the target prediction mode based on the indication information, and the current block is decoded according to the subblock merge mode. However, in the above mode, four bits are needed to represent the subblock merge mode, thus, the number of bits is large, the encoding cost is high, and the encoding performance is poor.

For example, as shown in Table 1A, for saving the cost of encoding flags, there are often some restriction conditions on the encoding of each flag, and only when restriction conditions are satisfied, the encoding of corresponding flag can be carried out. Table 1B shows examples of flags of the merge modes, and Table 1C shows examples of flags of the skip mode. It can be seen from Table 1A that because there are restriction conditions on the encoding of the flag of each mode, and only when all the restriction conditions are satisfied, the mode can be enabled, i.e., the flag of the mode needs to be encoded. These restriction conditions can be known when a mode (i.e., the regular merge mode) is encoded. When a preceding flag is encoded, the encoding of the flag of the current mode may be skipped according to these restriction conditions, so as to save coding rate cost. It can be seen from Table 1B and Table 1C that the regular merge mode only needs one bit while the subblock merge mode needs three bits. According to inventors' analysis, a probability of using the subblock merge mode is usually higher than a probability of using the regular merge mode, therefore, flag encoding performed according to the modes as shown in Table 1B or Table 1C will result in a relatively large average code length of flag code of these modes.

TABLE 1C

|  | Flag of regular merge mode | Flag of MMVD mode | Flag of subblock merge mode |
|---|---|---|---|
| Regular merge mode | 1 | — | — |
| MMVD mode | 0 | 1 | — |
| Subblock merge mode | 0 | 0 | 1 |
| TPM mode | 0 | 0 | 0 |

In view of the above findings, in the embodiments of the present disclosure, the prediction modes with a high probability of use are preferentially encoded while the prediction modes with a low probability of use are encoded later, so that the number of bits for flag encoding is smaller on the whole. For example, if the subblock merge mode is a prediction mode with a high probability of use, "1" can be used to represent the subblock merge mode. Due to the high probability of using the subblock merge mode, it is a high probability that an encoded bitstream carries "1", thereby reducing the number of bits in the encoded bitstream, lowering the encoding cost and improving the encoding performance. If the CIIP mode is a prediction mode with a

TABLE 1A

| Mode | Restriction on size | Restriction on mode | Restriction on slice type | Restriction on sequence level |
|---|---|---|---|---|
| Regular merge mode | the area is greater than or equal to 32 | None | non-I slice | None |
| MMVD mode | the area is greater than or equal to 32 | the regular merge mode is disabled | non-I slice | the sequence level enables the MVMD mode |
| Subblock merge mode | both length and width are greater than or equal to 8 | the regular merge mode and the MMVD mode are disabled | non-I slice | the sequence level enables the Affine mode or the subblock-based TMVP mode |
| CIIP mode | the area is greater than or equal to 64, and the length and width are both smaller than 128 | the regular merge mode, the MMVD mode and the subblock merge mode are all disabled; and non-Skip mode | non-I slice | The sequence level enables the CIIP mode |
| TPM mode | the area is greater than or equal to 64 (and cannot be 128 × 128). | the regular merge mode, the MMVD mode, the subblock merge mode and the CIIP mode are all disabled | B-slice | the sequence level enables the TPM mode |

TABLE 1B

|  | Flag of regular merge mode | Flag of MMVD mode | Flag of subblock merge mode | Flag of CIIP mode |
|---|---|---|---|---|
| Regular merge mode | 1 | — | — | — |
| MMVD mode | 0 | 1 | — | — |
| Subblock merge mode | 0 | 0 | 1 | — |
| CIIP mode | 0 | 0 | 0 | 1 |
| TPM mode | 0 | 0 | 0 | 0 | low probability of use, "0001" can be used to represent the CIIP mode. Obviously, because the probability of using the CIIP mode is low, it is low probability that the encoded bitstream carries "0001".

Because there are restriction conditions on the encoding of the flag of each mode, and the prediction mode can be enabled only when all the restriction conditions are satisfied, i.e., the flag needs to be encoded. These restriction conditions can be known when a current prediction mode is encoded. When a preceding flag is encoded, the encoding of the flag of the current prediction mode may be skipped according to these conditions, so as to save coding rate cost.

For example, when encoding the regular merge mode, if based on current restriction conditions, it can be known that the MMVD mode, the CIIP mode, the TPM mode and the subblock merge mode are disabled, the flag of the regular merge mode may not be encoded. In this case, a decoder can know based on the current restriction conditions that the MMVD mode, the CIIP mode, the TPM mode and the subblock merge mode are disabled, and thus can only enable the regular merge mode. To sum up, without decoding the flag of the regular merge mode, the decoder can derive that the flag value of the regular merge mode is 1, thereby reducing the number of bits in an encoded bitstream, and improving the encoding performance.

The decoding method and encoding method provided in the embodiments of the present disclosure will be described as follows in combination with several specific embodiments.

Embodiment 1: FIG. 2 is a flowchart illustrating a decoding method, which may be applied to a decoder. The method includes the following steps.

At step 201, prediction-mode flag information of a current block is determined, where the prediction-mode flag information includes a flag value of each of one or more of N candidate prediction modes; when the flag value is a first value, it indicates that the candidate prediction mode is enabled, and when the flag value is a second value, it indicates that the candidate prediction mode is disabled.

At step 201, it is determined whether one or more of the N candidate prediction modes of the current block are enabled; according to the enablement of the one or more of the N candidate prediction modes, the decoder can determine a target prediction mode used by the current block from the N candidate prediction modes. The enablement of the one or more of the N candidate prediction modes may be understood as the enablement of at least one of the N candidate prediction modes, which is not restricted to enable all of the N candidate prediction modes.

As an example, for a flag value of any one candidate prediction mode included in the prediction-mode flag information, if the current block satisfies decoding condition of the flag value of the candidate prediction mode, the flag value may be read from flag indication information indicating whether to enable the candidate prediction mode carried in the encoded bitstream of the current block; and if the current block does not satisfy the decoding condition of the flag value of the candidate prediction mode, the flag value may be a derived flag value of the candidate prediction mode, where the derived flag value of the candidate prediction mode may be pre-configured at the encoder and the decoder.

As an example, the first value may be 1 to indicate that the candidate prediction mode is enabled, and the second value may be 0 to indicate that the candidate prediction mode is disabled; or alternatively, the first value may be 0 to indicate that the candidate prediction mode is enabled, and the second value may be 1 to indicate that the candidate prediction mode is disabled. Of course, the foregoing is just an example and there is no restriction on this. For example, the first value may be a, and the second value may be b, and so on. For the convenience of description, in subsequent embodiments, With the first value 1 and the second value 0 as an example, the flag value in subsequent embodiments is 1 to indicate that the flag value is the first value, and the bit value in subsequent embodiments is 0 to indicate that the flag value is the second value.

As an example, if the prediction-mode flag information includes the flag values of three candidate prediction modes, the three candidate prediction modes may be denoted as a candidate prediction mode 1, a candidate prediction mode 2 and a candidate prediction mode 3 respectively.

For the flag value of the candidate prediction mode 1, if the current block satisfies the decoding condition of the flag value of the candidate prediction mode 1, the flag value is read from flag indication information indicating whether to enable the candidate prediction mode 1 carried in an encoded bitstream of the current block. For example, if the flag indication information indicating whether to enable the candidate prediction mode 1 carried in the encoded bitstream includes a numerical value 0, the flag value of the candidate prediction mode 1 is 0; and if the flag indication information indicating whether to enable the candidate prediction mode 1 carried in the encoded bitstream includes a numerical value 1, the flag value of the candidate prediction mode 1 is 1. If the current block does not satisfy the decoding condition of the flag value of the candidate prediction mode 1, the flag value is a derived flag value of the candidate prediction mode 1. For example, the flag value of the candidate prediction mode 1 is directly derived to be 1 or 0.

For the flag value of the candidate prediction mode 2, if the current block satisfies the decoding condition of the flag value of the candidate prediction mode 2, the flag value is read from flag indication information indicating whether to enable the candidate prediction mode 2 carried in the encoded bitstream of the current block. If the current block does not satisfy the decoding condition of the flag value of the candidate prediction mode 2, the flag value is a derived flag value of the candidate prediction mode 2. For the flag value of the candidate prediction mode 3, if the current block satisfies the decoding condition of the flag value of the candidate prediction mode 3, the flag value is read from flag indication information indicating whether to enable the candidate prediction mode 3 carried in the encoded bitstream of the current block. If the current block does not satisfy the decoding condition of the flag value of the candidate prediction mode 3, the flag value is a derived flag value of the candidate prediction mode 3.

In a possible implementation, the N candidate prediction modes include but are not limited to one or more of the flowing prediction modes: the subblock merge mode, the regular merge mode, the MMVD mode, the CIIP mode, the TPM mode and the GEO mode. Of course, the foregoing is just examples of candidate prediction modes, and the candidate prediction modes are not restricted, and may be any candidate prediction mode.

In a possible implementation, the step of determining the prediction-mode flag information of the current block may include but is not limited to: determining the prediction-mode flag information according to an acquisition sequence of flag values of N candidate prediction modes.

As an example, if the N candidate prediction modes include the subblock merge mode, the regular merge mode, the MMVD mode, and the CIIP mode, the acquisition sequence of the flag values of the N candidate prediction modes, from front to back, may sequentially be: the flag value of the subblock merge mode, the flag value of the regular merge mode, the flag value of the MMVD mode, and the flag value of the CIIP mode. Of course, the foregoing is just an example, and other acquisition sequences also can be used without restriction. For example, the acquisition sequence may also be: the flag value of the regular merge mode, the flag value of the subblock merge mode, the flag value of the MMVD mode, and the flag value of the CIIP mode. For another example, the acquisition sequence may also be: the flag value of the MMVD mode, the flag value of the subblock merge mode, the flag value of the regular merge mode, and the flag value of the CIIP mode.

As an example, if the N candidate prediction modes include the subblock merge mode, the regular merge mode, the MMVD mode, the CIIP mode, and the GEO mode, the acquisition sequence of the flag values of the N candidate prediction modes, from front to back, may sequentially be: the flag value of the subblock merge mode, the flag value of the regular merge mode, the flag value of the MMVD mode, the flag value of the CIIP mode, and the flag value of the GEO mode. Of course, the foregoing is just an example, and other acquisition sequences also can be used without restriction. For example, the acquisition sequence, from front to back, also may sequentially be: the flag value of the regular merge mode, the flag value of the subblock merge mode, the flag value of the MMVD mode, the flag value of the CIIP mode, and the flag value of the GEO mode.

As an example, the N candidate prediction modes also may include other possibilities that, for example, the N candidate prediction modes include the subblock merge mode, the regular merge mode, and the MMVD mode; and for another example, the N candidate prediction modes include the subblock merge mode, the regular merge mode and the CIIP mode. Therefore, the N candidate prediction modes are not restricted and can be set according to actual needs.

In a possible implementation, the step of determining the prediction-mode flag information in accordance with the acquisition sequence of the flag values of N candidate prediction modes may include but not limited to the following sub-step that: based on the acquisition sequence of the flag values of the N candidate prediction modes, after the flag value of the current candidate prediction mode is acquired, whether to acquire the flag values of the candidate prediction modes behind the current candidate prediction mode may be determined according to the flag value of the current candidate prediction mode.

As an example, if the acquisition sequence of the flag values of the N candidate prediction modes, from front to back, sequentially is: the flag value of the candidate prediction mode 1, the flag value of the candidate prediction mode 2 and the flag value of the candidate prediction mode 3. After the flag value of the candidate prediction mode 1 is acquired, whether to acquire the flag value of the candidate prediction mode 2 and the flag value of the candidate prediction mode 3 may be determined according to the flag value of the candidate prediction mode 1; and after the flag value of the candidate prediction mode 2 is acquired, whether to acquire the flag value of the candidate prediction mode 3 may be determined according to the flag value of the candidate prediction mode 2.

For another example, if the acquisition sequence of the flag values of the N candidate prediction modes, from front to back, sequentially is: the flag value of the subblock merge mode, the flag value of the regular merge mode, the flag value of the MMVD mode, and the flag value of the CIIP mode. After the flag value of the subblock merge mode is acquired, whether to acquire the flag value of the regular merge mode, the flag value of the MMVD mode, and the flag value of the CIIP mode may be determined according to the flag value of the subblock merge mode; and after the flag value of the regular merge mode is acquired, whether to acquire the flag value of the MMVD mode and the flag value of the CIIP mode may be determined according to the flag value of the regular merge mode and so on, and no redundant descriptions are made herein.

For the flag value of the subblock merge mode, if the current block satisfies the decoding condition of the flag value of the subblock merge mode, the flag value is read from the flag indication information indicating whether to enable the subblock merge mode carried in the encoded bitstream of the current block. For example, if the flag indication information indicating whether to enable the subblock merge mode carried in the encoded bitstream includes a numerical value 0, the flag value of the subblock merge mode is 0; and if the flag indication information indicating whether to enable the subblock merge mode carried in the encoded bitstream includes a numerical value 1, the flag value of the subblock merge mode is 1. If the current block does not satisfy the decoding condition of the flag value of the subblock merge mode, the flag value is a derived flag value of the subblock merge mode. For example, the flag value of the subblock merge mode is directly derived to be 1 or 0. When the flag value of the subblock merge mode is 1, it indicates that the subblock merge mode is enabled; and when the flag value of the subblock merge mode is 0, it indicates that the subblock merge mode is disabled.

For the flag value of the regular merge mode, if the current block satisfies the decoding condition of the flag value of the regular merge mode, the flag value is read from flag indication information indicating whether to enable the regular merge mode carried in the encoded bitstream of the current block. For example, if the flag indication information indicating whether to enable the regular merge mode carried in the encoded bitstream includes a numerical value 0, the flag value of the regular merge mode is 0; and if the flag indication information indicating whether to enable the regular merge mode carried in the encoded bitstream includes a numerical value 1, the flag value of the regular merge mode is 1. If the current block does not satisfy the decoding condition of the flag value of the regular merge mode, the flag value is a derived flag value of the regular merge mode. For example, the flag value of the regular merge mode is directly derived to be 1 or 0. When the flag value of the regular merge mode is 1, it indicates that the regular merge mode is enabled; and when the flag value of the regular merge mode is 0, it indicates that the regular merge mode is disabled.

For the flag value of the MMVD mode, if the current block satisfies the decoding condition of the flag value of the MMVD mode, the flag value is read from flag indication information indicating whether to enable the MMVD mode carried in the encoded bitstream of the current block. For example, if the flag indication information indicating whether to enable the MMVD mode carried in the encoded bitstream includes a numerical value 0, the flag value of the MMVD mode is 0; and if the flag indication information indicating whether to enable the MMVD mode carried in the encoded bitstream includes a numerical value 1, the flag value of the MMVD mode is 1. If the current block does not satisfy the decoding condition of the flag value of the MMVD mode, the flag value is a derived flag value of the MMVD mode. For example, the flag value of the MMVD mode is directly derived to be 1 or 0. When the flag value of the MMVD mode is 1, it indicates that the MMVD mode is enabled; and when the flag value of the MMVD mode is 0, it indicates that the MMVD mode is disabled.

For the flag value of the CIIP mode, if the current block satisfies the decoding condition of the flag value of the CIIP mode, the flag value is read from flag indication information indicating whether to enable the CIIP mode carried in the encoded bitstream of the current block. For example, if the flag indication information indicating whether to enable the CIIP mode carried in the encoded bitstream includes a numerical value 0, the flag value of the CIIP mode may be 0; and if the flag indication information indicating whether to enable the CIIP mode carried in the encoded bitstream includes a numerical value 1, the flag value of the CIIP mode may be 1. If the current block does not satisfy the decoding condition of the flag value of the CIIP mode, the flag value is a derived flag value of the CIIP mode. For example, the flag value of the CIIP mode is directly derived to be 1 or 0. As an example, when the flag value of the CIIP mode is 1, it indicates that the CIIP mode is enabled; and when the flag value of the CIIP mode is 0, it indicates that the CIIP mode is disabled.

For the flag value of the GEO mode, if the current block satisfies the decoding condition of the flag value of the GEO mode, the flag value is read from flag indication information indicating whether to enable the GEO mode carried in the encoded bitstream of the current block. For example, if the flag indication information indicating whether to enable the GEO mode carried in the encoded bitstream includes a numerical value 0, the flag value of the GEO mode may be 0; and if the flag indication information indicating whether to enable the GEO mode carried in the encoded bitstream includes a numerical value 1, the flag value of the GEO mode may be 1. If the current block does not satisfy the decoding condition of the flag value of the GEO mode, the flag value is a derived flag value of the GEO mode. For example, the flag value of the GEO mode is directly derived to be 1 or 0. As an example, when the flag value of the GEO mode is 1, it indicates that the GEO mode is enabled; and when the flag value of the GEO mode is 0, it indicates that the GEO mode is disabled.

Step 202, a target prediction mode used by the current block is determined according to the prediction-mode flag information.

For a decoder, according to the prediction-mode flag information, one or more of N candidate prediction modes may be determined to enable, and then according to the enable of the one or more of the N candidate prediction modes and a pre-configured strategy, which candidate prediction mode is the target prediction mode of the current block is determined.

Step 203, the current block is decoded according to the target prediction mode, where the decoding process is not restricted.

From the above solutions, it can be seen that in the embodiments of the present disclosure, when prediction-mode flag information of the current block is determined, for the flag value of each candidate prediction mode, if the current block does not satisfy the decoding condition of the flag value of the candidate prediction mode, the flag value is a derived flag value of the candidate prediction mode, but not decoded from an encoded bitstream, i.e., the encoded bitstream does not need to carry the flag value of the candidate prediction mode. Therefore, the number of bits in the encoded bitstream is reduced, the encoding cost is lowered, the encoding performance is improved, the process of a decoding prediction mode is simplified, and the efficiency of the decoding prediction mode is improved.

Embodiment 2: FIG. 3 is a flowchart illustrating an encoding method, which may be applied to an encoder. The method includes the following steps:

Step 301, a target prediction mode used by a current block is determined, where the target prediction mode is one of N candidate prediction modes of the current block.

As an example, the encoder may determine all candidate prediction modes enabled by the current block, such as the subblock merge mode, the regular merge mode, the MMVD mode, the CIIP mode, the TPM mode, the GEO mode, etc. Then, the encoder traverses each candidate prediction mode enabled by the current block, and determines a rate distortion cost of the candidate prediction mode, where there is no restriction on how to determine the rate distortion cost. Then, the encoder takes the candidate prediction mode with the smallest rate distortion cost as the target prediction mode.

The above way of determining the target prediction mode mentioned is just an example, and thus will not be limited herein. For example, the encoder may arbitrarily select one candidate prediction mode as the target prediction mode, or perform this operation another way, which will not be described here.

Step 302, according to the target prediction mode, prediction-mode flag information of the current block is determined, where the prediction-mode flag information includes a flag value of each of one or more of N candidate prediction modes; when the flag value is a first value, it indicates that the candidate prediction mode is enabled, and when the flag value is a second value, it indicates that the candidate prediction mode is disabled.

For the encoder, after the target prediction mode is determined, it is necessary to clearly determine that the enablement of which candidate prediction modes in the N candidate prediction modes needs to be notified to the decoder. After whether to enable one or more of candidate prediction modes in the N candidate prediction modes needs to be notified to the decoder is determined, whether to enable these related candidate prediction modes is encoded according to a certain strategy, so that the decoder may determine the target prediction mode from the N candidate prediction modes based on the enablement of one or more of the N candidate prediction modes according to the same strategy.

As an example, the first value may be 1, and the second value may be 0; or, the first value may be 0, and the second value may be 1. Of course, the foregoing is just an example and thus will not be limited herein. For example, the first value may be a, and the second value may be b, and so on. For the convenience of description, in subsequent embodiments, with the first value 1 and the second value 0 as an example, the flag value in subsequent embodiments is 1 to indicate that the flag value is the first value, and the bit value in subsequent embodiments is 0 to indicate that the flag value is the second value.

Step 303, the current block is encoded according to the prediction-mode flag information, where the encoding process is not restricted. In the process of encoding the current block, for the flag value of each candidate prediction mode included in the prediction-mode flag information, if the current block satisfies the decoding condition of the flag value of the candidate prediction mode, an encoded bitstream of the current block carries flag indication information indicating whether to enable the candidate prediction mode; and if the current block does not satisfy the decoding condition of the flag value of the candidate prediction mode, the encoded bitstream of the current block does not carry the flag indication information indicating whether to enable the candidate prediction mode.

As an example, if the prediction-mode flag information includes flag values of three candidate prediction modes, the three candidate prediction modes may be denoted as a candidate prediction mode 1, a candidate prediction mode 2 and a candidate prediction mode 3 respectively.

For the flag value of the candidate prediction mode 1, if the current block satisfies the decoding condition of the flag value of the candidate prediction mode 1, an encoded bitstream of the current block carries flag indication information indicating whether to enable the candidate prediction mode 1. For example, if the flag value of the candidate prediction mode 1 is 1, the flag indication information of the candidate prediction mode 1 carried in the encoded bitstream of the current block is 1; and if the flag value of the candidate prediction mode 1 is 0, the flag indication information of the candidate prediction mode 1 carried in the encoded bitstream of the current block is 0. If the current block does not satisfy the decoding condition of the flag value of the candidate prediction mode 1, the flag indication information indicating whether to enable the candidate prediction mode is not carried in the encoded bitstream of the current block. For example, regardless of that the flag value of the candidate prediction mode 1 is 0 or 1, the encoded bitstream does not carry the flag indication information of the candidate prediction mode 1, but the flag value of the candidate prediction mode 1 is derived by the decoder itself.

For the flag value of the candidate prediction mode 2, if the current block satisfies the decoding condition of the flag value of the candidate prediction mode 2, an encoded bitstream of the current block carries flag indication information indicating whether to enable the candidate prediction mode 2. If the current block does not satisfy the decoding condition of the flag value of the candidate prediction mode 2, the encoded bitstream of the current block does not carry the flag indication information indicating whether to enable the candidate prediction mode 2. For the flag value of the candidate prediction mode 3, if the current block satisfies the decoding condition of the flag value of the candidate prediction mode 3, an encoded bitstream of the current block carries flag indication information indicating whether to enable the candidate prediction mode 3; and if the current block does not satisfy the decoding condition of the flag value of the candidate prediction mode 3, the encoded bitstream of the current block does not carry the flag indication information indicating whether to enable the candidate prediction mode 3.

In a possible implementation, N candidate prediction modes include but are not limited to one or more of the subblock merge mode, the regular merge mode, the MMVD mode, the CIIP mode, the TPM mode and the GEO mode. Of course, the foregoing is just an example of the candidate prediction mode, and this candidate prediction mode is not restricted, and may be any candidate prediction mode.

In a possible implementation, it is possible to decide, according to the acquisition sequence of the flag values of the N candidate prediction modes, whether the encoded bitstream of the current block carries the flag indication information indicating whether to enable the candidate prediction mode.

As an example, if the N candidate prediction modes include the subblock merge mode, the regular merge mode, the MMVD mode, and the CIIP mode, the acquisition sequence of the flag values of the N candidate prediction modes, from front to back, may sequentially be: the flag value of the subblock merge mode, the flag value of the regular merge mode, the flag value of the MMVD mode, and the flag value of the CIIP mode. The foregoing is just an example, other acquisition sequences also may be used without restriction.

If the N candidate prediction modes include the subblock merge mode, the regular merge mode, the MMVD mode, the CIIP mode, and the GEO mode, the acquisition sequence of flag values of the N candidate prediction modes, from front to back, may sequentially be: the flag value of the subblock merge mode, the flag value of the regular merge mode, the flag value of the MMVD mode, the flag value of the CIIP mode, and the flag value of the GEO mode. The foregoing is just an example, other acquisition sequences also can be used without restriction.

The N candidate prediction modes also may include other possibilities that, for example, the N candidate prediction modes include the subblock merge mode, the regular merge mode, and the MMVD mode; and for another example, the N candidate prediction modes include the subblock merge mode, the regular merge mode and the CIIP mode. The N candidate prediction modes are not restricted, and can be set according to actual needs.

In a possible implementation, the step of determining whether to carry the flag indication information indicating whether to enable the candidate prediction mode in the encoded bitstream of the current block in accordance with the acquisition sequence of the flag values of the N candidate prediction modes may include: based on the acquisition sequence of the flag values of the N candidate prediction modes, determining whether the encoded bitstream of the current block carries the flag indication information of the candidate prediction mode behind the current candidate prediction mode in according to the flag value of the current candidate prediction mode.

As an example, if the acquisition sequence of the flag values of the N candidate prediction modes, from front to back, sequentially is: the flag value of the candidate prediction mode 1, the flag value of the candidate prediction mode 2 and the flag value of the candidate prediction mode 3. According to the flag value of the candidate prediction mode 1, it may be determined whether the encoded bitstream of the current block carries the flag indication information of the candidate prediction mode 2 and the flag indication information of the candidate prediction mode 3. According to the flag value of the candidate prediction mode 2, it may be determined whether the encoded bitstream of the current block carries the flag indication information of the candidate prediction mode 3. For another example, if the acquisition sequence of the flag values of the N candidate prediction modes, from front to back, sequentially is: the flag value of the subblock merge mode, the flag value of the regular merge mode, the flag value of the MMVD mode, and the flag value of the CIIP mode. According to the flag value of the subblock merge mode, it may be determined whether the encoded bitstream of the current block carries the flag indication information of the regular merge mode, the flag indication information of the MMVD mode, and the flag indication information of the CIIP. According to the flag value of the regular merge mode, it may be determined whether the encoded bitstream of the current block carries the flag indication information of the MMVD mode and the flag indication information of the CIIP mode and so on.

For the flag value of the subblock merge mode, if the current block satisfies the decoding condition of the flag value of the subblock merge mode, the encoded bitstream of the current block carries the flag indication information indicating whether to enable the subblock merge mode. For example, if the flag value of the subblock merge mode is 1, the flag indication information of the subblock merge mode is 1; and if the flag value of the subblock merge mode is 0, the flag indication information of the subblock merge mode is 0. If the current block does not satisfy the decoding condition of the flag value of the subblock merge mode, the encoded bitstream of the current block does not carry the flag indication information indicating whether to enable the subblock merge mode.

For the flag value of the regular merge mode, if the current block satisfies the decoding condition of the flag value of the regular merge mode, the encoded bitstream of the current block carries flag indication information indicating whether to enable the regular merge mode. For example, if the flag value of the regular merge mode is 1, the flag indication information of the regular merge mode is 1; and if the flag value of the regular merge mode is 0, the flag indication information of the regular merge mode is 0. If the current block does not satisfy the decoding condition of the flag value of the regular merge mode, the encoded bitstream of the current block does not carry the flag indication information indicating whether to enable the regular merge mode.

For the flag value of the MMVD mode, if the current block satisfies the decoding condition of the flag value of the MMVD mode, the encoded bitstream of the current block carries flag indication information indicating whether to enable the MMVD mode. For example, if the flag value of the MMVD mode is 1, the flag indication information of the MMVD mode is 1; and if the flag value of the MMVD mode is 0, the flag indication information of the MMVD mode is 0. If the current block does not satisfy the decoding condition of the flag value of the MMVD mode, the encoded bitstream of the current block does not carry the flag indication information indicating whether to enable the MMVD mode.

For the flag value of the CIIP mode, if the current block satisfies the decoding condition of the flag value of the CIIP mode, the encoded bitstream of the current block carries the flag indication information indicating whether to enable the CIIP mode. For example, if the flag value of the CIIP mode is 1, the flag indication information of the CIIP mode is 1; and if the flag value of the CIIP mode is 0, the flag indication information of the CIIP mode is 0. If the current block does not satisfy the decoding condition of the flag value of the CIIP mode, the encoded bitstream of the current block does not carry the flag indication information indicating whether to enable the CIIP mode.

For the flag value of the GEO mode, if the current block satisfies the decoding condition of the flag value of the GEO mode, the encoded bitstream of the current block carries flag indication information indicating whether to enable the GEO mode. For example, if the flag value of the GEO mode is 1, the flag indication information of the GEO mode is 1; and if the flag value of the GEO mode is 0, the flag indication information of the GEO mode is 0. If the current block does not satisfy the decoding condition of the flag value of the GEO mode, the encoded bitstream of the current block does not carry the flag indication information indicating whether to enable the GEO mode.

|From the solutions above, it can be seen that in the embodiments of the present disclosure, for the flag value of each candidate prediction mode, if the current block does not satisfy the decoding condition of the flag value of the candidate prediction mode, the encoded bitstream of the current block does not carry the flag indication information indicating whether to enable the candidate prediction mode. Therefore, the number of bits in the encoded bitstream may be reduced, the encoding cost may be lowered, the encoding performance may be improved, the process of decoding the prediction mode may be simplified, and the efficiency of decoding the prediction mode may be improved.

The decoding method in the Embodiment 1 and the encoding method in Embodiment 2 may be applied to the encoding and decoding processes of the merge mode, and also may be applied to the encoding and decoding processes of the skip mode. Referring to the above embodiments, the merge modes may include but be not limited to: the subblock merge mode, the regular merge mode, the MMVD mode, the CIIP mode, the TPM mode, and the GEO mode. The skip modes may include but be not limited to: the subblock merge mode, the regular merge mode, the MMVD mode, the CIIP mode, the TPM mode, and the GEO mode.

In the merge mode or skip mode, the decoding method in Embodiment 1 can be used to determine a target prediction mode, and decode a current block according to the target prediction mode, and the specific process refers to Embodiment 1. The encoding method in Embodiment 2 can be used to determine a target prediction mode, and encode a current block according to the target prediction mode, and the specific process refers to Embodiment 2.

The following further illustrates the decoding method and the encoding method in combination with several specific embodiments.

Embodiment 3: FIG. 4A is a schematic diagram illustrating methods for encoding and decoding a prediction mode flag.

In this embodiment, the candidate prediction modes include the subblock merge mode, the regular merge mode, the MMVD mode, the CIIP mode, and the TPM mode, and the acquisition sequence of flag values of the candidate prediction modes, from front to back, sequentially is: the flag value of the subblock merge mode, the flag value of the regular merge mode, the flag value of the MMVD mode, and the flag value of the CIIP mode.

When the prediction-mode flag information of the current block is determined, the prediction-mode flag information includes one or more of the flag value of the subblock merge mode, the flag value of the regular merge mode, the flag value of the MMVD mode, and the flag value of the CIIP mode. For example, the encoder acquires the flag value of each prediction mode in the following manner.

The flag value of the subblock merge mode is acquired. If the current block satisfies the decoding condition of the flag value of the subblock merge, the flag value is read from the flag indication information indicating whether to enable the subblock merge mode carried in the encoded bitstream of the current block. If the current block does not satisfy the decoding condition of the flag value of the subblock merge, the flag value is a derived value.

If the flag value of the subblock merge mode is 1, the acquisition process of flag value is ended. In this case, the prediction-mode flag information includes the flag value of the subblock merge mode.

If the flag value of the subblock merge mode is 0, the acquisition of the flag value of the regular merge mode is continued. If the current block satisfies the decoding condition of the flag value of the regular merge mode, the flag value of the regular merge mode is read from the flag indication information indicating whether to enable the regular merge mode carried in the encoded bitstream of the current block; and if the current block does not satisfy the decoding condition of the flag value of the regular merge mode, the flag value of the regular merge mode is a derived value.

If the flag value of the regular merge mode is 1, the acquisition of flag values of other modes is ended. The prediction-mode flag information includes the flag value of the subblock merge mode and the flag value of the regular merge mode.

If the flag value of the regular merge mode is 0, the acquisition of the flag value of the MMVD mode is continued. If the current block satisfies the decoding condition of the flag value of the MMVD mode, the flag value of the MMVD mode is read from the flag indication information indicating whether to enable the MMVD mode carried in the encoded bitstream of the current block; and if the current block does not satisfy the decoding condition of the flag value of the MMVD mode, the flag value of the MMVD mode is a derived value.

If the flag value of the MMVD mode is 1, the acquisition of flag values of other modes is ended. The prediction-mode flag information includes the flag value of the subblock merge mode, the flag value of the regular merge mode, and the flag value of the MMVD mode.

If the flag value of the MMVD mode is 0, the acquisition of the flag value of the CIIP mode is continued. If the current block satisfies the decoding condition of the flag value of the CIIP mode, the flag value of the CIIP mode is read from the flag indication information indicating whether to enable the CIIP mode carried in the encoded bitstream of the current block; and if the current block does not satisfy the decoding condition of the flag value of the CIIP mode, the flag value of the CIIP mode is a derived value.

After the flag value of the CIIP mode is acquired, the acquisition of flag values of other modes is ended, and the prediction-mode flag information includes the flag value of the subblock merge mode, the flag value of the regular merge mode, the flag value of the MMVD mode, and the flag value of the CIIP mode.

In the above embodiment, the decoder needs to determine whether the current block satisfies the decoding condition of the flag value of the prediction mode, and determine whether the flag value is read from the encoded bitstream of the current block or derived based on a determination result.

Table 2 shows an example of the decoding condition of the flag value of each prediction mode.

TABLE 2

| Flag | Decoding condition of flag value | Derived value when condition is not satisfied |
|---|---|---|
| Flag of subblock merge mode | the current block enables the subblock merge mode | 0 |
| Flag of regular merge mode | the current block enables the MMVD mode, or the current block enables the CIIP mode, or the current block enables the TPM mode | 1 |
| Flag of MMVD mode | the current block enables the MMVD mode and the current block enables the CIIP mode, or, the current block enables the MMVD mode and the current block enables the TPM mode | the derived value is 1 when the current block enables the MMVD mode, or the derived value is 0 when the MMVD mode is disabled for the current block. |
| Flag of CIIP mode | the current block enables the CIIP mode and the current block enables the TPM mode | the derived value is 1 when the current block enables the CIIP mode, or the derived value is 0 when the CIIP mode is disabled for the current block. |

It can be seen from Table 2 that, in a possible implementation, the decoding condition of the flag value of the subblock merge mode includes whether the current block enables the subblock merge mode or not. And the way of acquiring the flag value of the subblock merge mode includes: if the current block enables the subblock merge mode, reading the flag value of the subblock merge mode from the flag indication information indicating whether to enable the subblock merge mode carried in the encoded bitstream of the current block. For example, when the flag indication information of the subblock merge mode is 0, the flag value of the subblock merge mode is 0, and when the flag indication information of the subblock merge mode is 1, the flag value of the subblock merge mode is 1. Otherwise, the flag value of the subblock merge mode is derived to be 0.

In a possible implementation, the decoding condition of the flag value of the regular merge mode includes whether the current block enables the MMVD mode or not, whether the current block enables the CIIP mode or not, and whether the current block enables the TPM mode or not. And a way of acquiring the flag value of the regular merge mode includes: if the current block enables the MMVD mode, or the current block enables the CIIP mode, or the current block enables the TPM mode, reading the flag value of the regular merge mode from the flag indication information indicating whether to enable the regular merge mode carried in the encoded bitstream of the current block. For example, when the flag indication information of the regular merge mode is 0, the flag value of the regular merge mode is 0, and when the flag indication information of the regular merge mode is 1, the flag value of the regular merge mode is 1. Otherwise, the flag value of the regular merge mode is derived to be 1.

In a possible implementation, the decoding condition of the flag value of the MMVD mode includes whether the current block enables the MMVD mode or not, whether the current block enables the CIIP mode or not, and whether the current block enables the TPM mode or not. And a way of acquiring the flag value of the MMVD mode includes: if the current block enables the MMVD mode and the current block enables the CIIP mode, or the current block enables the MMVD mode and the current block enables the TPM mode, reading the flag value of the MMVD mode from the flag indication information indicating whether to enable the MMVD mode carried in the encoded bitstream of the current block. For example, when the flag indication information of the MMVD mode is 0, the flag value of the MMVD mode is 0, and when the flag indication information of the MMVD mode is 1, the flag value of the MMVD mode is 1. Otherwise, when the current block enables the MMVD mode, the flag value of the MMVD mode may be derived to be 1, and when the MMVD mode is disabled for the current block, the flag value of the MMVD mode may be derived to be 0.

In a possible implementation, the decoding condition of the flag value of the CIIP mode includes whether the current block enables the CIIP mode or not, and whether the current block enables the TPM mode or not. And a way of acquiring the flag value of the CIIP mode includes: if the current block enables the MMVD mode and the current block enables the TPM mode, reading the flag value of the CIIP mode from the flag indication information indicating whether to enable the CIIP mode carried in the encoded bitstream of the current block. For example, when the flag indication information of the CIIP mode is 0, the flag value of the CIIP mode is 0, and when the flag indication information of the CIIP mode is 1, the flag value of the CIIP mode is 1. Otherwise, when the current block enables the CIIP mode, the flag value of the CIIP mode may be derived to be 1, and when the CIIP mode is disabled for the current block, the flag value of the CIIP mode may be derived to be 0.

Based on the above processing, the prediction-mode flag information of the current block may be acquired, and the target prediction mode used by the current block may be determined according to the prediction-mode flag information. In a possible implementation, as shown in FIG. 4A, if the flag value of the subblock merge mode is 1, it is determined that the target prediction mode used by the current block is the subblock merge mode. If the flag value of the subblock merge mode is 0 and the flag value of the regular merge mode is 1, it is determined that the target prediction mode used by the current block is the regular merge mode. If the flag value of the subblock merge mode is 0, the flag value of the regular merge mode is 0, and the flag value of the MMVD mode is 1, it is determined that the target prediction mode used by the current block is the MMVD mode. If the flag value of the subblock merge mode is 0, the flag value of the regular merge mode is 0, the flag value of the MMVD mode is 0, and the flag value of the CIIP mode is 1, it is determined that the target prediction mode used by the current block is the CIIP mode. If the flag value of the subblock merge mode is 0, the flag value of the regular merge mode is 0, the flag value of the MMVD mode is 0, and the flag value of the CIIP mode 0, it is determined that the target prediction mode used by the current block is the TPM mode.

In a possible implementation, corresponding to the processing flow of the decoder, for an encoder mentioned hereinbefore, the encoder determines a target prediction mode firstly, where the specific determination manner refers to Embodiment 2 and will not be described here; and then, prediction-mode flag information of a current block is determined according to the target prediction mode, as shown in FIG. 4A, if the target prediction mode is the regular merge mode, the prediction-mode flag information includes: the flag value 0 of the subblock merge mode, and the flag value 1 of the regular merge mode.

For the flag value 0 of the subblock merge mode, if the current block satisfies the decoding condition of the flag value of the subblock merge mode, the encoded bitstream of the current block carries the flag indication information indicating whether to enable the subblock merge mode, i.e., the flag indication information of the subblock merge mode is 1; and if the current block does not satisfy the decoding condition of the flag value of the subblock merge mode, the encoded bitstream of the current block does not carry the flag indication information indicating whether to enable the subblock merge mode.

For the flag value 1 of the regular merge mode, if the current block satisfies the decoding condition of the flag value of the regular merge mode, the encoded bitstream of the current block carries the flag indication information indicating whether to enable the regular merge mode, i.e., the flag indication information of the regular merge mode is 1; and if the current block does not satisfy the decoding condition of the flag value of the regular merge mode, the encoded bitstream of the current block does not carry the flag indication information indicating whether to enable the regular merge mode.

Similarly, the flag value of each prediction mode in the prediction-mode flag information may be processed in the above way, which will not be described redundantly here. When the prediction-mode flag information is other cases, the processing way is similar to the above and will not be described here.

Figure 4B:
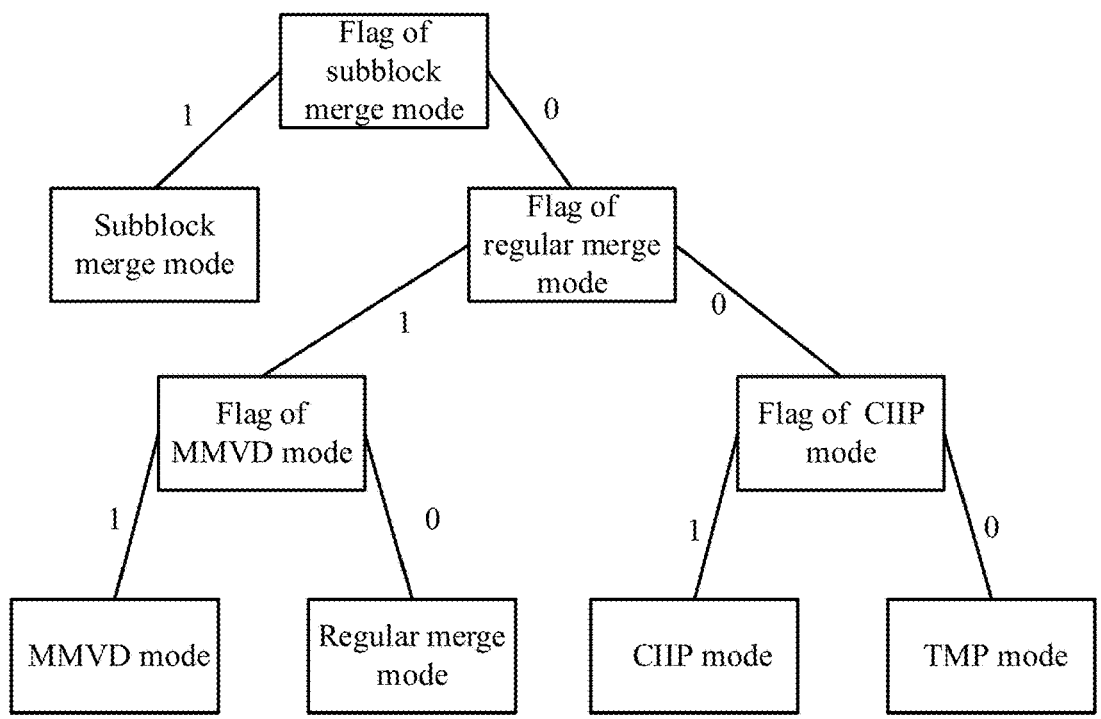

Embodiment 4: FIG. 4B is a schematic diagram illustrating methods for encoding and decoding a prediction mode flag.

In this embodiment, the candidate prediction modes include the subblock merge mode, the regular merge mode, the MMVD mode, the CIIP mode, and the TPM mode, and the acquisition sequence of the flag values of the candidate prediction modes, from front to back, sequentially is: the flag value of the subblock merge mode, the flag value of the regular merge mode, the flag value of the MMVD mode, and the flag value of the CIIP mode.

When prediction-mode flag information of the current block is determined, the prediction-mode flag information includes one or more of the flag value of the subblock merge mode, the flag value of the regular merge mode, the flag value of the MMVD mode, and the flag value of the CIIP mode. For example, the encoder acquires the flag value of each prediction mode in the following manner.

The flag value of the subblock merge mode is acquired.

if the flag value of the subblock merge mode is 1, the acquisition of flag values of other modes is ended. In this case, the prediction-mode flag information includes the flag value of the subblock merge mode.

If the flag value of the subblock merge mode is 0, the acquisition of the flag value of the regular merge mode is continued.

If the flag value of the regular merge mode is 1, the acquisition of the flag value of the MMVD mode is continued, and the acquisition process for the flag value is ended. In this case, the prediction-mode flag information includes the flag value of the subblock merge mode, the flag value of the regular merge mode, and the flag value of the MMVD mode.

If the flag value of the regular merge mode is 0, the acquisition of the flag value of the CIIP mode is continued, and the acquisition process for the flag value is ended. In this case, the prediction-mode flag information includes the flag value of the subblock merge mode, the flag value of the regular merge mode, and the flag value of the CIIP mode.

In the above embodiment, when the decoder acquires the flag value, if the current block satisfies the decoding condition of the flag value of the prediction mode, the flag value is read from the encoded bitstream of the current block; and if the current block does not satisfy the decoding condition of the flag value of the prediction mode, the flag value is derived. Therefore, it is to be determined whether the current block satisfies the decoding condition of the flag value of the prediction mode. Table 3 shows an example of the decoding condition of the flag value of each prediction mode.

TABLE 3

| Flag | Decoding condition of flag value | Derived value when condition is not satisfied |
| --- | --- | --- |
| Flag of subblock merge mode | the current block enables the subblock merge mode | 0 |
| Flag of regular merge mode | the current enables the CIIP mode, or, the current enables the TPM mode | 1 |
| Flag of MMVD mode | the current enables the MMVD mode | 0 |
| Flag of CIIP mode | the current block enables the CIIP mode and the current block enables the TPM mode | the derived value is 1 when the current block enables the CIIP mode, or 0 when the CIIP mode is disabled for the current block. |

It can be seen from Table 3 that, in a possible implementation, the decoding condition of the flag value of the subblock merge mode includes whether the current block enables the subblock merge mode or not. And a way of acquiring the flag value of the subblock merge mode includes: if the current block enables the subblock merge mode, reading the flag value of the subblock merge mode from the flag indication information indicating whether to enable the subblock merge mode carried in the encoded bitstream of the current block, otherwise, deriving the flag value of the subblock merge mode to be 0.

In a possible implementation, the decoding condition of the flag value of the regular merge mode includes whether the current block enables the CIIP mode or not, and whether the current block enables the TPM mode or not. And a way of acquiring the flag value of the regular merge mode includes but is not limited to: if the current block enables the CIIP mode, or, the current block enables the TPM mode, reading the flag value of the regular merge mode from the flag indication information indicating whether to enable the regular merge mode carried in the encoded bitstream of the current block; otherwise, deriving the flag value of the regular merge mode to be 1.

In a possible implementation, the decoding condition of the flag value of the MMVD mode includes whether the current block enables the MMVD mode or not. And a way of acquiring the flag value of the MMVD mode may include: if the current block enables the MMVD mode, reading the flag value of the MMVD mode from the flag indication information indicating whether to enable the MMVD mode carried in the encoded bitstream of the current block; otherwise, deriving the flag value of the MMVD mode to be 0.

The decoding condition of the flag value of the CIIP mode includes whether the current block enables the CIIP mode or not, and whether the current block enables the TPM mode or not. And a way of acquiring the flag value of the CIIP mode may include: if the current block enables the CIIP mode and the current block enables the TPM mode, reading the flag value of the CIIP mode from the flag indication information indicating whether to enable the CIIP mode carried in the encoded bitstream of the current block; otherwise, when the current block enables the CIIP mode, deriving the flag value of the CIIP mode to be 1, and when the CIIP mode is disabled for the current block, deriving the flag value of the CIIP mode to be 0.

Based on the above processing, the prediction-mode flag information of the current block may be acquired, and the target prediction mode used by the current block may be determined according to the prediction-mode flag information. As shown in FIG. 4B, if the flag value of the subblock merge mode is 1, it is determined that the target prediction mode used by the current block is the subblock merge mode. If the flag value of the subblock merge mode is 0, the flag value of the regular merge mode is 1, and the flag value of the MMVD mode is 0, it is determined that the target prediction mode used by the current block is the regular merge mode. If the flag value of the subblock merge mode is 0, the flag value of the regular merge mode is 1, and the flag value of the MMVD mode is 1, it is determined that the target prediction mode used by the current block is the MMVD mode. If the flag value of the subblock merge mode is 0, the flag value of the regular merge mode is 0, and the flag value of the CIIP mode is 1, it is determined that the target prediction mode used by the current block is the CIIP mode. If the flag value of the subblock merge mode is 0, the flag value of the regular merge mode is 0, and the flag value of the CIIP mode is 0, it is determined that the target prediction mode used by the current block is the TPM mode.

In a possible implementation, corresponding to the processing flow of the decoder mentioned hereinbefore, for an encoder, the encoder determines the target prediction mode firstly, and then determines the prediction-mode flag information of a current block according to the target prediction mode, as shown in FIG. 4B. If the target prediction mode is the regular merge mode, the prediction-mode flag information includes: the flag value 0 of the subblock merge mode, the flag value 1 of the regular merge mode, and the flag value 0 of the MMVD mode.

Other implementation processes may be referred to Embodiment 3, with the decoding condition referred to Table 3 and will not be described again here.

Figure 4C:
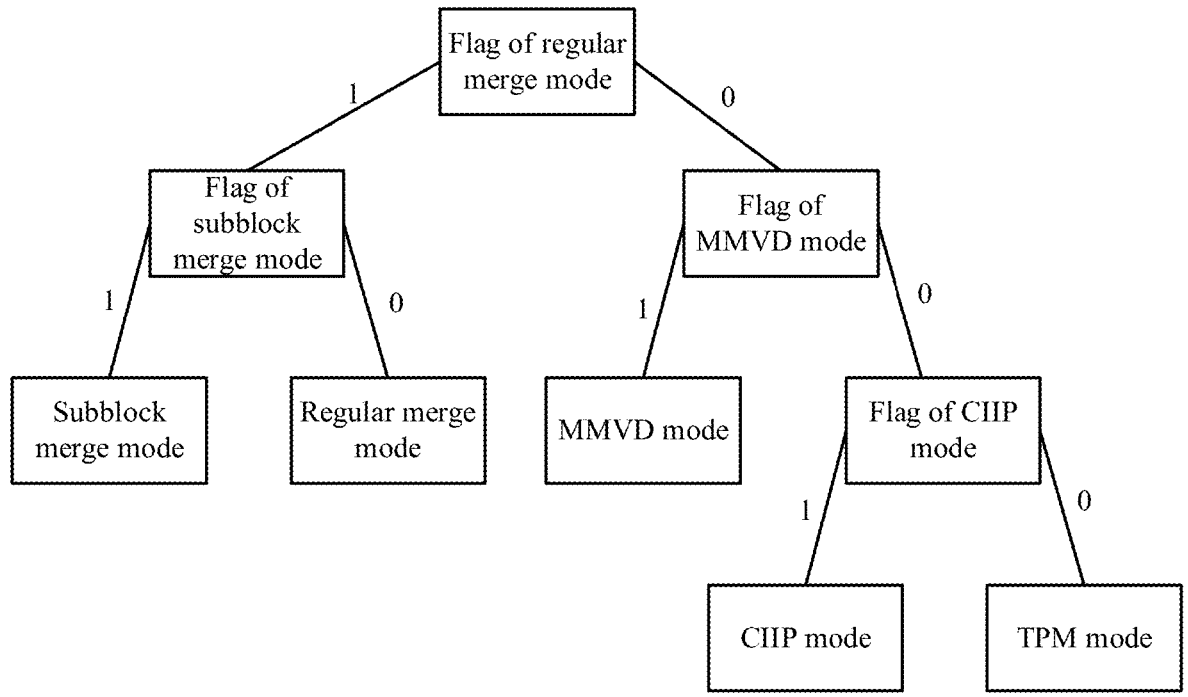

Embodiment 5: FIG. 4C is a schematic diagram illustrating methods for encoding and decoding a prediction mode flag.

In this embodiment, the candidate prediction modes include the subblock merge mode, the regular merge mode, the MMVD mode, the CIIP mode, and the TPM mode, the acquisition sequence of the flag values of the candidate prediction modes, from front to back, sequentially is: the flag value of the regular merge mode, the flag value of the subblock merge mode, the flag value of the MMVD mode, and the flag value of the CIIP mode.

When prediction-mode flag information of a current block is determined, the prediction-mode flag information includes one or more of the flag value of the regular merge mode, the flag value of the subblock merge mode, the flag value of the MMVD mode, and the flag value of the CIIP mode. For example, the decoder acquires the flag value of each prediction mode in the following way.

The flag value of the regular merge mode is acquired.

If the flag value of the regular merge mode is 1, the acquisition of the flag value of the subblock merge mode is continued, and the acquisition of flag values of other modes is ended. In this case, the prediction-mode flag information includes the flag value of the regular merge mode and the flag value of the subblock merge mode.

If the flag value of the regular merge mode is 0, the acquisition of the flag value of the MMVD mode is continued;

If the flag value of the MMVD mode is 1, the acquisition of flag values of other modes is ended. In this case, the prediction-mode flag information includes the flag value of the regular merge mode and the flag value of the MMVD mode.

If the flag value of the MMVD mode is 0, the acquisition of the flag value of the CIIP mode is continued, and the acquisition of flag values of other modes is ended. In this case, the prediction-mode flag information includes the flag value of the regular merge mode, the flag value of the MMVD mode, and the flag value of the CIIP mode.

In the above embodiment, when the decoder acquires the flag value, if the current block satisfies the decoding condition of the flag value of the prediction mode, the flag value is read from the encoded bitstream of the current block; and if the current block does not satisfy the decoding condition of the flag value of the prediction mode, the flag value is derived. Therefore, it is to be determined whether the current block satisfies the decoding condition of the flag value of the prediction mode. Table 4 shows an example of the decoding condition of the flag value of each prediction mode.

encoded bitstream of the current block; otherwise, deriving the flag value of the regular merge mode to be 1.

In a possible implementation, the decoding condition of the flag value of the subblock merge mode includes whether the current block enables the subblock merge mode or not. And a way of acquiring the flag value of the subblock merge mode includes: if the current block enables the subblock merge mode, reading the flag value of the subblock merge mode from the flag indication information indicating whether to enable the subblock merge mode carried in the encoded bitstream of the current block, otherwise, deriving the flag value of the subblock merge mode to be 0.

In a possible implementation, the decoding condition of the flag value of the MMVD mode includes whether the current block enables the MMVD mode or not, whether the current block enables the CIIP mode or not, and whether the current block enables the TPM mode or not. And a way of acquiring the flag value of the MMVD mode includes: if the current block enables the MMVD mode and the current block enables the CIIP mode, or the current block enables the MMVD mode and the current block enables the TPM mode, reading the flag value of the MMVD mode from the flag indication information indicating whether to enable the MMVD mode carried in the encoded bitstream of the current block, otherwise, when the current block enables the MMVD mode, deriving the flag value of the MMVD mode to be 1, and when the MMVD mode is disabled for the current block, deriving the flag value of the MMVD mode to be 0.

TABLE 4

| Flag | Decoding condition of flag value | Derived value when condition is not satisfied |
|---|---|---|
| Flag of regular merge mode | the current enables the MMVD mode, or, the current enables the CIIP mode, or, the current enables the TPM mode | 1 |
| Flag of subblock merge mode | a current block enables the subblock merge mode | 0 |
| Flag of MMVD mode | the current block enables the MMVD mode and the current block enables the CIIP mode, or, the current block enables the MMVD mode and the current block enables the TPM mode | the derived value is 1 when the current block enables the MMVD mode, or the derived value is 0 when the MMVD mode is disabled for the current block. |
| Flag of CIIP mode | the current block enables the CIIP mode and the current block enables the TPM mode | the derived value is 1 when the current block enables the CIIP mode, or the derived value is 0 when the CIIP mode is disabled for the current block. |

It can be seen from Table 4 that, in possible implementation, the decoding condition of the flag value of the regular merge mode may include whether the current block enables the MMVD mode or not, whether the current block enables the CIIP mode or not, and whether the current block enables the TPM mode or not. And a way of acquiring the flag value of the regular merge mode may include but be not limited to: if the current block enables the MMVD mode, or, the current block enables the CIIP mode, or, the current block enables the TPM mode, reading the flag value of the regular merge mode from the flag indication information indicating whether to enable the regular merge mode carried in the The decoding condition of the flag value of the CIIP mode includes whether the current block enables the CIIP mode or not, and whether the current block enables the TPM mode or not. A way of acquiring the flag value of the CIIP mode includes: if the current block enables the CIIP mode and the current block enables the TPM mode, reading the flag value of the CIIP mode from the flag indication information indicating whether to enable the CIIP mode carried in the encoded bitstream of the current block; otherwise, when the current block enables the CIIP mode, deriving the flag value of the CIIP mode to be 1, and when the CIIP mode is disabled for the current block, deriving the flag value of the CIIP mode to be 0.

Based on the above processing, the prediction-mode flag information of the current block may be acquired, and the target prediction mode used by the current block may be determined according to the prediction-mode flag information. As shown in FIG. 4C, if the flag value of the regular merge mode is 1, and the flag value of the subblock merge mode is 1, it is determined that the target prediction mode used by the current block is the subblock merge mode. If the flag value of the regular merge mode is 1, and the flag value of the subblock merge mode is 0, it is determined that the target prediction mode used by the current block is the regular merge mode. If the flag value of the regular merge mode is 0, and the flag value of the MMVD mode is 1, it is determined that the target prediction mode used by the current block is the MMVD mode. If the flag value of the regular merge mode is 0, the flag value of the MMVD mode is 0, and the flag value of the CIIP mode is 1, it is determined that the target prediction mode used by the current block is the CIIP mode. If the flag value of the regular merge mode is 0, the flag value of the MMVD mode is 0, and the flag value of the CIIP mode is 0, it is determined that the target prediction mode used by the current block is the TPM mode.

In a possible implementation, corresponding to the above processing flow of the decoder, for an encoder, the encoder determines the target prediction mode firstly, and then determines the prediction-mode flag information of a current block according to the target prediction mode, as shown in FIG. 4C. If the target prediction mode is the regular merge mode, the prediction-mode flag information includes: the flag value 1 of the regular merge mode, and the flag value 0 of the subblock merge mode.

Other implementation processes may be referred to Embodiment 3, with the decoding condition referred to Table 3 and will not be described again here.

Figure 4D:
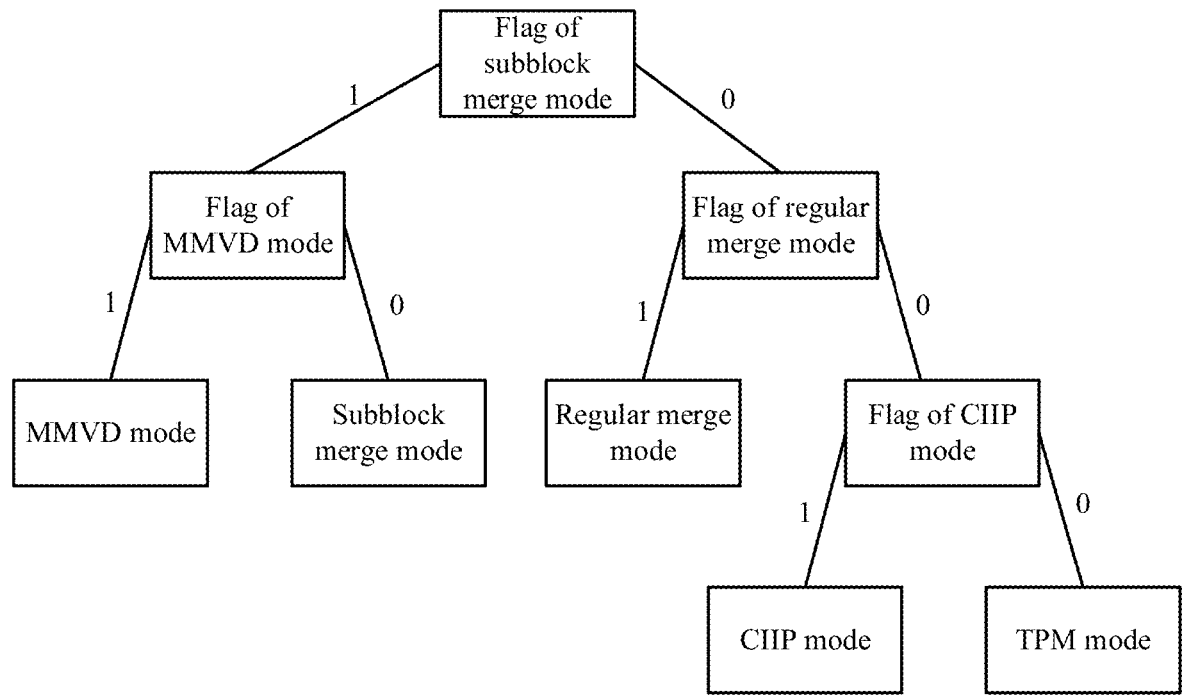

Embodiment 6: FIG. 4D is a schematic diagram illustrating methods for encoding and decoding a prediction mode flag.

In this embodiment, the candidate prediction modes include the subblock merge mode, the regular merge mode, the MMVD mode, the CIIP mode, and the TPM mode, and the acquisition sequence of flag values of the candidate prediction modes, from front to back, sequentially is: the flag value of the subblock merge mode, the flag value of the MMVD mode, the flag value of the regular merge mode, and the flag value of the CIIP mode.

When the prediction-mode flag information of the current block is determined, the prediction-mode flag information includes one or more of the flag value of the subblock merge mode, the flag value of the MMVD mode, the flag value of the regular merge mode, and the flag value of the CIIP mode. For example, the decoder acquires the flag value of each prediction mode in the following way.

The flag value of the subblock merge mode is acquired.

If the flag value of the subblock merge mode is 1, the acquisition of the flag value of the MMVD mode is continued, and the acquisition of flag values of other modes is ended. In this case, the prediction-mode flag information includes the flag value of the subblock merge mode and the flag value of the MMVD mode.

If the flag value of the subblock merge mode is 0, the acquisition of the flag value of the regular merge mode is continued.

If the flag value of the regular merge mode is 1, the acquisition process of the flag value acquisition process is ended. In this case, the prediction-mode flag information includes the flag value of the subblock merge mode and the flag value of the regular merge mode;

If the flag value of the regular merge mode is 0, the acquisition of the flag value of the CIIP mode is continued, and the acquisition of flag values of other modes is ended. In this case, the prediction-mode flag information includes the flag value of the subblock merge mode, the flag value of the regular merge mode, and the flag value of the CIIP mode.

In the above embodiment, when the decoder acquires the flag value, if the current block satisfies the decoding condition of the flag value of the prediction mode, the flag value is read from the encoded bitstream of the current block; and if the current block does not satisfy the decoding condition of the flag value of the prediction mode, the flag value is derived. Therefore, it is to be determined whether the current block satisfies the decoding condition of the flag value of the prediction mode. Table 5 shows an example of the decoding condition of the flag value of each prediction mode.

TABLE 5

| Flag | Decoding condition of flag value | Derived value when condition is not satisfied |
|---|---|---|
| Flag of subblock merge mode | the current block enables the subblock merge mode and the current block enables the MMVD mode | the derived value is 1 when the current block enables the subblock merge mode, or the derived value is 0 when the subblock merge mode is disabled for the current block. |
| Flag of MMVD mode | the current block enables the subblock merge mode and the current block enables the MMVD mode | the derived value is 1 when the current enables the MMVD mode, or the derived value is 0 when the MMVD mode is disabled for the current block. |
| Flag of regular merge mode | the current enables the CIIP mode, or, the current enables the TPM mode | 1 |
| Flag of CIIP mode | the current block enables the CIIP mode and the current block enables the TPM mode | the derived value is 1 when the current block enables the CIIP mode, or the derived value is 0 when the CIIP mode is disabled for the current block. |

It can be seen from Table 5 that, in a possible implementation, the decoding condition of the flag value of the subblock merge mode includes whether the current block enables the subblock merge mode or not, and whether the current block enables the MMVD mode or not. And a way of acquiring the flag value of the subblock merge mode may include: if the current block enables the subblock merge mode and the current block enables the MMVD mode, reading the flag value of the subblock merge mode from the flag indication information indicating whether to enable the subblock merge mode carried in the encoded bitstream of the current block, otherwise, when the current block enables the subblock merge mode, deriving the flag value of the subblock merge mode to be 1, and when the subblock merge mode is disabled for the current block, deriving the flag value of the subblock merge mode to be 0.

In a possible implementation, the decoding condition of the flag value of the MMVD mode includes whether the current block enables the subblock merge mode or not, and whether the current block enables the MMVD mode or not. And a way of acquiring the flag value of the MMVD mode may include: if the current block enables the subblock merge mode and the current block enables the MMVD mode, reading the flag value of the MMVD mode from the flag indication information indicating whether to enable the MMVD mode carried in the encoded bitstream of the current block; otherwise, when the current block enables the MMVD mode, deriving the flag value of the MMVD mode to be 1, and when the MMVD mode is disabled for the current block, deriving the flag value of the MMVD mode to be 0.

In a possible implementation, the decoding condition of the flag value of the regular merge mode includes whether the current block enables the CIIP mode or not, and whether the current block enables the TPM mode or not. And a way of acquiring the flag value of the regular merge mode may include but be not limited to: if the current block enables the CIIP mode, or, the current block enables the TPM mode, reading the flag value of the regular merge mode from the flag indication information indicating whether to enable the regular merge mode carried in the encoded bitstream of the current block; otherwise, deriving the flag value of the regular merge mode to be 1.

The decoding condition of the flag value of the CIIP mode includes whether the current block enables the CIIP mode or not, and whether the current block enables the TPM mode or not. And a way of acquiring the flag value of the CIIP mode may include: if the current block enables the CIIP mode and the current block enables the TPM mode, reading the flag value of the CIIP mode from the flag indication information indicating whether to enable the CIIP mode carried in the encoded bitstream of the current block; otherwise, when the current block enables the CIIP mode, deriving the flag value of the CIIP mode to be 1, and when the CIIP mode is disabled for the current block, deriving the flag value of the CIIP mode to be 0.

Based on the above processing, the prediction-mode flag information of the current block may be acquired, and the target prediction mode used by the current block may be determined according to the prediction-mode flag information. As shown in FIG. 4D, if the flag value of the subblock merge mode is 1, and the flag value of the MMVD mode is 1, it is determined that the target prediction mode used by the current block is the MMVD mode. If the flag value of the subblock merge mode is 1, and the flag value of the MMVD mode is 0, it is determined that the target prediction mode used by the current block is the subblock merge mode. If the flag value of the subblock merge mode is 0, and the flag value of the regular merge mode is 1, it is determined that the target prediction mode used by the current block is the regular merge mode. If the flag value of the subblock merge mode is 0, the flag value of the regular merge mode is 0, and the flag value of the CIIP mode is 1, it is determined that the target prediction mode used by the current block is the CIIP mode. If the flag value of the subblock merge mode is 0, the flag value of the regular merge mode is 0, and the flag value of the CIIP mode is 0, it is determined that the target prediction mode used by the current block is the TPM mode.

In a possible implementation, corresponding to the above processing flow of the decoder, for an encoder, the encoder determines the target prediction mode firstly, and then determines the prediction-mode flag information of the current block according to the target prediction mode, as shown in FIG. 4D. If the target prediction mode is the regular merge mode, the prediction-mode flag information includes: the flag value 0 of the subblock merge mode, and the flag value 1 of the regular merge mode.

Other implementation processes may be referred to Embodiment 3 for, with the decoding condition referred to Table 3 and will not be described again here.

Figure 4E:
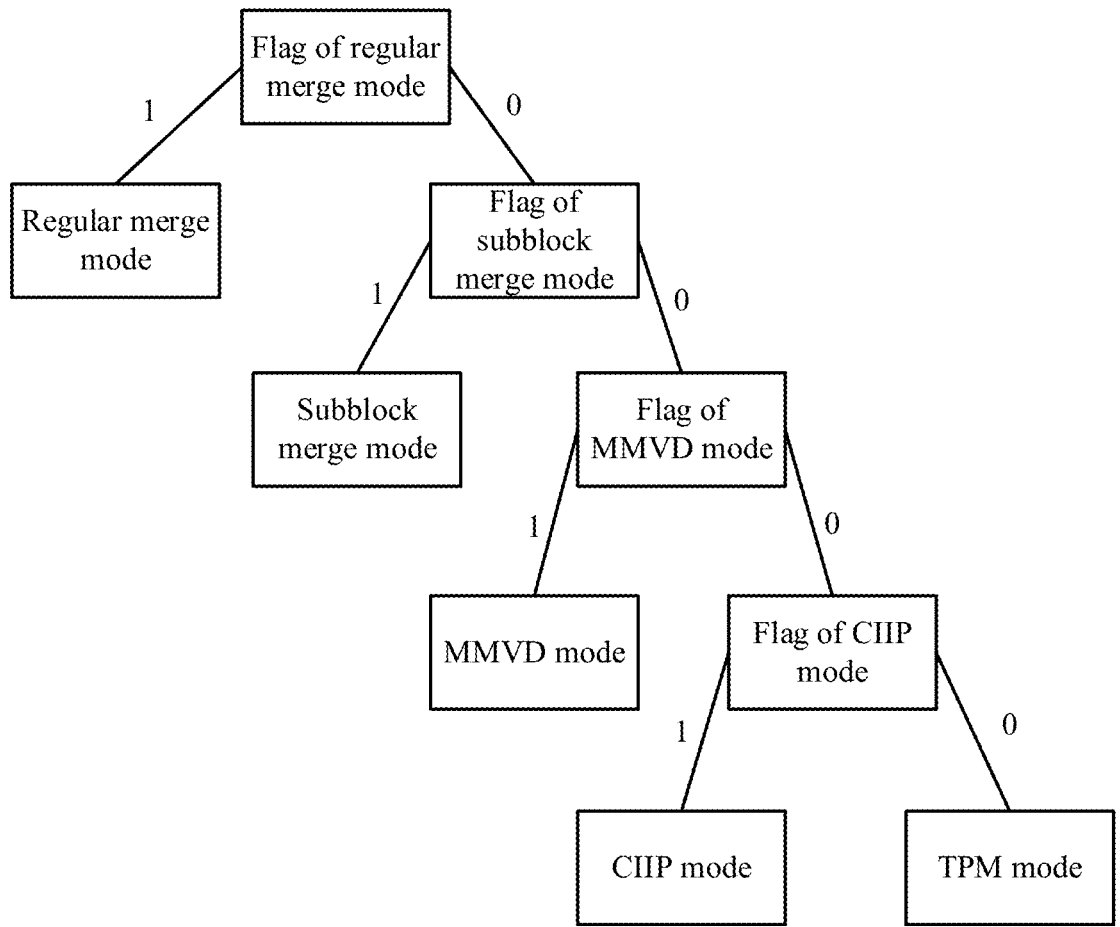

Embodiment 7: FIG. 4E is a schematic diagram illustrating methods for encoding and decoding a prediction mode flag.

In this embodiment, the candidate prediction modes include the subblock merge mode, the regular merge mode, the MMVD mode, the CIIP mode, and the TPM mode, the acquisition sequence of flag values of the candidate prediction modes, from front to back, sequentially is: the flag value of the regular merge mode, the flag value of the subblock merge mode, the flag value of the MMVD mode, and the flag value of the CIIP mode.

When the prediction-mode flag information of the current block is determined, the prediction-mode flag information includes one or more of the flag value of the regular merge mode, the flag value of the subblock merge mode, the flag value of the MMVD mode, and the flag value of the CIIP mode. For example, the decoder acquires the flag value of each prediction mode in the following way.

The flag value of the regular merge mode is acquired.

If the flag value of the regular merge mode is 1, the acquisition of flag values of other modes is ended. In this case, the prediction-mode flag information includes the flag value of the regular merge mode.

If the flag value of the regular merge mode is 0, the acquisition of the flag value of the subblock mode is continued.

If the flag value of the subblock merge mode is 1, the acquisition of flag values of other modes is ended. In this case, the prediction-mode flag information includes the flag value of the regular merge mode and the flag value of the subblock merge mode;

If the flag value of the subblock merge mode is 0, the acquisition of the flag value of the MMVD mode is continued.

If the flag value of the MMVD mode is 1, the acquisition of flag values of other modes is ended. In this case, the prediction-mode flag information includes the flag value of the regular merge mode, the flag value of the subblock merge mode and the flag value of the MMVD mode.

If the flag value of the MMVD mode is 0, the acquisition of the flag value of the CIIP mode is continued, and the acquisition of flag values of other modes is ended. In this case, the prediction-mode flag information includes the flag value of the regular merge mode, the flag value of the subblock merge mode, the flag value of the MMVD mode, and the flag value of the CIIP mode.

In the above embodiment, when the decoder acquires the flag value, if the current block satisfies the decoding condition of the flag value of the prediction mode, the flag value is read from the encoded bitstream of the current block; and if the current block does not satisfy the decoding condition of the flag value of the prediction mode, the flag value is derived. Therefore, it is to be determined whether the current block satisfies the decoding condition of the flag value of the prediction mode. Table 6 shows an example of the decoding condition of the flag value of each prediction mode.

TABLE 6

| Flag | Decoding condition of flag value | Derived value when condition is not satisfied |
| --- | --- | --- |
| Flag of regular merge mode | the current block enables the subblock merge mode, or, the current block enables the MMVD mode, or, the current block enables the CIIP mode, or, the current block enables the TPM mode | 1 |
| Flag of subblock merge mode | the current block enables the subblock merge mode and the current block enables the MMVD mode; or, the current block enables the subblock merge mode and the current block enables the CIIP mode, or, the current block enables the subblock merge mode and the current block enables the TPM mode | the derived value is 1 when the current block enables the subblock merge mode, or the derived value is 0 when the subblock merge mode is disabled for the current block. |
| Flag of MMVD mode | the current block enables the MMVD mode and the current block enables the CIIP mode, or, the current block enables the MMVD mode and the current block enables the TPM mode | the derived value is 1 when the current block enables the MMVD mode, or the derived value is 0 when the MMVD mode is disabled for the current block. |
| Flag of CIIP mode | the current block enables the CIIP mode and the current block enables the TPM mode | the derived value is 1 when the current block enables the CIIP mode, or the derived value is 0 when the CIIP mode is disabled for the current block. |

In a possible implementation, the decoding condition of the flag value of the regular merge mode includes whether the current block enables the subblock merge mode or not, whether the current block enables the MMVD mode or not, whether the current block enables the CIIP mode or not, and whether the current block enables the TPM mode or not. And a way of acquiring the flag value of the regular merge mode includes: if the current block enables the subblock merge mode, or, the current block enables the MMVD mode, or, the current block enables the CIIP mode, or, the current block enables the TPM mode, reading the flag value of the regular merge mode from the flag indication information indicating whether to enable the regular merge mode carried in the encoded bitstream of the current block; otherwise, deriving the flag value of the regular merge mode be 1.

In a possible implementation, the decoding condition of the flag value of the subblock merge mode includes whether the current block enables the subblock merge mode or not, whether the current block enables the MMVD mode or not, whether the current block enables the CIIP mode or not, and whether the current block enables the TPM mode or not. And a way of acquiring the flag value of the subblock merge mode includes: if the current block enables the subblock merge mode and the current block enables the MMVD mode, or the current block enables the subblock merge mode and the current block enables the TPM mode, reading the flag value of the subblock merge mode from the flag indication information indicating whether to enable the subblock merge mode carried in the encoded bitstream of the current block; otherwise, when the current block enables the subblock merge mode, deriving the flag value of the subblock merge mode to be 1, and when the subblock merge mode is disabled for the current block, deriving the flag value of the subblock merge mode to be 0.

In a possible implementation, the decoding condition of the flag value of the MMVD mode includes whether the current block enables the MMVD mode or not, whether the current block enables the CIIP mode or not, and whether the current block enables the TPM mode or not. And a way of acquiring the flag value of the MMVD mode includes: if the current block enables the MMVD mode and the current block enables the CIIP mode, or the current block enables the MMVD mode and the current block enables the TPM mode, reading the flag value of the MMVD mode from the flag indication information indicating whether to enable the MMVD mode carried in the encoded bitstream of the current block; otherwise, when the current block enables the MMVD mode, deriving the flag value of the MMVD mode to be 1, and when the MMVD mode is disabled for the current block, driving the flag value of the MMVD mode to be 0.

The decoding condition of the flag value of the CIIP mode includes whether the current block enables the CIIP mode or not, and whether the current block enables the TPM mode or not. And a way of acquiring the flag value of the CIIP mode includes: if the current block enables the CIIP mode and the current block enables the TPM mode, reading the flag value of the CIIP mode from the flag indication information indicating whether to enable the CIIP mode carried in the encoded bitstream of the current block; otherwise, when the current block enables the CIIP mode, deriving the flag value of the CIIP mode to be 1, and when the CIIP mode is disabled for the current block, deriving the flag value of the CIIP mode to be 0.

Based on the above processing, the prediction-mode flag information of the current block may be acquired, and the target prediction mode used by the current block may be determined according to the prediction-mode flag information. As shown in FIG. 4E, if the flag value of the regular merge mode is 1, it is determined that the target prediction mode used by the current block is the regular merge mode. If the flag value of the regular merge mode is 0, and the flag value of the subblock merge mode is 1, it is determined that the target prediction mode used by the current block is the subblock merge mode. If the flag value of the regular merge mode is 0, the flag value of the subblock merge mode is 0, and the flag value of the MMVD mode is 1, it is determined that the target prediction mode used by the current block is the MMVD mode. If the flag value of the regular merge mode is 0, the flag value of the subblock merge mode is 0, the flag value of the MMVD mode is 0, and the flag value of the CIIP mode is 1, it is determined that the target prediction mode used by the current block is the CIIP mode. If the flag value of the regular merge mode is 0, the flag value of the subblock merge mode is 0, the flag value of the MMVD mode is 0, and the flag value of the CIIP mode 0, it is determined that the target prediction mode used by the current block is the TPM mode.

In a possible implementation, corresponding to the above processing flow of the decoder, for an encoder, the encoder determines the target prediction mode firstly, and then determines the prediction-mode flag information of the current block according to the target prediction mode, as shown in FIG. 4E. If the target prediction mode is the regular merge mode, the prediction-mode flag information includes: the flag value 1 of the regular merge mode is 1. Other implementation processes may be referred to Embodiment 3 with the decoding condition referred to Table 6.

On the basis of Embodiments 3-7, one GEO mode also may be added after the TPM mode. The GEO mode and the TPM mode are similar to each other, and only different in partitioning shape. In the GEO mode, a square block is partitioned into two sub-blocks of arbitrary shape (any other shapes except the shapes of the two triangular sub-blocks of the TPM mode, for example, the two sub-blocks may be one triangular sub-block and one pentagonal sub-block, or a triangular sub-block and a quadrilateral sub-block, or two trapezoidal sub-blocks), and the two sub-blocks have different unidirectional motion information. The following illustrates encoding and decoding methods for the prediction modes including the GEO mode in combination with specific embodiments.

Figure 4F:
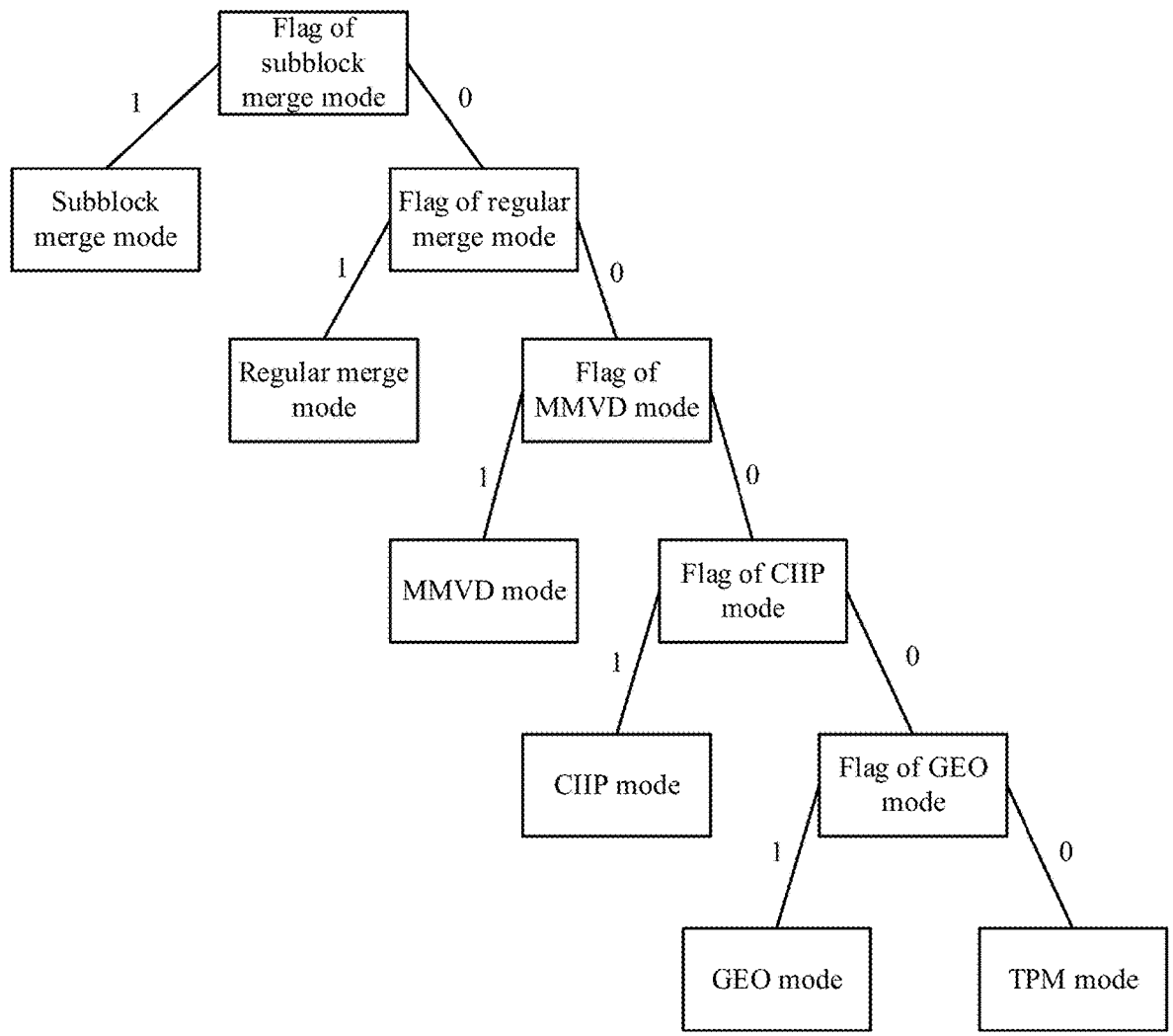

Embodiments 8: on the basis of Embodiment 3, a GEO mode may be added after the TPM mode, which is similar to Embodiment 3 in implementation process. FIG. 4F is a schematic diagram illustrating methods for encoding and decoding a prediction mode flag. The candidate prediction modes include the subblock merge mode, the regular merge mode, the MMVD mode, the CIIP mode, the TPM mode, and the GEO mode, and the acquisition sequence of flag values of the candidate prediction modes, from front to back, sequentially is: the flag value of the subblock merge mode, the flag value of the regular merge mode, the flag value of the MMVD mode, the flag value of the CIIP mode, and the flag value of the GEO mode.

When determining the prediction-mode flag information of a current block, the flag value of each prediction mode may be acquired in the following way.

The flag value of the subblock merge mode is acquired.

If the flag value of the subblock merge mode is 1, the acquisition of flag values of other modes is ended. In this case, the prediction-mode flag information includes the flag value of the subblock merge mode.

If the flag value of the subblock merge mode is 0, the acquisition of flag value of the regular merge mode is continued.

If the flag value of the regular merge mode is 1, the acquisition of flag values of other modes is ended. The prediction-mode flag information includes the flag value of the subblock merge mode and the flag value of the regular merge mode;

If the flag value of the regular merge mode is 0, the acquisition of the flag value of the MMVD mode is continued.

If the flag value of the MMVD mode is 1, the acquisition of flag values of other modes is ended. The prediction-mode flag information includes the flag value of the subblock merge mode, the flag value of the regular merge mode, and the flag value of the MMVD mode;

If the flag value of the MMVD mode is 0, the acquisition of the flag value of the CIIP mode is continued.

If the flag value of the CIIP mode is 1, the acquisition of flag values of other modes is ended. The prediction-mode flag information may include the flag value of the subblock merge mode, the flag value of the regular merge mode, the flag value of the MMVD mode, and the flag value of the CIIP mode.

If the flag value of the CIIP mode is 0, the acquisition of the flag value of the GEO mode is continued; after the flag value of the GEO mode is acquired, the acquisition of flag values of other modes is ended. The prediction-mode flag information may include the flag value of the subblock merge mode, the flag value of the regular merge mode, the flag value of the MMVD mode, the flag value of the CIIP mode and the flag value of the GEO mode.

In this embodiment, Table 7 shows an example of the decoding condition of the flag value of each prediction mode.

TABLE 7

| Flag | Decoding condition of flag value | Derived value when condition are not satisfied |
|---|---|---|
| Flag of subblock merge mode | the current block enables the subblock merge mode | 0 |
| Flag of regular merge mode | the current block enables the MMVD mode, or the current block enables the CIIP mode, or the current block enables the TPM mode | 1 |

TABLE 7-continued

| Flag | Decoding condition of flag value | Derived value when condition are not satisfied |
|---|---|---|
| Flag of MMVD mode | the current block enables the MMVD mode and the current block enables the CIIP mode, or, the current block enables the MMVD mode and the current block enables the TPM mode | the derived value is 1 when the current block enables the MMVD mode, or the derived value is 0 when the MMVD mode is disabled for the current block. |
| Flag of CIIP mode | the current block enables the CIIP mode and the current block enables the TPM mode | the derived value is 1 when the current block enables the CIIP mode, or the derived value is 0 when the CIIP mode is disabled for the current block. |
| flag of GEO mode | the current block enables the GEO mode and the current block enables the TPM mode | the derived value is 1 when the current block enables the GEO mode, or the derived value is 0 when the GEO mode is disabled for the current block. |

The decoding condition of the flag value of the subblock merge mode, the decoding condition of the flag value of the regular merge mode, the decoding condition of the flag value of the MMVD mode and the decoding condition of the flag value of the CIIP mode all may be referred to Embodiment 3, and will not be described here. In this embodiment, the decoding condition of the flag value of the added GEO mode are described below.

The decoding condition of the flag value of the GEO mode includes whether the current block enables the GEO mode or not and whether the current block enables the TPM mode or not. And a way of acquiring the flag value of the GEO mode may include: if the current block enables the GEO mode and the current block enables the TPM mode, reading the flag value of the GEO mode from the flag indication information indicating whether to enable the GEO mode carried in the encoded bitstream of the current block; otherwise, when the current block enables the GEO mode, deriving the flag value of the GEO mode to be 1, and when the GEO mode is disabled for the current block, deriving the flag value of the GEO mode to be 0.

Based on the above processing, the prediction-mode flag information of the current block may be acquired, and the target prediction mode used by the current block may be determined according to the prediction-mode flag information. As shown in FIG. 4F, if the flag value of the subblock merge mode is 1, it is determined that the target prediction mode used by the current block is the subblock merge mode. If the flag value of the subblock merge mode is 0, and the flag value of the regular merge mode is 1, it is determined that the target prediction mode used by the current block is the regular merge mode. If the flag value of the subblock merge mode is 0, the flag value of the regular merge mode is 0, and the flag value of the MMVD mode is 1, it is determined that the target prediction mode used by the current block is the MMVD mode. If the flag value of the subblock merge mode is 0, the flag value of the regular merge mode is 0, the flag value of the MMVD mode is 0, and the flag value of the CIIP mode is 1, it is determined that the target prediction mode used by the current block is the CIIP mode. If the flag value of the subblock merge mode is 0, the flag value of the regular merge mode is 0, the flag value of the MMVD mode is 0, the flag value of the CIIP mode 0, and the flag value of the GEO mode is 0, it is determined that the target prediction mode used by the current block is the TPM mode. If the flag value of the subblock merge mode is 0, the flag value of the regular merge mode is 0, the flag value of the MMVD mode is 0, the flag value of the CIIP mode 0, and the flag value of the GEO mode is 1, it is determined that the target prediction mode used by the current block is the GEO mode.

Figure 4G:
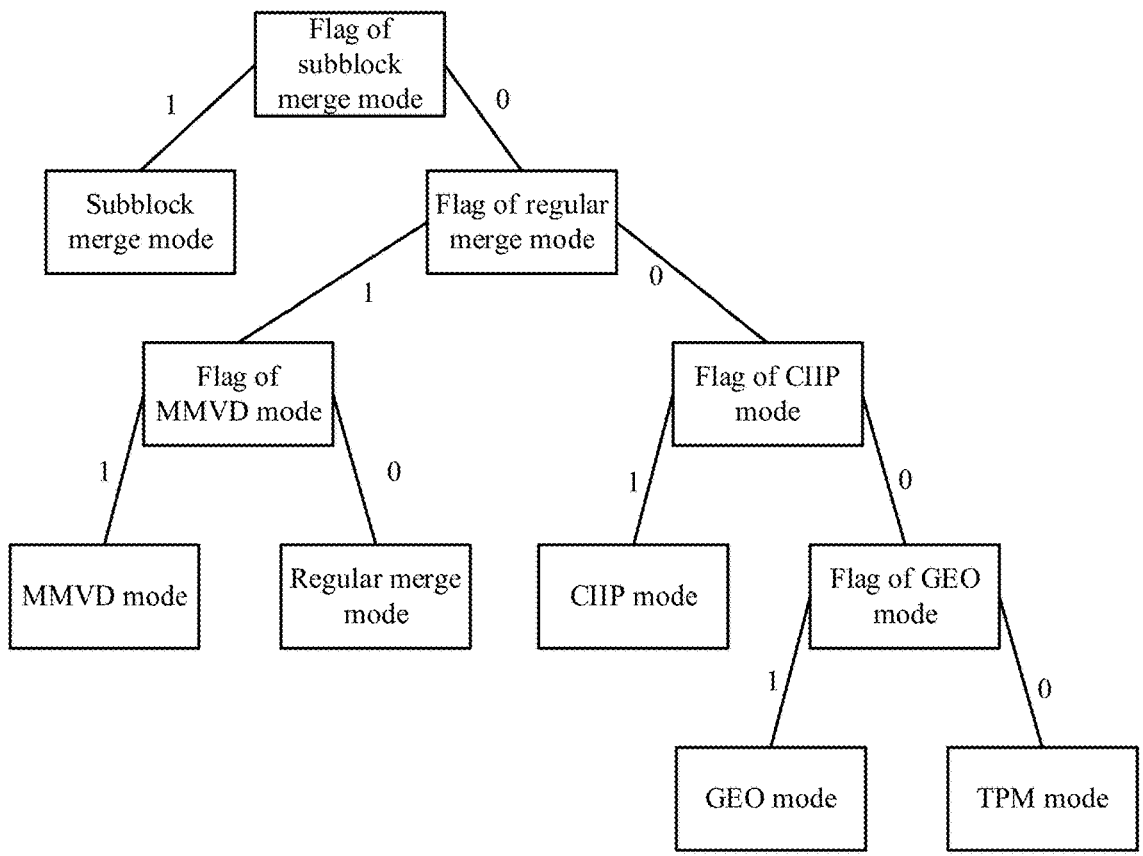

Embodiments 9: on the basis of Embodiment 4, a GEO mode may be added after the TPM mode, which is similar to Embodiment 4 in implementation process. FIG. 4G is a schematic diagram illustrating methods for encoding and decoding a prediction mode flag. The candidate prediction modes include the subblock merge mode, the regular merge mode, the MMVD mode, the CIIP mode, the TPM mode, and the GEO mode, and the acquisition sequence of flag values of the candidate prediction modes, from front to back, sequentially is: the flag value of the subblock merge mode, the flag value of the regular merge mode, the flag value of the MMVD mode, the flag value of the CIIP mode, and the flag value of the GEO mode.

When the prediction-mode flag information of the current block is determined, the flag value of each prediction mode may be acquired in the following way.

The flag value of the subblock merge mode is acquired.

If the flag value of the subblock merge mode is 1, the acquisition of flag values of other modes is ended. In this case, the prediction-mode flag information includes the flag value of the subblock merge mode.

If the flag value of the subblock merge mode is 0, the flag value of the regular merge mode is acquired.

If the flag value of the regular merge mode is 1, the flag value of the MMVD mode is acquired, and the acquisition of flag values of other modes is ended. In this case, the prediction-mode flag information includes the flag value of the subblock merge mode, the flag value of the regular merge mode, and the flag value of the MMVD mode.

If the flag value of the regular merge mode is 0, the flag value of the CIIP mode is acquired.

If the flag value of the CIIP mode is 1, the acquisition of flag values of other modes is ended. In this case, the prediction-mode flag information includes the flag value of the subblock merge mode, the flag value of the regular merge mode, and the flag value of the CIIP mode.

If the flag value of the CIIP mode is 0, the flag value of the GEO mode is acquired, and the acquisition of flag values of other modes is ended. The prediction-mode flag information include the flag value of the subblock merge mode, the flag value of the regular merge mode, the flag value of the CIIP mode, and the flag value of the GEO mode.

In this embodiment, Table 8 shows an example of the decoding condition of the flag value of each prediction mode.

TABLE 8

| Flag | Decoding condition of flag value | Derived value when condition are not satisfied |
|---|---|---|
| Flag of subblock merge mode | a current block enables the subblock merge mode | 0 |
| Flag of regular merge mode | the current block enables the CIIP mode, or, the current block enables the TPM mode | 1 |
| Flag of MMVD mode | the current block enables the MMVD mode | 0 |
| Flag of CIIP mode | the current block enables the CIIP mode and the current block enables the TPM mode | the derived value is 1 when the current block enables the CIIP mode, or the derived value is 0 when the CIIP mode is disabled for the current block. |
| flag of GEO mode | the current block enables the GEO mode and the current block enables the TPM mode | the derived value is 1 when the current block enables the GEO mode, or the derived value is 0 when the GEO mode is disabled for the current block. |

On the basis of Embodiment 4, the decoding condition of the flag value of the added GEO mode are described below.

The decoding condition of the flag value of the GEO mode includes whether the current block enables the CEO mode or not, and whether the current block enables the TPM mode or not. Acquiring the flag value of the GEO mode may include: if the current block enables the GEO mode and the current block enables the TPM mode, reading the flag value of the GEO mode from the flag indication information indicating whether to enable the GEO mode carried in the encoded bitstream of the current block; otherwise, when the current block enables the GEO mode, deriving the flag value of the GEO mode to be 1, and when the GEO mode is disabled for the current block, deriving the flag value of the GEO mode to be 0.

Based on the above processing, the prediction-mode flag information is acquired, and the target prediction mode used by the current block is determined according to the prediction-mode flag information. As shown in FIG. 4G, if the flag value of the subblock merge mode is 1, it is determined that the target prediction mode used by the current block is the subblock merge mode. If the flag value of the subblock merge mode is 0, the flag value of the regular merge mode is 1, and the flag value of the MMVD mode is 0, it is determined that the target prediction mode used by the current block is the regular merge mode. If the flag value of the subblock merge mode is 0, the flag value of the regular merge mode is 1, and the flag value of the MMVD mode is 1, it is determined that the target prediction mode used by the current block is the MMVD mode. If the flag value of the subblock merge mode is 0, the flag value of the regular merge mode is 0, and the flag value of the CIIP mode is 1, it is determined that the target prediction mode used by the current block is the CIIP mode. If the flag value of the subblock merge mode is 0, the flag value of the regular merge mode is 0, the flag value of the CIIP mode is 0, and the flag value of the GEO mode 0, it is determined that the target prediction mode used by the current block is the TPM mode. If the flag value of the subblock merge mode is 0, the flag value of the regular merge mode is 0, the flag value of the CIIP mode is 0, and the flag value of the GEO mode is 1, it is determined that the target prediction mode used by the current block is the GEO mode.

Figure 4H:
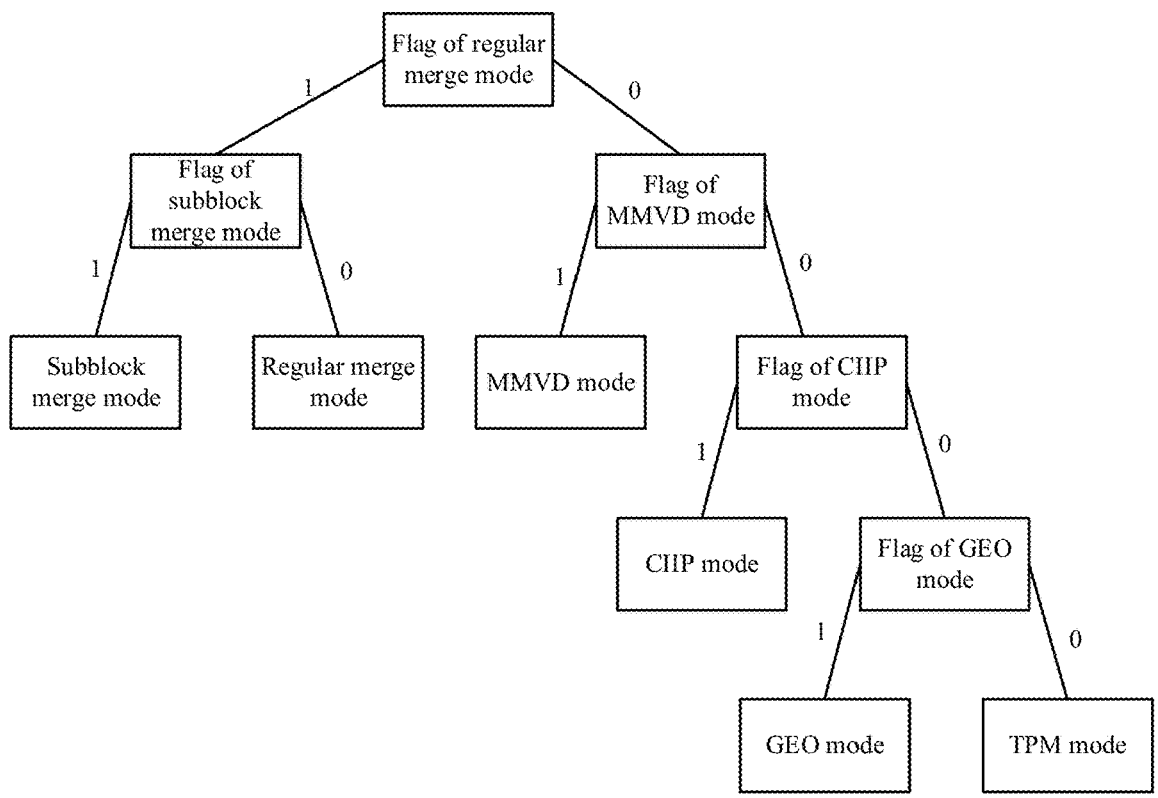

Embodiments 10: on the basis of Embodiment 5, a GEO mode may be added behind the TPM mode, which is similar to Embodiment 5 in implementation process. FIG. 4H shows a schematic diagram of methods for encoding and decoding a prediction mode flag. The candidate prediction modes include the subblock merge mode, the regular merge mode, the MMVD mode, the CIIP mode, the TPM mode, and the GEO mode, and the acquisition sequence of flag values of the candidate prediction modes, from front to back, may sequentially be: the flag value of the regular merge mode, the flag value of the subblock merge mode, the flag value of the MMVD mode, the flag value of the CIIP mode, and the flag value of the GEO mode.

When determining the prediction-mode flag information of the current block, the flag value of each prediction mode may be acquired in the following way.

The flag value of the regular merge mode is acquired. If the flag value of the regular merge mode is 1, the acquisition of the flag value of the subblock merge mode is continued, and the acquisition of flag values of other modes is ended.

If the flag value of the regular merge mode is 0, the acquisition of the flag value of the MMVD mode is continued.

If the flag value of the MMVD mode is 1, the acquisition of flag values of other modes is ended.

If the flag value of the MMVD mode is 0, the acquisition of the flag value of the CIIP mode is continued.

If the flag value of the CIIP mode is 1, the acquisition of flag values of other modes is ended. If the flag value of the CIIP mode is 0, the acquisition of the flag value of the GEO mode is continued, and the acquisition of flag values of other modes is ended.

The decoding condition of the flag value of the regular merge mode, the decoding condition of the flag value of the subblock merge mode, the decoding condition of the flag value of the MMVD mode and the decoding condition of the flag value of the CIIP mode may be referred to Table 4 in Embodiment 5. In this embodiment, the decoding condition of the flag value of the GEO mode are added. As an example, the decoding condition of the flag value of the GEO mode includes whether the current block enables the CEO mode or not, and whether the current block enables the TPM mode or not. A way of acquiring the flag value of the GEO mode may include: if the current block enables the GEO mode and the current block enables the TPM mode, reading the flag value of the GEO mode from the flag indication information indicating whether to enable the GEO mode carried in the encoded bitstream of the current block; otherwise, when the current block enables the GEO mode, deriving the flag value of the GEO mode to be 1, and when the GEO mode is disabled for the current block, deriving the flag value of the GEO mode to be 0.

Based on the above processing, the prediction-mode flag information of the current block may be acquired, and the target prediction mode used by the current block may be determined according to the prediction-mode flag information. As shown in FIG. 4H, if the flag value of the regular merge mode is 1, and the flag value of the subblock merge mode is 1, it is determined that the target prediction mode used by the current block is the subblock merge mode. If the flag value of the regular merge mode is 1, and the flag value of the subblock merge mode is 0, it is determined that the target prediction mode used by the current block is the regular merge mode. If the flag value of the regular merge mode is 0, and the flag value of the MMVD mode is 1, it is determined that the target prediction mode used by the current block is the MMVD mode. If the flag value of the regular merge mode is 0, the flag value of the MMVD mode is 0, and the flag value of the CIIP mode is 1, it is determined that the target prediction mode used by the current block is the CIIP mode. If the flag value of the regular merge mode is 0, the flag value of the MMVD mode is 0, the flag value of the CIIP mode is 0, and the flag value of the GEO mode 0, it is determined that the target prediction mode used by the current block is the TPM mode. If the flag value of the regular merge mode is 0, the flag value of the MMVD mode is 0, the flag value of the CIIP mode is 0, and the flag value of the GEO mode is 1, it is determined that the target prediction mode used by the current block is the GEO mode.

Figure 4I:
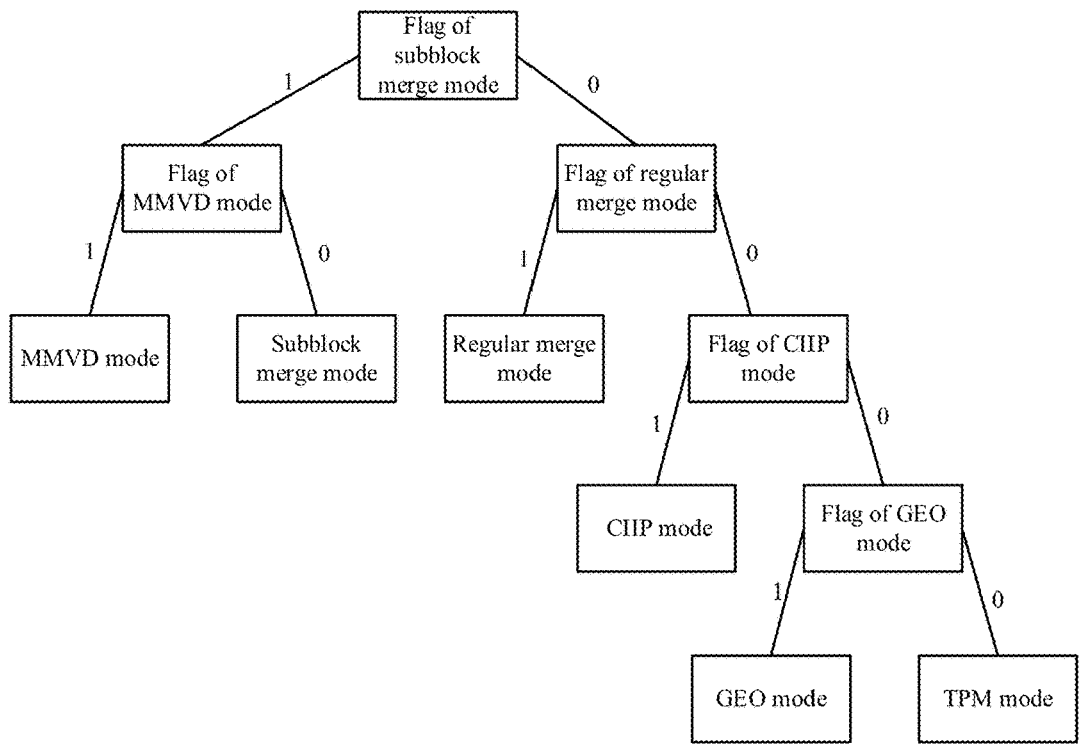

Embodiments 11: on the basis of Embodiment 6, a GEO mode may be added behind the TPM mode, which is similar to Embodiment 6 in implementation process. FIG. 4I is a schematic diagram illustrating methods for encoding and decoding a prediction mode flag. The candidate prediction modes include the subblock merge mode, the regular merge mode, the MMVD mode, the CIIP mode, the TPM mode, and the GEO mode, and the acquisition sequence of flag values of the candidate prediction modes, from front to back, sequentially is: the flag value of the subblock merge mode, the flag value of the MMVD mode, the flag value of the regular merge mode, the flag value of the CIIP mode, and the flag value of the GEO mode.

When the prediction-mode flag information of the current block is determined, the flag value of each prediction mode may be acquired in the following way.

The flag value of the subblock merge mode is acquired. If the flag value of the subblock merge mode is 1, the acquisition of the flag value of the MMVD mode is continued, and the acquisition process of the flag value acquisition process is ended.

If the flag value of the subblock merge mode is 0, the acquisition of flag values of the regular merge mode is continued.

If the flag value of the regular merge mode is 1, the acquisition of flag values of other modes is ended.

If the flag value of the regular merge mode is 0, the acquisition of the flag values of the CIIP mode is continued.

If the flag value of the CIIP mode is 1, the acquisition process of the flag value is ended. If the flag value of the CIIP mode is 0, the acquisition of the flag value of the GEO mode is continued, and the acquisition of flag values of other modes is ended.

The decoding condition of the flag value of the subblock merge mode, the decoding condition of the flag value of the MMVD mode, the decoding condition of the flag value of the regular merge mode and the decoding condition of the flag value of the CIIP mode may be referred to Table 5 in Embodiment 6. In this embodiment, the decoding condition of the flag value of the GEO mode are added. As an example, the decoding condition of the flag value of the GEO mode includes whether the current block enables the CEO mode or not, and whether the current block enables the TPM mode or not. A way of acquiring the flag value of the GEO mode may include: if the current block enables the GEO mode and the current block enables the TPM mode, reading the flag value of the GEO mode from the flag indication information indicating whether to enable the GEO mode carried in the encoded bitstream of the current block; otherwise, when the current block enables the GEO mode, deriving the flag value of the GEO mode to be 1, and when the GEO mode is disabled for the current block, driving the flag value of the GEO mode to be 0.

Based on the above processing, the prediction-mode flag information of the current block may be acquired, and the target prediction mode used by the current block may be determined according to the prediction-mode flag information. As shown in FIG. 4I, if the flag value of the subblock merge mode is 1, and the flag value of the MMVD mode is 1, it is determined that the target prediction mode used by the current block is the MMVD mode. If the flag value of the subblock merge mode is 1, and the flag value of the MMVD mode is 0, it is determined that the target prediction mode used by the current block is the subblock merge mode. If the flag value of the subblock merge mode is 0, and the flag value of the regular merge mode is 1, it is determined that the target prediction mode used by the current block is the regular merge mode. If the flag value of the subblock merge mode is 0, the flag value of the regular merge mode is 0, and the flag value of the CIIP mode is 1, it is determined that the target prediction mode used by the current block is the CIIP mode. If the flag value of the subblock merge mode is 0, the flag value of the regular merge mode is 0, the flag value of the CIIP mode is 0, and the flag value of the GEO mode 0, it is determined that the target prediction mode used by the current block is the TPM mode. If the flag value of the subblock merge mode is 0, the flag value of the regular merge mode is 0, the flag value of the CIIP mode is 0, and the flag value of the GEO mode is 1, it is determined that the target prediction mode used by the current block is the GEO mode.

Figure 4J:
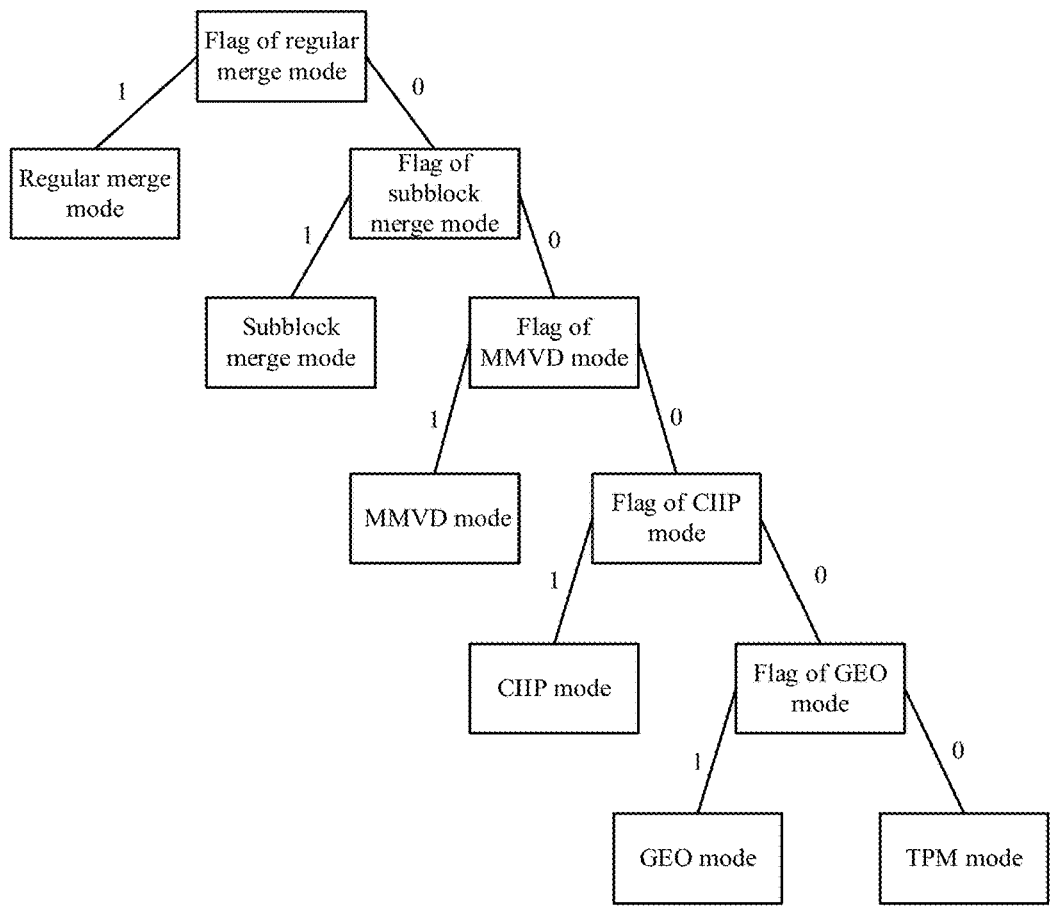

Embodiments 12: on the basis of Embodiment 7, a GEO mode may be added behind the TPM mode, which is similar to Embodiment 7 in implementation process. FIG. 4J is a schematic diagram illustrating methods for encoding and decoding a prediction mode flag. The candidate prediction modes include the subblock merge mode, the regular merge mode, the MMVD mode, the CIIP mode, the TPM mode, and the GEO mode, the acquisition sequence of flag values of the candidate prediction modes, from front to back, sequentially is: the flag value of the regular merge mode, the flag value of the subblock merge mode, the flag value of the MMVD mode, the flag value of the CIIP mode, and the flag value of the GEO mode.

When the prediction-mode flag information of the current block is determined, the flag value of each prediction mode may be acquired in the following way.

The flag value of the regular merge mode is acquired.

If the flag value of the regular merge mode is 1, the acquisition of flag values of other modes is ended.

If the flag value of the regular merge mode is 0, the acquisition of the flag value of the subblock mode is continued.

If the flag value of the subblock merge mode is 1, the acquisition of flag values of other modes is ended.

If the flag value of the subblock merge mode is 0, the acquisition of the flag value of the MMVD mode is continued.

If the flag value of the MMVD mode is 1, the acquisition process of the flag value acquisition process is ended.

If the flag value of the MMVD mode is 0, the acquisition of the flag value of the CIIP mode continued.

If the flag value of the CIIP mode is 1, the acquisition of flag values of other modes is ended. If the flag value of the CIIP mode is 0, the acquisition of the flag value of the GEO mode is continued, and the acquisition of flag values of other modes is ended.

The decoding condition of the flag value of the regular merge mode, the decoding condition of the flag value of the subblock merge mode, the decoding condition of the flag value of the MMVD mode and the decoding condition of the flag value of the CIIP mode may be referred to Table 6 in Embodiment 7. In this embodiment, the decoding condition of the flag value of the GEO mode are added. As an example, the decoding condition of the flag value of the GEO mode includes whether the current block enables the GEO mode and whether the current block enables the TPM mode. A way of acquiring the flag value of the GEO mode may include: if the current block enables the GEO mode and the current block enables the TPM mode, reading the flag value of the GEO mode from the flag indication information indicating whether to enable the GEO mode carried in the encoded bitstream of the current block; otherwise, when the current block enables the GEO mode, deriving the flag value of the GEO mode to be 1, and when the GEO mode is disabled for the current block, deriving the flag value of the GEO mode to be 0.

Based on the above processing, the prediction-mode flag information of the current block may be acquired, and the target prediction mode used by the current block may be determined according to the prediction-mode flag information. As shown in FIG. 4J, if the flag value of the regular merge mode is 1, it is determined that the target prediction mode used by the current block is the regular merge mode. If the flag value of the regular merge mode is 0, and the flag value of the subblock merge mode is 1, it is determined that the target prediction mode used by the current block is the subblock merge mode. If the flag value of the regular merge mode is 0, the flag value of the subblock merge mode is 0, and the flag value of the MMVD mode is 1, it is determined that the target prediction mode used by the current block is the MMVD mode. If the flag value of the regular merge mode is 0, the flag value of the subblock merge mode is 0, the flag value of the MMVD mode is 0, and the flag value of the CIIP mode is 1, it is determined that the target prediction mode used by the current block is the CIIP mode. If the flag value of the regular merge mode is 0, the flag value of the subblock merge mode is 0, the flag value of the MMVD mode is 0, the flag value of the CIIP mode 0, and the flag value of the GEO mode is 0, it is determined that the target prediction mode used by the current block is the TPM mode. If the flag value of the regular merge mode is 0, the flag value of the subblock merge mode is 0, the flag value of the MMVD mode is 0, the flag value of the CIIP mode 0, the flag value of the GEO mode is 1, it is determined that the target prediction mode used by the current Common is the GEO mode.

Of course, Embodiments 3-12 show only a few examples which are not limited herein. When the acquisition sequences of the flag values of the candidate prediction modes are different, different methods for encoding and decoding a prediction mode flag can be used. For example, the acquisition sequence of the flag values of the candidate prediction modes, from front to back, sequentially is: the flag value of the MMVD mode, the flag value of the regular merge mode, the flag value of the subblock merge mode and the flag value of the CIIP mode. In this case, for Embodiment 3, as shown in FIG. 4A, the position of the flag value of the MMVD mode and the position of the flag value of the subblock merge mode may be exchanged, so as to obtain a new implementation; for Embodiment 4, as shown in FIG. 4B, the position of the flag value of the MMVD mode and the position of the flag value of the subblock merge mode may be exchanged, so as to obtain a new implementation. In short, based on the acquisition sequence of the flag values of the candidate prediction modes, the structures of FIG. 4A-FIG. 4J may be used to determine the target prediction mode used by the current block.

Embodiment 13: with regard to Embodiments 1-12, when it is determined whether the current block enables the subblock merge mode, whether the current block enables the subblock merge mode may be determined in the following ways.

In a possible implementation, whether the current block enables the subblock merge mode may be determined in the following way: if the current block is allowed to enable an Affine mode or a subblock-based TMVP mode according to sequence-level control information, and the size information of the current block satisfies a first size restriction condition, it can be determined that the current block enables the subblock merge mode.

In another possible implementation, whether the current block enables the subblock merge mode may be determined in the following way: if the current block is allowed to enable an Affine mode or a subblock-based TMVP mode according to sequence-level control information, a length of a motion information list of the subblock merge mode is allowed to be greater than 0 according to the sequence-level control information, and the size information of the current block satisfies the first size restriction condition, it can be determined that the current block enables the subblock merge mode.

As an example, the first size restriction condition can be configured arbitrarily as required. For example, when a width value of the current block is greater than or equal to 8, and a height value of the current block is greater than or equal to 8, the size information of the current block satisfies the first size restriction condition.

Of course, the foregoing is just an example of the first size restriction condition, which is not restricted. For example, when the width value of the current block is greater than or equal to 16, and the height value of the current block is greater than or equal to 16, the size information of the current block satisfies the first size restriction condition. For another example, when the width value of the current block is greater than or equal to 8 and less than or equal to 64, and the height value of the current block is greater than or equal to 8 and less than or equal to 64, the size information of the current block satisfies the first size restriction condition.

For Embodiments 1-12, whether the current block enables the MMVD mode is determined. In a possible implementation, whether the current block enables the MMVD mode may be determined in the following way: if the current block is allowed to enable the MMVD mode according to sequence-level control information, it can be determined that the current block enables the MMVD mode. Of course, the foregoing is just an example, whether the current block enables the MMVD mode also may be determined with reference to other factors, which is not restricted herein. For example, if the current block is allowed to enable the MMVD mode according to the sequence-level control information, and the size information of the current block satisfies the size restriction condition, such as the width value of the current block is greater than or equal to 8 and the height value of the current block is greater than or equal to 8, it can be determined that the current block enables the MMVD mode.

With regard to Embodiments 1-12, it is determined whether the current block enables the CIIP mode. In a possible implementation, whether the current block enables the CIIP mode may be determined in the following way: if the current block is allowed to enable the CIIP mode according to sequence-level control information, the skip mode is disabled for the current block, and the size information of the current block satisfies a second size restriction condition, it can be determined that the current block enables the CIIP mode. Of course, the foregoing is just an example, which is not restricted.

As an example, the second size restriction condition can be configured arbitrarily as required. For example, if a product of the width value of the current block and the height value of the current block is greater than or equal to 64, the width value of the current block is less than 128, and the height value of the current block is less than 128, the size information of the current block satisfies the second size restriction condition. Of course, the foregoing is an example of the second size restriction condition, which is not restricted.

For example, if the width value of the current block is greater than or equal to 64 and less than 128, and the height value of the current block is greater than or equal to 64 and less than 128, the size information of the current block satisfies the second size restriction condition. For another example, when the width value of the current block is greater than or equal to 8 and less than 128, and the height value of the current block is greater than or equal to 8 and less than 128, the size information of the current block satisfies the second size restriction condition. For another example, when the width value of the current block is greater than or equal to 64, and the height value of the current block is greater than or equal to 64, the size information of the current block satisfies the second size restriction condition. For another example, if the width value of the current block is less than 128, and the height value of the current block is less than 128, the size information of the current block satisfies the second size restriction condition.

With regard to Embodiments 1-7, it is determined whether the current block enables the TPM mode, and whether the current block enables the TPM mode may be determined in the following several ways.

In a possible implementation, whether the current block enables the TPM mode may be determined in the following way: if the current block is allowed to enable the TPM mode according to sequence-level control information, a slice type of a picture containing the current block is B slice, and the size information of the current block satisfies a third size restriction condition, it can be determined that the current block enables the TPM mode.

In another possible implementation, whether the current block enables the TPM mode may be determined in the following way: if the current block is allowed to enable the TPM mode according to sequence-level control information, a length of a motion information list of the TPM mode is allowed to be greater than or equal to 2 according to the sequence-level control information, the slice type of the picture containing the current block is B slice, and the size information of the current block satisfies the third size restriction condition, it can be determined that the current block enables the TPM mode.

With regard to Embodiments 1, 2, 8-12, it is determined whether the current block enables the TPM mode, and whether the current block enables the TPM mode may be determined in the following ways.

In a possible implementation, whether the current block enables the TPM mode may be determined in the following way: if the current block is allowed to enable the TPM mode or the GEO mode according to sequence-level control information, the slice type of the picture containing the current block is B slice, and the size information of the current block satisfies the third size restriction condition, it can be determined that the current block enables the TPM mode.

In another possible implementation, whether the current block enables the TPM mode may be determined in the following way: if the current block is allowed to enable the TPM mode according to sequence-level control information and the length of a motion information list of the TPM mode is allowed to be greater than or equal to 2 according to the sequence-level control information; or, the current block is allowed to enable the GEO mode according to the sequence-level control information and a length of the motion information list of the GEO mode is allowed to be greater than or equal to 2 according to the sequence-level control information; on the basis of satisfying the above condition, if the following condition are satisfied: the slice type of the picture containing the current block is B slice, and the size information of the current block satisfies the third size restriction condition, it can be determined that the current block enables the TPM mode.

As an example, the third size restriction condition can be configured arbitrarily as required. For example, when a product of the width value of the current block and the height value of the current block is greater than or equal to 64, the size information of the current block satisfies the third size restriction condition.

Of course, the foregoing is an example of the third size restriction condition, which is not restricted. For another example, when the width value of the current block is greater than or equal to 8, and the height value of the current block is greater than or equal to 8, the size information of the current block may satisfy the third size restriction condition. For another example, when the width value of the current block is greater than or equal to 8 and less than 128, and the height value of the current block is greater than or equal to 8 and less than 128, the size information of the current block may satisfy the third size restriction condition.

With regard to Embodiments 8-12, it is determined whether the current block enables the GEO mode.

In a possible implementation, whether the current block enables the GEO mode may be determined in the following way: if the current block is allowed to enable the GEO mode according to sequence-level control information, the slice type of the picture containing the current block is B slice, and the size information of the current block satisfies a fourth size restriction condition, it can be determined that the current block enables the GEO mode.

As an example, the fourth size restriction condition can be configured arbitrarily as required. For example, when a product of the width value of the current block and height value of the current block is greater than or equal to 64, the size information of the current block satisfies the fourth size restriction condition.

Of course, the foregoing is an example of the fourth size restriction condition, which is not restricted. For another example, when the width value of the current block is greater than or equal to 8, and the height value of the current block is greater than or equal to 8, the size information of the current block may satisfy the fourth size restriction condition. For another example, when the width value of the current block is greater than or equal to 8 and less than 128, and the height value of the current block is greater than or equal to 8 and less than 128, the size information of the current block may satisfy the fourth size restriction condition.

Figure 5A:
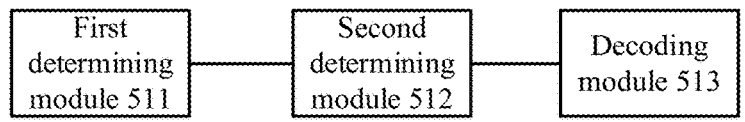
FIG. 5A is a structure diagram illustrating a decoding apparatus according to an embodiment of the present disclosure.

Embodiment 14:

Based on the same application concept as the above method, one or more embodiments of the present disclosure also propose a decoding apparatus, which is applied to a decoder. FIG. 5A is a structure diagram of the apparatus. The apparatus may include:

a first determining module 511, configured to determine prediction-mode flag information of a current block, where the prediction-mode flag information includes a flag value of each of one or more of N candidate prediction modes; the flag value being a first value indicates that the candidate prediction mode is enabled, and the flag value being a second value indicates that the candidate prediction mode is disabled; and for the flag value of each candidate prediction mode, if the current block satisfies decoding condition of the flag value of the candidate prediction mode, the flag value is read from flag indication information indicating whether to enable the candidate prediction mode carried in an encoded bitstream of the current block; and if the current block does not satisfy the decoding condition of the flag value of the candidate prediction mode, the flag value is a derived flag value of the candidate prediction mode;

a second determining module 512, configured to determine a target prediction mode used by the current block according to the prediction-mode flag information, where the target prediction mode is one of the N candidate prediction modes; and a decoding module 513, configured to decode the current block according to the target prediction mode.

The N candidate prediction modes include one or more of the following modes: subblock merge mode, regular merge mode, MMVD mode, CIIP mode, TPM mode and GEO mode.

The first determining module 511 is specifically configured to: determine the prediction-mode flag information according to an acquisition sequence of flag values of the N candidate prediction modes, where, if the N candidate prediction modes include the subblock merge mode, the regular merge mode, the MMVD mode and the CIIP mode, the acquisition sequence of the flag values of the N candidate prediction modes, from front to back, sequentially is: the flag value of the subblock merge mode, the flag value of the regular merge mode, the flag value of the MMVD mode and the flag value of the CIIP mode; or, if the N candidate prediction modes include the subblock merge mode, the regular merge mode, the MMVD mode, the CIIP mode, and the GEO mode, the acquisition sequence of the flag values of the N candidate prediction modes, from front to back, sequentially is: the flag value of the subblock merge mode, the flag value of the regular merge mode, the flag value of the MMVD mode, the flag value of the CIIP mode, and the flag value of the GEO mode.

The first determining module 511 is specifically configured to: based on the acquisition sequence of the flag values of the N candidate prediction modes, after a flag value of the current candidate prediction mode is acquired, determine whether to acquire the flag values of the candidate prediction modes behind the current candidate prediction mode according to the flag value of the current candidate prediction mode.

When the acquisition sequence of the flag values of the N candidate prediction modes, from front to back, sequentially is: the flag value of the subblock merge mode, the flag value of the regular merge mode, the flag value of the MMVD mode, and the flag value of the CIIP mode, the first determining module 511 is configured to acquire the flag values of the candidate prediction modes in the following way:

The flag value of the subblock merge mode is acquired; if the flag value of the subblock merge mode is the first value, the acquisition of flag values of other modes is ended; if the flag value of the subblock merge mode is the second value, the flag value of the regular merge mode is acquired; if the flag value of the regular merge mode is the first value, the acquisition of flag values of other modes is ended; if the flag value of the regular merge mode is the second value, the flag value of the MMVD mode is acquired; if the flag value of the MMVD mode is the first value, the acquisition of flag values of other modes is ended; and if the flag value of the MMVD mode is the second value, the flag value of the CIIP mode is acquired, and the acquisition of flag values of other modes is ended;

Alternatively, the flag value of the subblock merge mode is acquired; if the flag value of the subblock merge mode is the first value, the acquisition of flag values of other modes is ended; if the flag value of the subblock merge mode is the second value, the flag value of the regular merge mode is acquired; if the flag value of the regular merge mode is the first value, the flag value of the MMVD mode is acquired, and the acquisition process of the flag value is ended; and if the flag value of the regular merge mode is the second value, the flag value of the CIIP mode is acquired, and the acquisition of flag values of other modes is ended.

When the acquisition sequence of the flag values of the N candidate prediction modes, from front to back, sequentially is: the flag value of the subblock merge mode, the flag value of the regular merge mode, the flag value of the MMVD mode, the flag value of the CIIP mode, and the flag value of the GEO mode, the first determining module 511 is configured to acquire the flag values of the candidate prediction modes in the following way:

The flag value of the subblock merge mode is acquired; if the flag value of the subblock merge mode is the first value, the acquisition of flag values of other modes is ended; if the flag value of the subblock merge mode is the second value, the flag value of the regular merge mode is acquired; if the flag value of the regular merge mode is the first value, the acquisition of flag values of other modes is ended; if the flag value of the regular merge mode is the second value, the flag value of the MMVD mode is acquired; if the flag value of the MMVD mode is the first value, the acquisition of flag values of other modes is ended; if the flag value of the MMVD mode is the second value, the flag value of the CIIP mode is acquired; if the flag value of the CIIP mode is the first value, the acquisition of flag values of other modes is ended; if the flag value of the CIIP mode is the second value, the flag value of the GEO mode is acquired, and the acquisition of flag values of other modes is ended; or, the flag value of the subblock merge mode is acquired; if the flag value of the subblock merge mode is the first value, the acquisition process of the flag value is ended; if the flag value of the subblock merge mode is the second value, the flag value of the regular merge mode is acquired; if the flag value of the regular merge mode is the first value, the flag value of the MMVD mode is acquired, and the acquisition of flag values of other modes is ended; if the flag value of the regular merge mode is the second value, the flag value of the CIIP mode is acquired; if the flag value of the CIIP mode is the first value, the acquisition of flag values of other modes is ended; and if the flag value of the CIIP mode is the second value, the flag value of the GEO mode is acquired, and the acquisition of flag values of other modes is ended.

Decoding condition of the flag value of the subblock merge mode include whether the current block enables the subblock merge mode, so the first determining module 511 is further configured to: if the current block enables the subblock merge mode, read the flag value of the subblock merge mode from the flag indication information indicating whether to enable the subblock merge mode carried in the encoded bitstream of the current block; otherwise, derive that the flag value of the subblock merge mode to be the second value.

The decoding condition of the flag value of the regular merge mode may includes whether the current block enables the MMVD mode, whether the current block enables the CIIP mode and whether the current block enables the TPM mode, so the first determining module 511 is further configured to: if the current block enables the MMVD mode, or, the current block enables the CIIP mode, or, the current block enables the TPM mode, read the flag value of the regular merge mode from the flag indication information indicating whether to enable the regular merge mode carried in the encoded bitstream of the current block; otherwise, derive that the flag value of the regular merge mode to be the first value.

Optionally, the decoding condition of the flag value of the regular merge mode includes whether the current block enables the CIIP mode and whether the current block enables the TPM mode, so the first determining module 511 is further configured to: if the current block enables the CIIP mode, or, the current block enables the TPM mode, read the flag value of the regular merge mode from the flag indication information indicating whether to enable the regular merge mode carried in the encoded bitstream of the current block; otherwise, derive that the flag value of the regular merge mode to be the first value.

The decoding condition of the flag value of the MMVD mode includes whether the current block enables the MMVD mode, whether the current block enables the CIIP mode and whether the current block enables the TPM mode, so the first determining module 511 is further configured to: if the current block enables the MMVD mode and the current block enables the CIIP mode, or, the current block enables the MMVD mode and the current block enables the TPM mode, read the flag value of the MMVD mode from the flag indication information indicating whether to enable the MMVD mode carried in the encoded bitstream of the current block; otherwise, derive that the flag value of the MMVD mode is the first value when the current block enables the MMVD mode, and derive that the flag value of the MMVD mode is the second value when the MMVD mode is disabled for the current block.

Optionally, the decoding condition of the flag value of the MMVD mode includes whether the current block enables the MMVD mode, so the first determining module is further configured to: if the current block enables the MMVD mode, read the flag value of the MMVD mode from the flag indication information indicating whether to enable the MMVD mode carried in the encoded bitstream of the current block; otherwise, derive that the flag value of the MMVD mode is the second value.

The decoding condition of the flag value of the CIIP mode includes whether the current block enables the CIIP mode and whether the current block enables the TPM, so the first determining module 511 is further configured to: if the current block enables the CIIP mode and the current block enables the TPM mode, read the flag value of the CIIP mode from the flag indication information indicating whether to enable the CIIP mode carried in the encoded bitstream of the current block; otherwise, derive that the flag value of the CIIP is the first value when the current block enables the CIIP mode, and derive the flag value of the CIIP is the second value when the CIIP mode is disabled for the current block.

The decoding condition of the flag value of the GEO mode includes whether the current block enables the GEO mode and whether the current block enables the TPM mode, so the first determining module 511 is further configured to: if the current block enables the GEO mode and the current block enables the TPM mode, read the flag value of the GEO mode from the flag indication information indicating whether to enable the GEO mode carried in the encoded bitstream of the current block; otherwise, derive that the flag value of the GEO is the first value when the current block enables the GEO mode, and derive that the flag value of the GEO is the second value when the GEO mode is disabled for the current block.

The second determining module 512 is specifically configured to: if the flag value of the subblock merge mode is the first value, determine that the target prediction mode used by the current block is the subblock merge mode.

The second determining module 512 is specifically configured to: if the flag value of the subblock merge mode is the second value, and the flag value of the regular merge mode is the first value, determine that the target prediction mode used by the current block is the regular merge mode; or, if the flag value of the subblock merge mode is the second value, the flag value of the regular merge mode is the first value, and the flag value of the MMVD mode is the second value, determine that the target prediction mode used by the current block is the regular merge mode.

The second determining module 512 is specifically configured to: if the flag value of the subblock merge mode is the second value, the flag value of the regular merge mode is the second value, and the flag value of the MMVD mode is the first value, determine that the target prediction mode used by the current block is the MMVD mode; or, if the flag value of the subblock merge mode is the second value, the flag value of the regular merge mode is the first value, and the flag value of the MMVD mode is the first value, determine that the target prediction mode used by the current block is the MMVD mode.

The second determining module 512 is specifically configured to: if the flag value of the subblock merge mode is the second value, the flag value of the regular merge mode is the second value, the flag value of the MMVD mode is the second value, and the flag value of the CIIP mode is the first value, determine that the target prediction mode used by the current block is the CIIP mode; or, if the flag value of the subblock merge mode is the second value, the flag value of the regular merge mode is the second value, and the flag value of the CIIP mode is the first value, determine that the target prediction mode used by the current block is the CIIP mode.

The second determining module 512 is specifically configured to: if the flag value of the subblock merge mode is the second value, the flag value of the regular merge mode is the second value, the flag value of the MMVD mode is the second value, and the flag value of the CIIP mode is the second value, determine that the target prediction mode used by the current block is the TPM mode; or, if the flag value of the subblock merge mode is the second value, the flag value of the regular merge mode is the second value, and the flag value of the CIIP mode is the second value, determine that the target prediction mode used by the current block is the TPM mode; or, if the flag value of the subblock merge mode is the second value, the flag value of the regular merge mode is the second value, the flag value of the MMVD mode is the second value, the flag value of the CIIP mode is the second value, and the flag value of the GEO mode is the second value, determine that the target prediction mode used by the current block is the TPM mode; or, if the flag value of the subblock merge mode is the second value, the flag value of the regular merge mode is the second value, the flag value of the CIIP mode is the second value, and the flag value of the GEO mode is the second value, determine that the target prediction mode used by the current block is the TPM mode.

The second determining module 512 is specifically configured to: if the flag value of the subblock merge mode is the second value, the flag value of the regular merge mode is the second value, the flag value of the MMVD mode is the second value, the flag value of the CIIP mode is the second value, and the flag value of the GEO mode is the first value, determine that the target prediction mode used by the current block is the GEO mode; or, if the flag value of the subblock merge mode is the second value, the flag value of the regular merge mode is the second value, the flag value of the CIIP mode is the second value, and the flag value of the GEO mode is the first value, determine that the target prediction mode used by the current block is the GEO mode.

The first determining module 511 is further configured to determine that the current block enables the subblock merge mode in the following way: if the current block is allowed to enable an affine mode or a subblock-based TMVP mode according to sequence-level control information, and size information of the current block satisfies a first size restriction condition, it can be determined that the current block enables the subblock merge mode.

The first determining module 511 is further configured to determine that the current block enables the MMVD mode in the following way: if the current block is allowed to enable the MMVD mode according to sequence-level control information, it can be determined that the current block enables the MMVD mode.

The first determining module 511 is further configured to determine that the current block enables the CIIP mode in the following way: if the current block is allowed to enable the CIIP mode according to sequence-level control information, the skip mode is disabled for the current block, and the size information of the current block satisfies a second size restriction condition, it can be determined that the current block enables the CIIP mode.

The first determining module 511 is also configured to determine that the current block enables the TPM mode in the following way: if the current block is allowed to enable the TPM mode according to sequence-level control information, a slice type of a picture containing the current block is B slice, and the size information of the current block satisfies a third size restriction condition, it can be determined that the current block enables the TPM mode; or, if the current block is allowed to enable the TPM mode or the GEO mode according to the sequence-level control information, the slice type of the picture containing the current block is B slice, and the size information of the current block satisfies the third size restriction condition, it can be determined that the current block enables the TPM mode.

The first determining module 511 is further configured to determine that the current block enables the GEO mode in the following way: if the current block is allowed to enable the GEO mode according to sequence-level control information, the slice type of the picture containing the current block is B slice, and the size information of the current block satisfies a fourth size restriction condition, it can be determined that the current block enables the GEO mode.

Figure 5B:
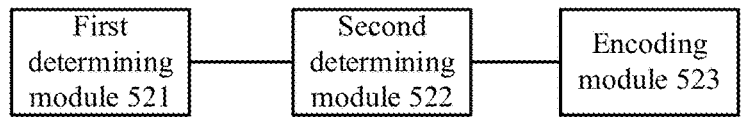
FIG. 5B is a structure diagram illustrating an encoding apparatus according to an embodiment of the present disclosure.

Based on the same application concept as the above method, one or more of embodiments of the present disclosure also provide an encoding apparatus, which is applied to an encoder. FIG. 5B is a structure diagram of the encoding apparatus. The encoding apparatus may include:

a first determining module 521, configured to determine a target prediction mode used by a current block, where the target prediction mode is one of N candidate prediction modes of the current block;

a second determining module 522, configured to determine prediction-mode flag information of the current block according to the target prediction mode, where the prediction-mode flag information includes a flag value of each of one or more of the N candidate prediction modes; when the flag value is a first value, it indicates that the candidate prediction mode is enabled, and when the flag value is a second value, it indicates that the candidate prediction mode is disabled; and an encoding module 523, configured to encode the current block according to the prediction-mode flag information, where for the flag value of one of the N candidate prediction modes included in the prediction-mode flag information, if the current block satisfies the decoding condition for the flag value of the candidate prediction mode, an encoded bitstream of the current block carries flag indication information indicating whether to enable the candidate prediction mode; and if the current block does not satisfy the decoding condition for the flag value of the candidate prediction mode, the encoded bitstream of the current block does not carry flag indication information indicating whether to enable the candidate prediction mode.

Figure 6A:
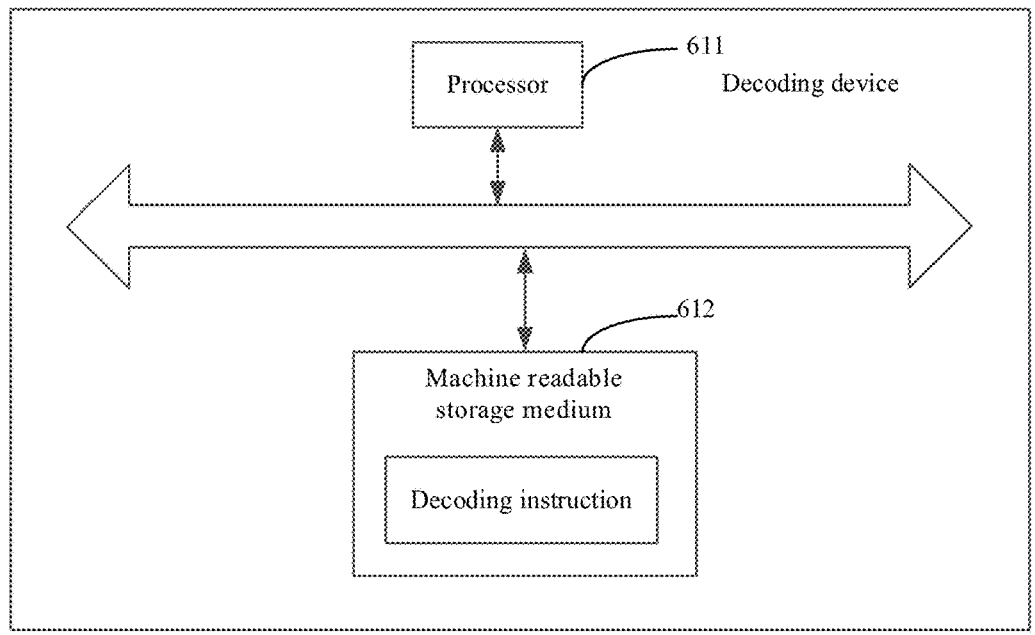
FIG. 6A is a structure diagram illustrating a decoding device according to an embodiment of the present disclosure.

In terms of hardware, the hardware architecture schematic diagram of the decoding device provided by the embodiments of the present disclosure is shown in FIG. 6A. The decoding device includes: a processor 611 and a machine-readable storage medium 612, where the machine-readable storage medium stores machine-executable instructions that can be invoked by the processor 611; and the processor 611 is configured to invoke the machine-executable instructions to implement the above-mentioned methods provided by the present disclosure. For example, the processor 611 is configured to invoke the machine-executable instructions to implement the following steps: determining prediction-mode flag information of a current block, where the prediction-mode flag information includes a flag value of each of one or more of N candidate prediction modes; when the flag value is a first value, it indicates that the candidate prediction mode is enabled, and when the flag value is a second value, it indicates that the candidate prediction mode is disabled; and for the flag value of one of the N candidate prediction modes, if the current block satisfies the decoding condition for the flag value of the candidate prediction mode, the flag value is read from flag indication information indicating whether to enable the candidate prediction mode carried in an encoded bitstream of the current block; and if the current block does not satisfy the decoding condition for the flag value of the candidate prediction mode, the flag value is a derived flag value of the candidate prediction mode; determining a target prediction mode used by the current block according to the prediction-mode flag information, where the target prediction mode is one of the N candidate prediction modes; and decoding the current block according to the target prediction mode.

Figure 6B:
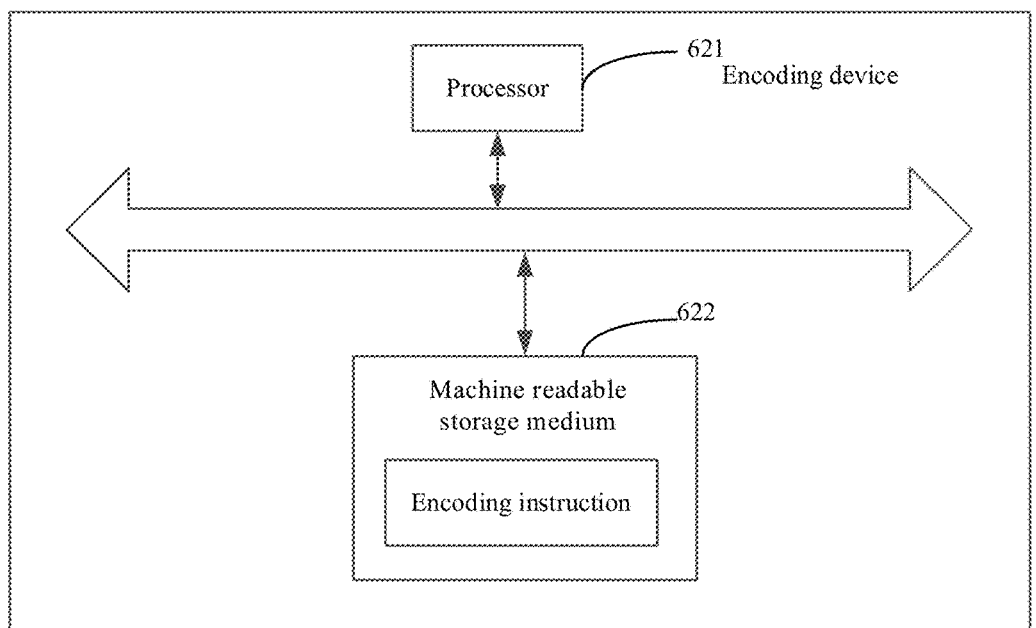
FIG. 6B is a structure diagram illustrating an encoding device according to an embodiment of the present disclosure.

In terms of hardware, the hardware architecture schematic diagram of the encoding device provided by the embodiments of the present disclosure is shown in FIG. 6B. The encoding device includes: a processor 621 and a machine-readable storage medium 622, where the machine-readable storage medium 622 stores machine-executable instructions that can be invoked by the processor 621; and the processor 621 is configured to invoke the machine-executable instructions to implement the above-mentioned methods provided by the present disclosure. For example, the processor 621 is configured to invoke the machine-executable instructions to implement the following steps: determining a target prediction mode used by a current block, where the target prediction mode is one of N candidate prediction modes of the current block; according to the target prediction mode, determining prediction-mode flag information of the current block, where the prediction-mode flag information includes a flag value of each of one or more of the N candidate prediction modes; when the flag value is a first value, it indicates that the candidate prediction mode is enabled, or when the flag value is a second value, it indicates that the candidate prediction mode is disabled; and encoding the current block according to the prediction-mode flag information, where for the flag value of one of the N candidate prediction modes included in the prediction-mode flag information, if the current block satisfies the decoding condition for the flag value of the candidate prediction mode, an encoded bitstream of the current block carries flag indication information indicating whether to enable the candidate prediction mode; or if the current block does not satisfy the decoding condition for the flag value of the candidate prediction mode, the encoded bitstream of the current block does not carry flag indication information indicating whether to enable the candidate prediction mode.

Based on the same application conception as the above method, an embodiment of the present disclosure also provides a machine-readable storage medium, the machine-readable storage medium stores several computer instructions. When the computer instructions are invoked by a processor, the decoding method or encoding method disclosed by the above embodiments can be implemented. Where, the machine-readable storage medium may be any electronic, magnetic, optical or other physical storage device, and may contain or store information such as executable instructions, and data, etc. For example, the machine-readable storage medium may be a Radom Access Memory (RAM), a volatile memory, a non-volatile memory, a flash memory, a memory driver (such as a hard disk drive), a solid state drive, storage disks of any type (such as compact discs, DVDS, etc.), or similar storage mediums, or a combination thereof.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a tablet computer, wearable device, or combinations of any several devices of these devices.

For the convenience of description, the above-mentioned apparatus, when described, is divided into various units by function for descriptions. When the present disclosure is implemented, the functions of each unit can be implemented in one or more software and/or hardware. Those skilled in the art should understand that the embodiments of the present disclosure may be provided as methods, systems, or computer program products. Therefore, the present disclosure may take the form of a pure hardware implementation, a pure software implementation, or an implementation combining software and hardware. Furthermore, the embodiments of the present disclosure may take the form of a computer program product implemented on one or more computer available storage mediums (including but not limited to disk memories, CD-ROM, optical memories, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processor, or other programmable data processing equipment to produce a machine, so that the instructions invoked by the processor or other programmable data processing device generate a device for implementing functions specified in one or more flows in the flowchart and/or in one or more blocks in the block diagram. These computer program instructions may also be stored in a computer readable memory capable of directing a computer or other programmable data processing device to operate in a particular manner, so that the instructions stored in the computer readable memory generate a manufactured product including an instruction device, where the instruction device implements the functions specified in one or more flows in the flowchart and/or one or more blocks in the block diagram.

These computer program instructions can also be loaded onto a computer or other programmable data processing device, so that a series of operating steps may be performed on the computer or other programmable device to generate computer-implemented processing, and thus instructions invoked on the computer or other programmable device provide steps for implementing the function specified in one or more flows in the flowchart and/or one or more blocks in the block diagram. The above descriptions are only some examples of the present disclosure, and are not used to limit the present disclosure. For those skilled in the art, the present disclosure may have various changes and modifications. Any modifications, equivalent replacements, improvements, etc. made in the spirit and principle of this present disclosure shall fall within the scope of claims of the present disclosure.

What is claimed is:

1. A decoding method, comprising:
   determining prediction-mode flag information of a current block, wherein the prediction-mode flag information comprises a flag value of each of one or more of N candidate prediction modes; and for each of the one or more of the N candidate prediction modes, the flag value of the candidate prediction mode being a first value indicates that the candidate prediction mode is enabled, or the flag value of the candidate prediction mode being a second value indicates that the candidate prediction mode is disabled; and for the flag value of one of the N candidate prediction modes, in response to determining that the current block satisfies a decoding condition for the flag value of the candidate prediction mode, the flag value is read from flag indication information indicating whether to enable the candidate prediction mode carried in an encoded bitstream of the current block, or in response to determining that the current block does not satisfy the decoding condition for the flag value of the candidate prediction mode, the flag value is a derived flag value of the candidate prediction mode;
   determining a target prediction mode used by the current block according to the prediction-mode flag information, wherein the target prediction mode is one of the N candidate prediction modes; and
   decoding the current block according to the target prediction mode;
   wherein the N candidate prediction modes comprise: the subblock merge mode, the regular merge mode, the MMVD mode, and the CIIP mode; and determining the prediction-mode flag information of the current block and determining the target prediction mode used by the current block according to the prediction-mode flag information comprises:
   acquiring the flag value of the subblock merge mode;
   in response to determining that the flag value of the subblock merge mode is the first value, determining that the target prediction mode is the subblock merge mode;
   in response to determining that the flag value of the subblock merge mode is the second value, acquiring the flag value of the regular merge mode;
      in response to determining that the flag value of the regular merge mode is the first value, acquiring the flag value of the MMVD mode, and determining the target prediction mode according to the flag value of the MMVD mode; and
      in response to determining that the flag value of the regular merge mode is the second value, acquiring the flag value of the CIIP mode, and determining the target prediction mode according to the flag value of the CIIP mode.

2. The method of claim 1, wherein the N candidate prediction modes comprise one or more of: subblock merge mode, regular merge mode, merge with motion vector differences (MMVD) mode, combine inter intra prediction (CIIP) mode or geometrical partitioning (GEO) mode.

3. The method of claim 1, wherein determining the target prediction mode according to the flag value of the MMVD mode, comprises:
   in response to determining that the flag value of the MMVD mode is the first value, determining that the target prediction mode is the MMVD mode;
   in response to determining that the flag value of the MMVD mode is the second value, determining that the target prediction mode is the regular merge mode;
   determining the target prediction mode according to the flag value of the CIIP mode, comprising:
   in response to determining that the flag value of the CIIP mode is the first value, determining that the target prediction mode is the CIIP mode.

4. The method of claim 1, wherein the N candidate prediction modes comprise: the subblock merge mode, the regular merge mode, the CIIP mode, and the GEO mode,
   determining the target prediction mode according to the flag value of the CIIP mode, comprises:
   in response to determining that the flag value of the CIIP mode is the first value, determining that the target prediction mode is the CIIP mode; and
   in response to determining that the flag value of the CIIP mode is the second value, determining that the target prediction mode is the GEO mode.

5. The method of claim 2, further comprises:
   acquiring the flag value of the subblock merge mode;
   wherein acquiring the flag value of the subblock merge mode comprises:
   in response to determining that the current block satisfies a decoding condition for the flag value of the subblock merge mode, reading the flag value of the subblock merge mode from flag indication information indicating whether to enable the subblock merge mode carried in the encoded bitstream of the current block; or
   in response to determining that the current block does not satisfy the decoding condition for the flag value of the subblock merge mode, determining a derived flag value of the subblock merge mode as the flag value of the subblock merge mode;
   wherein, in response to determining that the current block satisfies the decoding condition for the flag value of the subblock merge mode, the flag value of the subblock merge mode being the first value or the second value is acquired by decoding flag indication information for the subblock merge mode; or in response to determining that the current block does not satisfy the decoding condition for the flag value of the subblock merge mode, the derived flag value of the subblock merge mode is the second value.

6. The method of claim 5, wherein the current block satisfying the decoding condition for the flag value of the subblock merge mode comprises: the current block enables the subblock merge mode; the width of the current block is greater than or equal to 8, and the length of the current block is greater than or equal to 8.

7. The method of claim 2, further comprises:
   acquiring the flag value of the regular merge mode;
   wherein acquiring the flag value of the regular merge mode comprises:
   in response to determining that the current block satisfies a decoding condition for the flag value of the regular merge mode, reading the flag value of the regular merge mode from flag indication information indicating whether to enable the regular merge mode carried in the encoded bitstream of the current block; or in response to determining that the current block does not satisfy the decoding condition for the flag value of the regular merge mode, determining a derived flag value of the regular merge mode as the flag value of the regular merge mode;

wherein, in response to determining that the current block satisfies the decoding condition for the flag value of the regular merge mode, the flag value of the subblock merge mode being the first value or the second value is acquired by decoding flag indication information for the subblock merge mode; or in response to determining that the current block does not satisfy the decoding condition for the flag value of the regular merge mode, determining that the derived flag value of the regular merge mode is the first value.

8. The method of claim 7, wherein the current block satisfying the decoding condition for the flag value of the regular merge mode, comprises: the current block is allowed to enable the CIIP mode according to sequence-level control information, an area of the current block is greater than or equal to 64; the width of the current block is smaller than 128, the length of the current block is smaller than 128, and the skip mode is disabled for the current block.

9. The method of claim 7, wherein the current block satisfying the decoding condition for the flag value of the regular merge mode, at least comprise: the width of the current block is greater than or equal to 8, the length of the current block is greater than or equal to 8, the slice type of the picture containing the current block is B slice, and the current block is allowed to enable the GEO mode according to sequence-level control information.

10. The method of claim 2, further comprising:
acquiring the flag value of the MMVD mode;
wherein acquiring the flag value of the MMVD mode comprises:

in response to determining that the current block satisfies a decoding condition for the flag value of the MMVD mode, reading the flag value of the MMVD mode from flag indication information indicating whether to enable the MMVD mode carried in the encoded bitstream of the current block; or in response to determining that the current block does not satisfy the decoding condition for the flag value of the MMVD mode, determining a derived flag value of the MMVD mode as the flag value of the MMVD mode;

wherein, in response to determining that the current block satisfies the decoding condition for the flag value of the MMVD mode, the flag value of the MMVD mode being the first value or the second value is acquired by decoding flag indication information for the subblock merge mode; or in response to determining that the current block does not satisfy the decoding condition for the flag value of the MMVD mode, the derived flag value of the flag value of the MMVD mode is the second value.

11. The method of claim 10, wherein the current block satisfying the decoding condition for the flag value of the MMVD mode comprises: the flag value of the regular mode is the first value, and the current block is allowed to enable the MMVD mode according to sequence-level control information.

12. The method of claim 1, wherein acquiring the flag value of the CIIP mode, comprises:

in response to determining that the current block satisfies a decoding condition for the flag value of the CIIP mode, reading the flag value of the CIIP mode from flag indication information indicating whether to enable the CIIP mode carried in the encoded bitstream of the current block;

in response to determining that the current block does not satisfy the decoding condition for the flag value of the CIIP mode, determining a derived flag value of the CIIP mode as the flag value of the CIIP mode;

wherein, in response to determining that the current block satisfies the decoding condition for the flag value of the CIIP mode, the flag value of the CIIP mode being the first value or the second value is acquired by decoding flag indication information for the CIIP mode; or in response to determining that the current block does not satisfy the decoding condition for the flag value of the CIIP mode, according to that the current block satisfies all conditions to enable the CIIP mode, the derived flag value of the CIIP mode is the first value, or according to the current block dose not satisfy all conditions to enable the CIIP mode, the derived flag value of the CIIP mode is the second value.

13. The method of claim 12, wherein the current block satisfying the decoding condition for the flag value of the CIIP merge mode comprises: the current block is allowed to enable the CIIP mode according to sequence-level control information, the current block is allowed to enable the GEO mode according to sequence-level control information, a slice type of a picture containing the current block is B slice, the skip mode is disabled for the current block, a width of the current block is greater than or equal to 8, a length of the current block is greater than or equal to 8, the width of the current block is smaller than 128, and the length of the current block is smaller than 128.

14. The method of claim of 1, wherein the first value is 1, and the second value is 0.

15. A decoding device, comprising: a processor and a machine-readable storage medium, wherein the machine-readable storage medium stores machine-executable instructions that are invoked by the processor; and the processor is configured to invoke the machine-executable instructions to implement operations comprising:

determining prediction-mode flag information of a current block, wherein the prediction-mode flag information comprises a flag value of each of one or more of N candidate prediction modes; and for each of the one or more of the N candidate prediction modes, the flag value of the candidate prediction mode being a first value indicates that the candidate prediction mode is enabled, or the flag value of the candidate prediction mode being a second value indicates that the candidate prediction mode is disabled; and for the flag value of one of the N candidate prediction modes, in response to determining that the current block satisfies a decoding condition for the flag value of the candidate prediction mode, the flag value is read from flag indication information indicating whether to enable the candidate prediction mode carried in an encoded bitstream of the current block, or in response to determining that the current block does not satisfy the decoding condition for the flag value of the candidate prediction mode, the flag value is a derived flag value of the candidate prediction mode;

determining a target prediction mode used by the current block according to the prediction-mode flag information, wherein the target prediction mode is one of the N candidate prediction modes; and decoding the current block according to the target prediction mode;

wherein the N candidate prediction modes comprise: the subblock merge mode, the regular merge mode, the MMVD mode, and the CIIP mode; and determining the prediction-mode flag information of the current block and determining the target prediction mode used by the current block according to the prediction-mode flag information comprises:

acquiring the flag value of the subblock merge mode;

in response to determining that the flag value of the subblock merge mode is the first value, determining that the target prediction mode is the subblock merge mode;

in response to determining that the flag value of the subblock merge mode is the second value, acquiring the flag value of the regular merge mode;

in response to determining that the flag value of the regular merge mode is the first value, acquiring the flag value of the MMVD mode, and determining the target prediction mode according to the flag value of the MMVD mode; and in response to determining that the flag value of the regular merge mode is the second value, acquiring the flag value of the CIIP mode, and determining the target prediction mode according to the flag value of the CIIP mode.

16. The decoding device of claim 15, wherein the N candidate prediction modes comprise: the subblock merge mode, the regular merge mode, the MMVD mode, and the CIIP mode, determining the prediction-mode flag information of the current block and determining the target prediction mode used by the current block according to the prediction-mode flag information, comprises:

acquiring the flag value of the subblock merge mode;

in response to determining that the flag value of the subblock merge mode is the first value, determining that the target prediction mode is the subblock merge mode;

in response to determining that the flag value of the subblock merge mode is the second value, acquiring the flag value of the regular merge mode;

in response to determining that the flag value of the regular merge mode is the first value, acquiring the flag value of the MMVD mode, and determining the target prediction mode according to the flag value of the MMVD mode; and in response to determining that the flag value of the regular merge mode is the second value, acquiring the flag value of the CIIP mode, and determining the target prediction mode according to the flag value of the CIIP mode.

17. A non-transitory machine-readable storage medium storing machine-executable instructions, wherein when the machine-executable instructions are invoked by a processor, the processor is configured to invoke the machine-executable instructions to implement the method recited in claim 1.

18. An encoding method, comprising:

determining a target prediction mode used by a current block; and in response to determining that the target prediction mode is a CIIP mode, determining a flag value of a subblock merge mode is a second value, a flag value of a regular merge mode is the second value, and a flag value of the CIIP mode is a first value.

19. An encoding device, comprising: a processor and a machine-readable storage medium, wherein the machine-readable storage medium stores machine-executable instructions that are invoked by the processor; and the processor is configured to invoke the machine-executable instructions to implement the method recited in claim 18.

* * * * *